US012570398B2

(12) United States Patent
Dorris, III et al.

(10) Patent No.: US 12,570,398 B2
(45) Date of Patent: Mar. 10, 2026

(54) MULTIPLE FLIGHT MODE AIRCRAFT ARCHITECTURES AND CONTROLS

(71) Applicant: Odys Aviation, Inc., Signal Hill, CA (US)

(72) Inventors: James Robert Dorris, III, Marina Del Rey, CA (US); Alexander Jedinger, Monterey Park, CA (US); Tadeh Avetian, Burbank, CA (US); Fabio Ciampoli, Los Angeles, CA (US); Uwe Kiesewetter, Seal Beach, CA (US)

(73) Assignee: Odys Aviation, Inc., Long Beach, CA (US)

( * ) Notice: Subject to any disclaimer, the term of this patent is extended or adjusted under 35 U.S.C. 154(b) by 0 days.

(21) Appl. No.: 18/175,368

(22) Filed: Feb. 27, 2023

(65) Prior Publication Data

US 2023/0312089 A1 Oct. 5, 2023

Related U.S. Application Data

(60) Provisional application No. 63/315,445, filed on Mar. 1, 2022, provisional application No. 63/314,795, filed on Feb. 28, 2022.

(51) Int. Cl.
*B64C 29/00* (2006.01)
*B64C 3/16* (2006.01)
(Continued)

(52) U.S. Cl.
CPC ............ *B64C 29/0008* (2013.01); *B64C 3/16* (2013.01); *B64C 9/00* (2013.01); *B64C 27/26* (2013.01);
(Continued)

(58) Field of Classification Search
CPC ......... B64C 29/0008; B64C 3/16; B64C 9/00; B64C 27/26; B64C 39/068; G05D 1/102; B64U 30/295
See application file for complete search history.

(56) References Cited

U.S. PATENT DOCUMENTS 4,709,880 A 12/1987 Bradfield et al.
D317,287 S * 6/1991 Haga ........................... D12/328
(Continued)

FOREIGN PATENT DOCUMENTS

AU 2021345377 A1 * 4/2023 ............... B64C 1/26
WO 2020243364 A2 12/2020

OTHER PUBLICATIONS

PCT, Notification of Transmittal of The International Search Report and The Written Opinion of The International Searching Authority, or The Decalaration for Application PCT/US23/63345 dated Aug. 1, 2023.

(Continued)

*Primary Examiner* — Brian M O'Hara
(74) *Attorney, Agent, or Firm* — Patterson + Sheridan, LLP; Gero G. McClellan

(57) ABSTRACT

An aircraft is disclosed. The aircraft includes a first pair of wings, each wing in the first pair of wings including one or more actuating flaps configured to move to facilitate the aircraft transitioning between a forward cruise mode and a vertical hover mode, and operating in one of the forward cruise mode or the vertical hover mode. The aircraft further includes a second pair of wings, and one or more propellers coupled to the second pair of wings and oriented horizontally to provide upward lift.

20 Claims, 39 Drawing Sheets
(6 of 39 Drawing Sheet(s) Filed in Color)

(51) Int. Cl.

| | |
|---|---|
| *B64C 9/00* | (2006.01) |
| *B64C 27/26* | (2006.01) |
| *B64C 39/06* | (2006.01) |
| *B64U 30/295* | (2023.01) |
| *G05D 1/00* | (2006.01) |

(52) U.S. Cl.
 CPC .......... *B64C 39/068* (2013.01); *B64U 30/295* (2023.01); *G05D 1/102* (2013.01)

(56) References Cited

U.S. PATENT DOCUMENTS

| 5,374,010 | A | * | 12/1994 | Stone | ................. | B64C 29/0025 |
| | | | | | | 244/45 R |
| 6,467,726 | B1 | * | 10/2002 | Hosoda | ................... | B64C 35/00 |
| | | | | | | 74/423 |
| 7,275,711 | B1 | | 10/2007 | Flanigan | | |
| 8,540,184 | B2 | * | 9/2013 | Gemmati | ................ | B64C 27/26 |
| | | | | | | 244/6 |
| 11,554,865 | B2 | * | 1/2023 | Tao | ......................... | B64C 19/02 |
| 11,597,509 | B1 | * | 3/2023 | Alfaro | ................. | B64C 29/0025 |
| 11,738,868 | B2 | * | 8/2023 | Russ | ................... | B64C 29/0025 |
| | | | | | | 244/45 A |
| 2006/0192046 | A1 | | 8/2006 | Heath et al. | | |
| 2010/0200703 | A1 | | 8/2010 | Cazals et al. | | |
| 2012/0068004 | A1 | | 3/2012 | Hatamian | | |
| 2016/0207625 | A1 | | 7/2016 | Judas et al. | | |
| 2023/0219686 | A1 | * | 7/2023 | Zelayeta | ............. | B64C 29/0033 |
| | | | | | | 244/6 |
| 2023/0339610 | A1 | * | 10/2023 | Moore | ................. | B64C 39/068 |

OTHER PUBLICATIONS

International Preliminary Report on Patentability received for PCT Patent Application No. PCT/US2023/063345, mailed on Sep. 12, 2024, 07 pages.

* cited by examiner

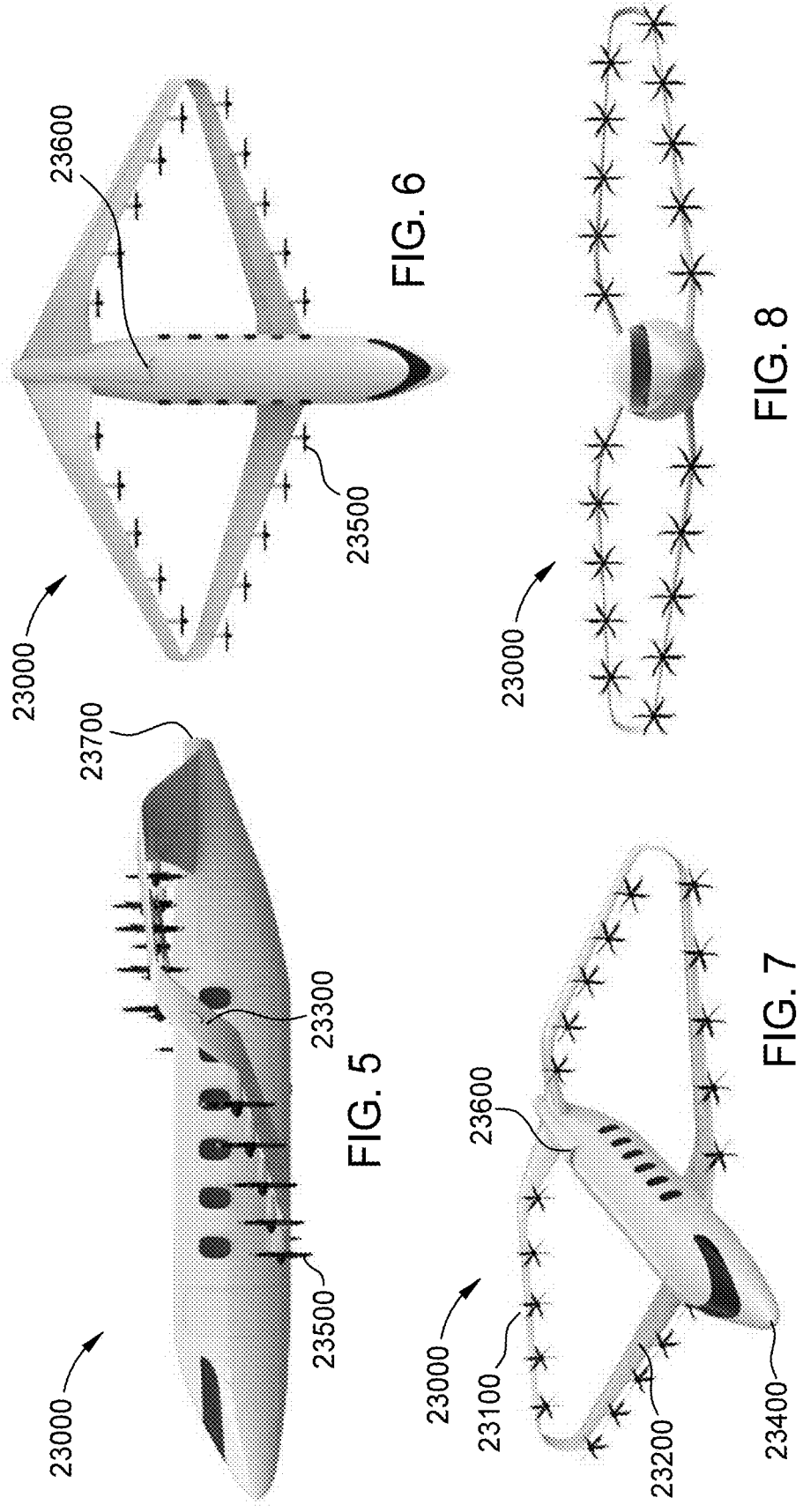

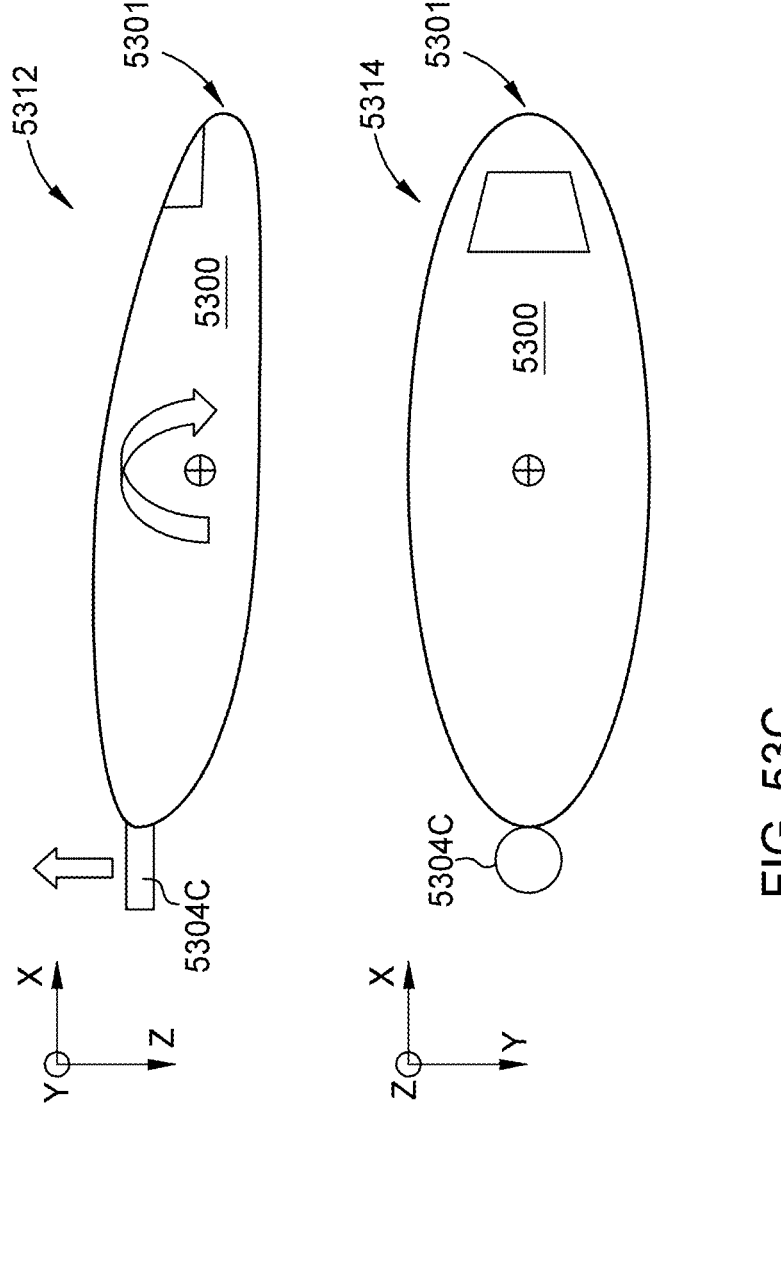
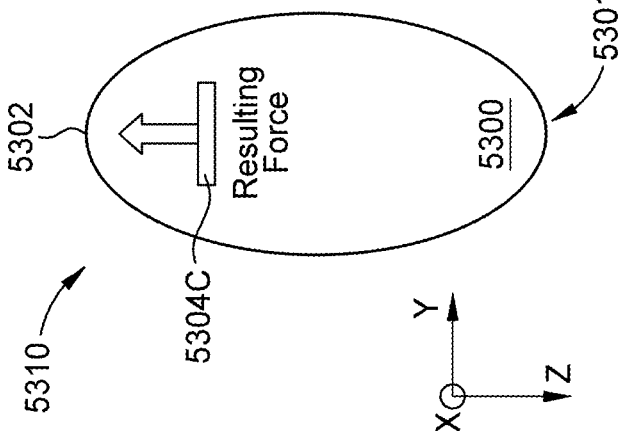
FIG. 53C

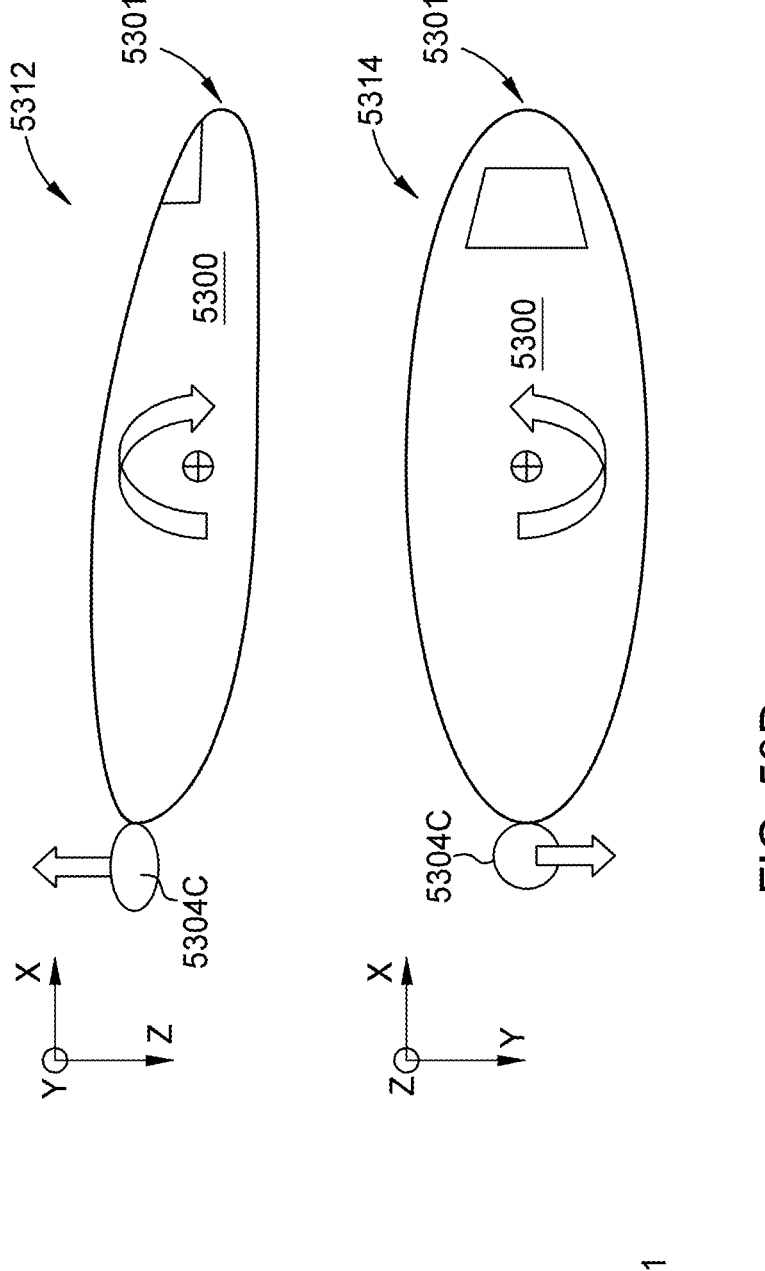
FIG. 53D
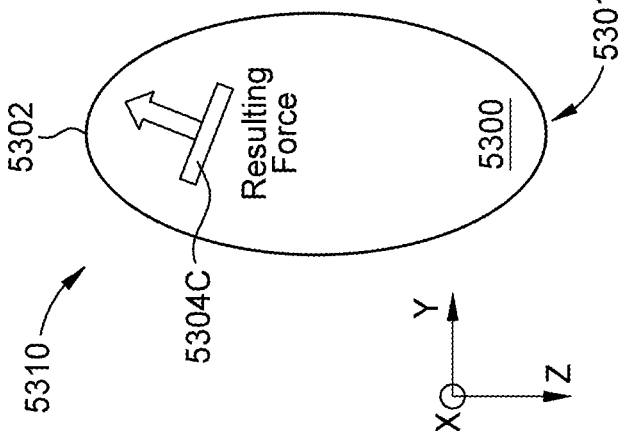

MULTIPLE FLIGHT MODE AIRCRAFT ARCHITECTURES AND CONTROLS

CROSS REFERENCE TO RELATED APPLICATIONS

This application claims benefit of U.S. provisional patent application Ser. No. 63/314,795 filed Feb. 28, 2022, and U.S. provisional patent application Ser. No. 63/315,445 filed Mar. 1, 2022. The aforementioned related patent applications are herein incorporated by reference in their entirety.

COLOR DRAWINGS

The patent or application file contains at least one drawing executed in color. Copies of this patent or patent application publication with color drawing(s) will be provided by the Office upon request and payment of the necessary fee.

FIELD OF INVENTION

The subject matter described herein relates to aircraft design and control.

SUMMARY

Embodiments include an aircraft. The aircraft includes a first pair of wings, each wing in the first pair of wings including one or more actuating flaps configured to move to facilitate the aircraft transitioning between a forward cruise mode and a vertical hover mode, and operating in one of the forward cruise mode or the vertical hover mode. The aircraft further includes a second pair of wings. The aircraft further includes one or more propellers coupled to the second pair of wings and oriented horizontally to provide upward lift.

Embodiments further include an aircraft, according to any of the embodiments described herein, where each wing in the second pair of wings is coupled to at least one of the one or more propellers, and where the propellers are coupled to a top side of the respective wing to pull air from above the wing during operation.

Embodiments further include an aircraft, according to any of the embodiments described herein, where each wing in the second pair of wings is coupled to a respective wing in the first pair of wings using a structural connector.

Embodiments further include an aircraft, according to any of the embodiments described herein, where the first pair of wings include forward wings and the second pair of wings include rear wings, and where the rear wings each include one or more additional flaps.

Embodiments further include an aircraft, according to any of the embodiments described herein, where the one or more additional flaps are configured to actuate to facilitate the aircraft transitioning between the forward cruise mode and the vertical hover mode, and operating in one of the forward cruise mode or the vertical hover mode.

Embodiments further include an aircraft, according to any of the embodiments described herein, where the one or more additional flaps each include a pivot point allowing a portion of each respective additional flap to be positioned at a different angle from a remainder of the respective additional flap.

Embodiments further include an aircraft, according to any of the embodiments described herein, the aircraft further including one or more tail rotors configured to provide at least one of: (i) yaw control or (ii) pitch control.

Embodiments further include an aircraft, according to any of the embodiments described herein, where at least one of the one or more tail rotors provides force in a horizontal direction for yaw control.

Embodiments further include an aircraft, according to any of the embodiments described herein, where at least one of the one or more tail rotors provides force in a vertical direction for pitch control.

Embodiments further include an aircraft, according to any of the embodiments described herein, where at least one of the one or more tail rotors provides force in both a horizontal direction for yaw control and a vertical direction for pitch control.

Embodiments further include an aircraft, according to any of the embodiments described herein, the aircraft further including an electronic controller configured to control operation of the aircraft in both the forward cruise mode and the vertical hover mode.

Embodiments include a further aircraft, including a first pair of wings, each wing in the first pair of wings including one or more actuating flaps configured to move to facilitate the aircraft transitioning between a forward cruise mode and a vertical hover mode, and operating in one of the forward cruise mode or the vertical hover mode. The aircraft further includes a second pair of wings. The aircraft further includes one or more tail rotors configured to provide at least one of: (i) yaw control or (ii) pitch control.

Embodiments further include an aircraft, according to any of the embodiments described herein, where at least one of the one or more tail rotors provides force in both a horizontal direction for yaw control and a vertical direction for pitch control.

Embodiments further include an aircraft, according to any of the embodiments described herein, where each wing in the second pair of wings is coupled to a respective wing in the first pair of wings using a structural connector, where the first pair of wings include forward wings and the second pair of wings include rear wings, and where the rear wings each include one or more additional flaps configured to actuate to facilitate the aircraft transitioning between the forward cruise mode and the vertical hover mode, and operating in one of the forward cruise mode or the vertical hover mode.

Embodiments further include an aircraft, according to any of the embodiments described herein, where the one or more additional flaps each includes a pivot point allowing a portion of each respective additional flap to be positioned at a different angle from a remainder of the respective additional flap.

Embodiments include a further aircraft, including a first pair of forward wings, each wing in the first pair of forward wings including a respective one or more actuating flaps configured to move to facilitate the aircraft transitioning between a forward cruise mode and a vertical hover mode, and operating in one of the forward cruise mode or the vertical hover mode. The aircraft further includes a second pair of rear wings, each wing in the second pair of rear wings also including a respective one or more actuating flaps further configured to move to facilitate the aircraft transitioning between the forward cruise mode and the vertical hover mode, and operating in one of the forward cruise mode or the vertical hover mode.

Embodiments further include an aircraft, according to any of the embodiments described herein, the aircraft further including one or more tail rotors configured to provide at least one of: (i) yaw control or (ii) pitch control, where at least one of the one or more tail rotors provides force in both a horizontal direction for yaw control and a vertical direction for pitch control.

Embodiments further include an aircraft, according to any of the embodiments described herein, where each wing in the second pair of rear wings is coupled to a respective wing in the first pair of forward wings using a structural connector.

Embodiments further include an aircraft, according to any of the embodiments described herein, where the rear wing actuating flaps each include a pivot point allowing a portion of the respective flap to be positioned at a different angle from a remainder of the respective flap.

Embodiments further include an aircraft, according to any of the embodiments described herein, the aircraft further including a plurality of actuating spoilers configured to be used to control all of: (i) roll, (ii) lift, and (iii) drag, for the aircraft.

BRIEF DESCRIPTION OF THE DRAWINGS

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

FIG. 5 is a sideview of an aircraft in accordance with an embodiment of the present invention.

FIG. 6 is a top view of an aircraft in accordance with an embodiment of the present invention.

FIG. 7 is an isometric view of an aircraft in accordance with an embodiment of the present invention.

FIG. 8 is a front view of an aircraft in accordance with an embodiment of the present invention.

FIGS. 53A-D illustrates a tail rotor for yaw and pitch control of an aircraft, in accordance with an embodiment of the present invention.

DETAILED DESCRIPTION

Described herein are example aircraft designs that enable synergies between one or more of aerodynamics, propulsion, structure, and stability/control. Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

As used herein and in the appended claims, the singular forms "a," "an," and "the" include plural referents unless the context clearly dictates otherwise.

Unless explicitly noted otherwise, a "wing" refers to a lift producing body from its root (where it's attached to the fuselage) to the wing tip. Each wing therefore extends on only one side of the fuselage.

Wing Configurations

Figure 1:
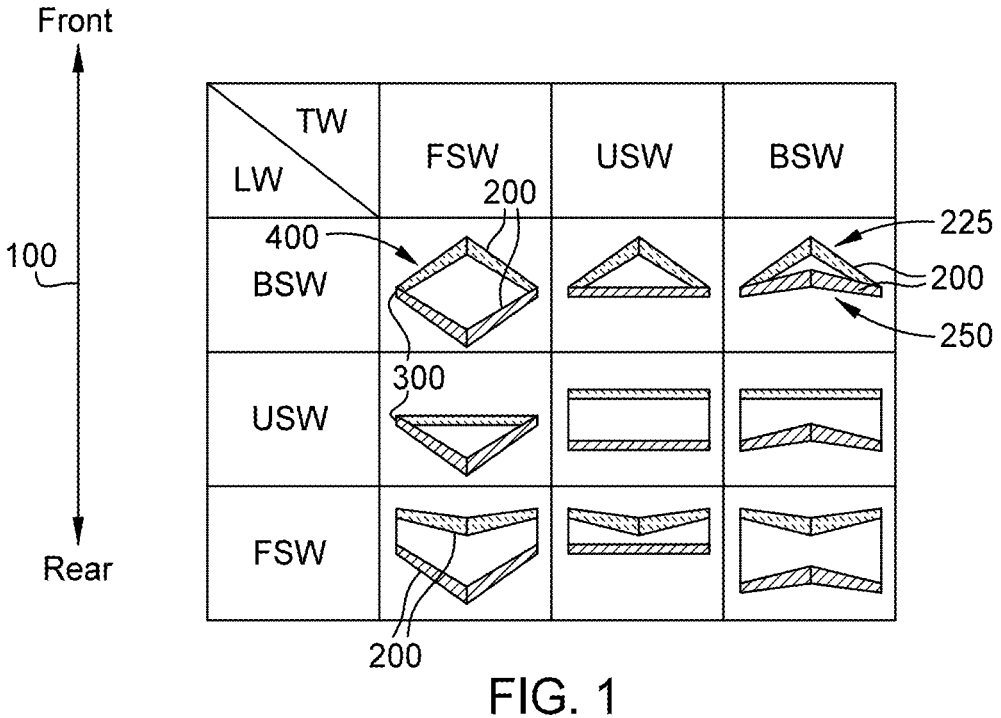
FIG. 1 is a top view of tandem wing configurations using a low-mounted leading wing and a high-mounted trailing wing, in accordance with an embodiment of the present invention.

FIG. 1 shows nine configurations where the leading wings (LW) are low-mounted (wings 200 at 225 for each configuration) while the trailing wings (TW) are high-mounted (wings 200 at 250 for each configuration), using nine combinations of backward-swept (BSW), un-swept (USW), and forward-swept (FSW) choices. These low-LW with high-TW configurations 150 ensure that the downwash from the LW is not negatively affecting the TW in level flight. Care must be applied in the detailed design of any specific application of these wing configurations such that the TW is not negatively impacted by the wake of the LW in situations requiring flight at high angles of attack (AoA).

Alternatively, the LW can be high-mounted, and the TW can be low-mounted as shown in the nine configurations of FIG. 1. These configurations avoid or diminish the high-AoA wake problem described above, but care must be applied such that the TW is mounted at an incidence angle that ensures the downwash from the LW is taken into consideration.

Joining the LW to the TW in some of the configurations above results in stretched winglets 300 along the longitudinal axis 100 of FIG. 1. To minimize negative interactions between the wings 200 while keeping the winglets 300 small, one suitable approach is where the LW is a low-mounted Backward-Swept Wing (BSW) while the TW is a high-mounted Forward-Swept Wing (FSW), configuration at 400 in FIG. 1. The following description will focus on this particular configuration 400, which, as one of ordinary skill in the art would appreciate, is one of several possible configurations in accordance with embodiments of the present invention.

Structure: The joined wings 200 constitute a very strong and stiff structure with great strength in torsion and bending. This may reduce the structural mass and complexity, in particular compared to traditional cantilevered wings.

Figure 2:
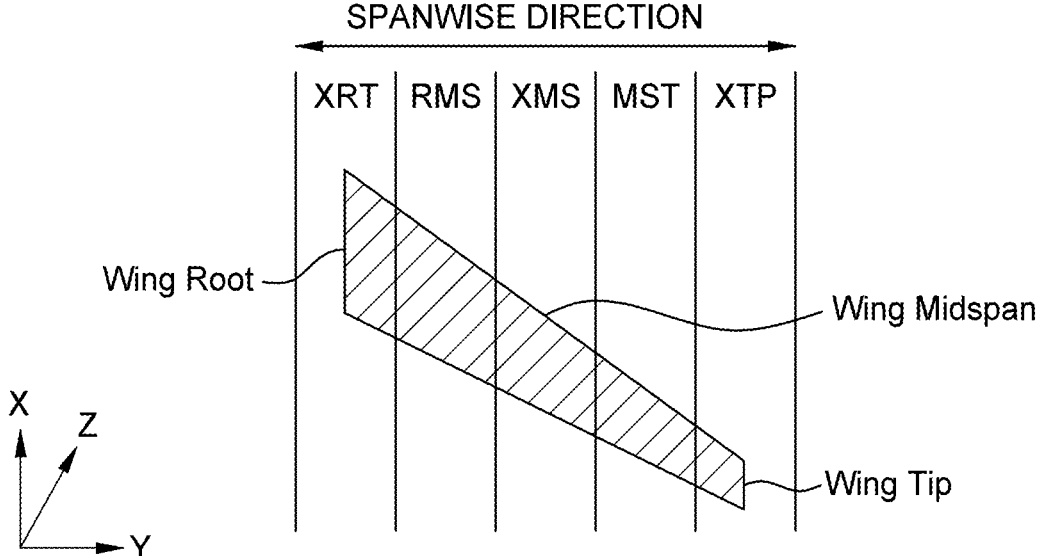
FIG. 2 is a diagram of general thrustor mounting stations along the span of a wing (lateral position), in accordance with an embodiment of the present invention.

Possible Positioning of Wing-mounted Thrustors There are many possible choices for thrustor positioning on a wing. Regardless of whether one chooses a ducted or a ductless solution, it may be useful to classify and categorize various thrustor positions along 3 primary directions:

Along the span of a wing (lateral position) as seen in FIG. 2

Figure 3:
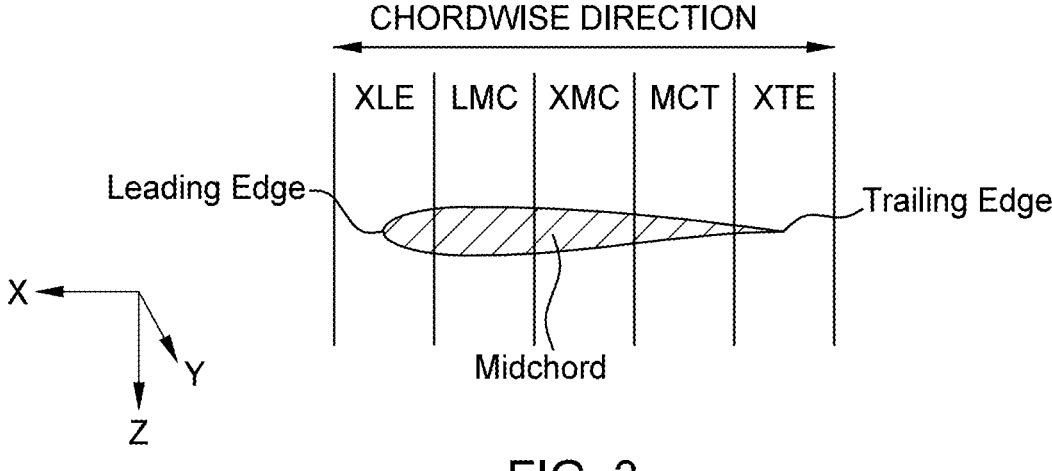
FIG. 3 is a diagram of general thrustor mounting stations along the chord of a wing (longitudinal position), in accordance with an embodiment of the present invention.

Along the chord of a wing (longitudinal position) as seen in FIG. 3

Figure 4:
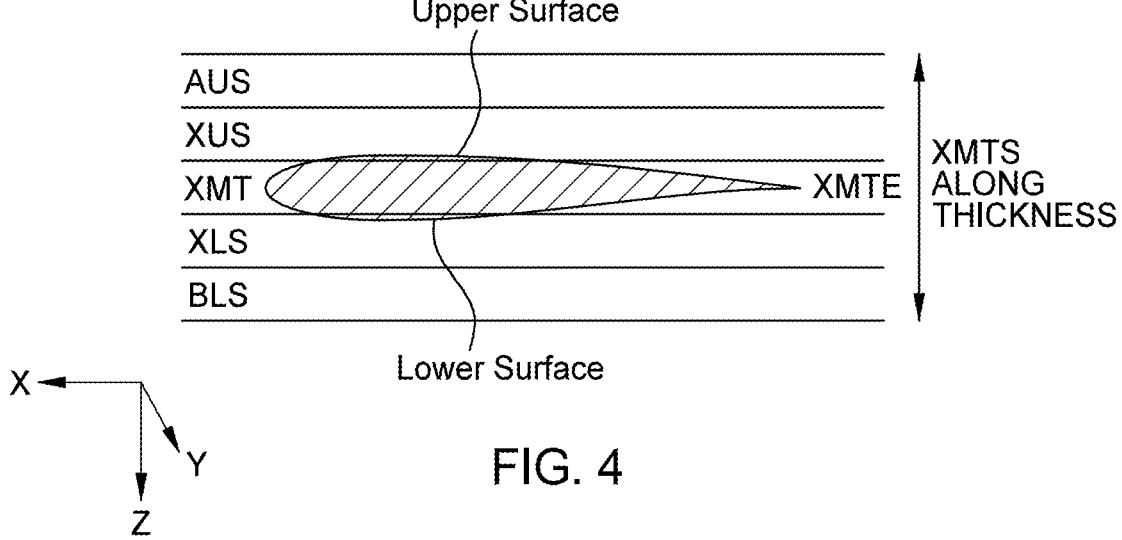
FIG. 4 is a diagram of general thrustor mounting stations along the thickness of a wing (vertical position), in accordance with an embodiment of the present invention.

Along the thickness of a wing (vertical position) as seen in FIG. 4

The wing can be sliced from root to tip along its span into 5 general lateral stations:

TABLE 1

| General classification of thrustor mounting position along the span of a wing (lateral position). | | |
|---|---|---|
| Station number | Station name | Station along span |
| S1 | XRT | At root |
| S2 | RMS | Between root and mid-span |
| S3 | XMS | At mid-span |
| S4 | MST | Between mid-span and tip |
| S5 | XTP | At tip |

The wing can be sliced from leading edge to trailing edge along its chord into 5 general longitudinal stations:

TABLE 2

General classification of thrustor mounting
position along the chord of a wing
(longitudinal position).

| Station number | Station name | Station along chord |
|---|---|---|
| C1 | XLE | At or near leading edge |
| C2 | LMC | Between leading edge and mid-chord |
| C3 | XMC | At mid-chord |
| C4 | MCT | Between mid-chord and trailing edge |
| C5 | XTE | At or near trailing edge |

The wing can be sliced from lower surface to upper surface along its thickness into 5 general vertical stations:

TABLE 3

General classification of thrustor mounting
position along the thickness of a wing
(vertical position).

| Station number | Station name | Along thickness |
|---|---|---|
| T1 | BLS | Fully below lower surface |
| T2 | XLS | At lower surface (flush with or protruding from lower surface) |
| T3S & T3E | XMTS & XMTE | At mid-thickness: Straddling upper and lower surfaces; or Embedded in wing |
| T4 | XUS | At upper surface (flush with or protruding from upper surface) |
| T5 | AUS | Fully above upper surface |

The number of thrustors can range from 1 on each wing and up, where, as discussed above, a wing is understood to span from a wing root to a wing tip across one side of an aircraft.

FIGS. 5, 6, 7, and 8 illustrate Aircraft 23000, according to one embodiment. As illustrated, Aircraft 23000 includes a high-mounted forward-swept trailing wing 23100 with a gullwing shape, a low-mounted backward-swept leading wing 23200 with an inverted gullwing shape and tall winglets 23300, a fuselage 23400, and twenty thrustors 23500 distributed along the wings 23100 and 23200, ten thrustors on the LW 23200 and ten thrustors on the TW 23100. Aircraft 23000's thrustors may be of any appropriate type including typical turbofans but aircraft 23000 may instead include a combustion engine such as a turbine to drive an electric generator powering the thrustors, which include propellers driven by electric motors, with an inlet 23600 and exhaust 23700. These propellers may have fixed or variable pitch blades.

Figure 6A:
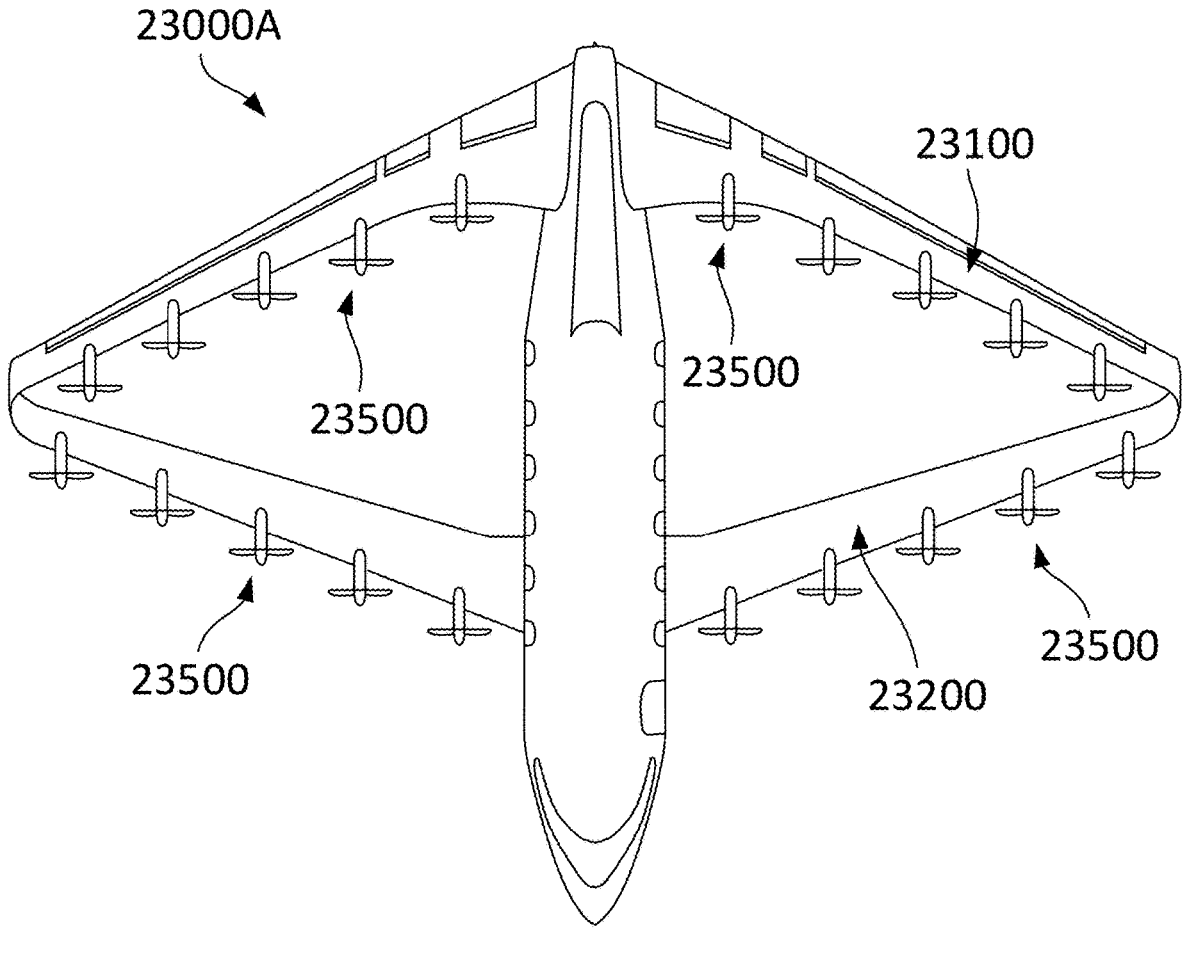
FIG. 6A is a top view of an aircraft in accordance with an embodiment of the present invention.

FIG. 6A is a top view of an aircraft 23000A in accordance with an embodiment of the present invention. Aircraft 23000A of FIG. 6A is configured in a similar manner as aircraft 23000 of FIGS. 5 through 8, except that thrustors 23500 (e.g., propellers) are coupled to a top side of the respective wings 23100, 23200 to pull air from above the wing during operation.

An aircraft, such as aircraft 23000, in accordance with an embodiment of the present invention includes flaps along one or more of its wings. FIGS. 9-12 show flaps in their extended position. FIGS. 13-16 show flaps in their retracted position. In an embodiment, an aircraft including flaps may travel in any of multiple modes of flight. For example, an aircraft with flaps in their extended position (e.g., as illustrated in relation to FIGS. 9-12) may take off vertically and hover with stability and control authority in relation to positioning (vertical, lateral, and longitudinal), yaw, roll, and pitch. As another example, an aircraft with flaps retracted may cruise (e.g., as illustrated in relation to FIGS. 13-16). This is discussed further below.

Figure 9:
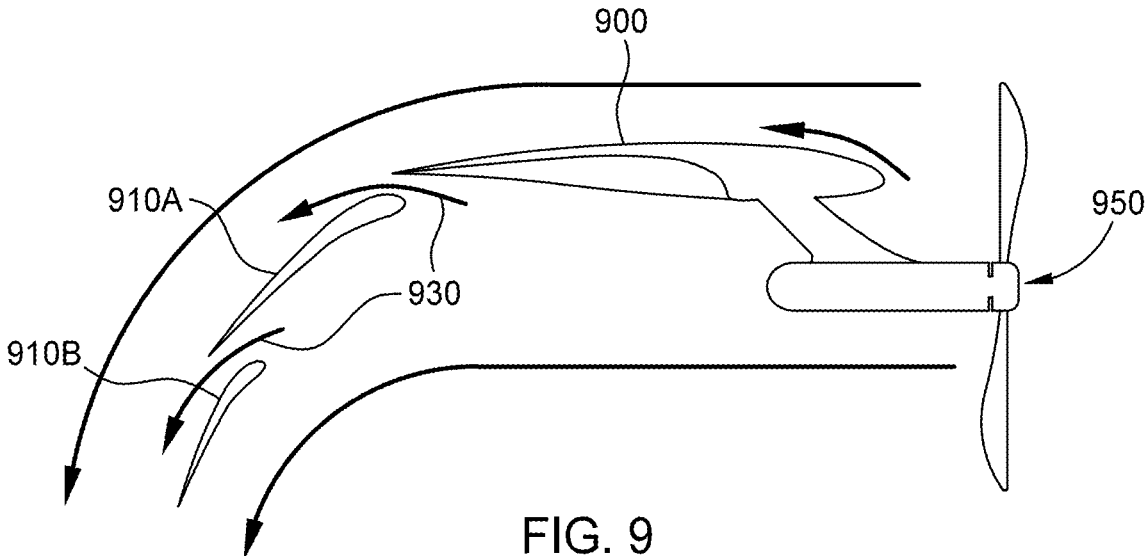
FIG. 9 is a sideview or cross sectional view of a wing with flaps extended down, in accordance with an embodiment of the present invention.

A flap system, in accordance with one or more embodiments of this invention, may include 1 or more flaps (910A and 910B), which (individually or collectively) extend from the wing 900 and rotate downwards such that the last flap's trailing edge is substantially vertical (i.e. substantially perpendicular to the wing) as shown in FIG. 9—a flap system in its extended position. When extended, flaps may optionally create slot(s) 930, which redirects high-energy air from the lower surface of the wing and ejects it onto the upper surface of the following flap. This redirected air reenergizes the boundary layer on the flap and helps keep the flow attached. Flaps may be positioned in any appropriate position, e.g. preferably behind or trailing a thrustor in the chordwise direction. With a thrustor 950 located in front of the flap system, the flap system in its extended position directs the air flow generated by thrustor 950 downwards, as shown in FIG. 10, creating upwards force on the flap system and wing, and thereby the aircraft.

Figure 11:
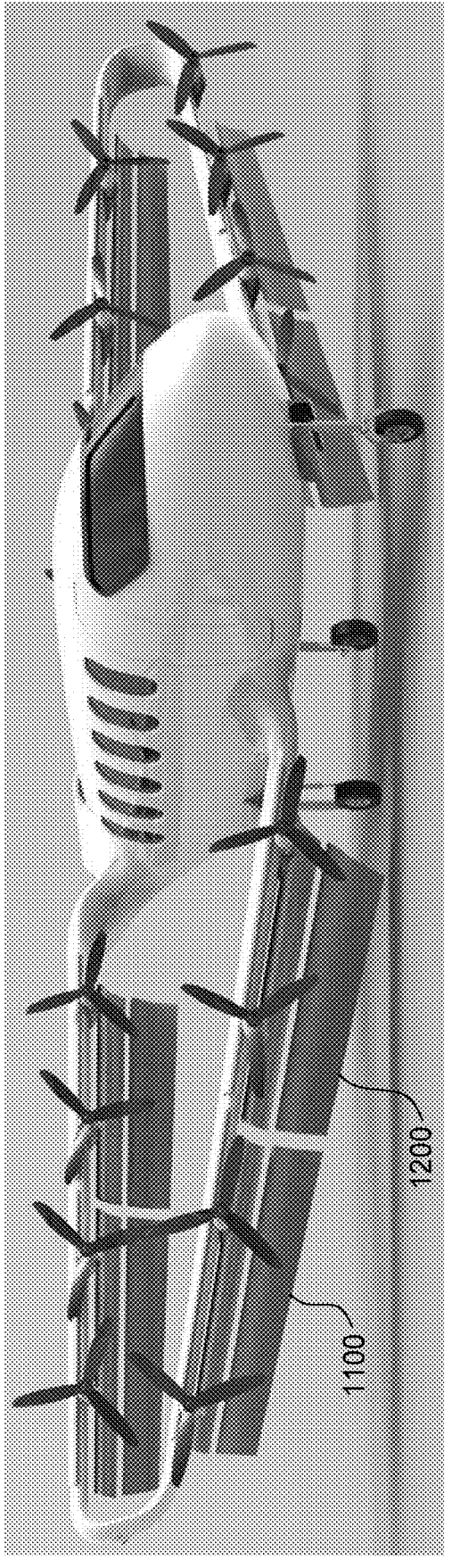
FIG. 11 is an isometric view from a frontal perspective of an aircraft with flaps extended down, in accordance with an embodiment of the present invention.
Figure 12:
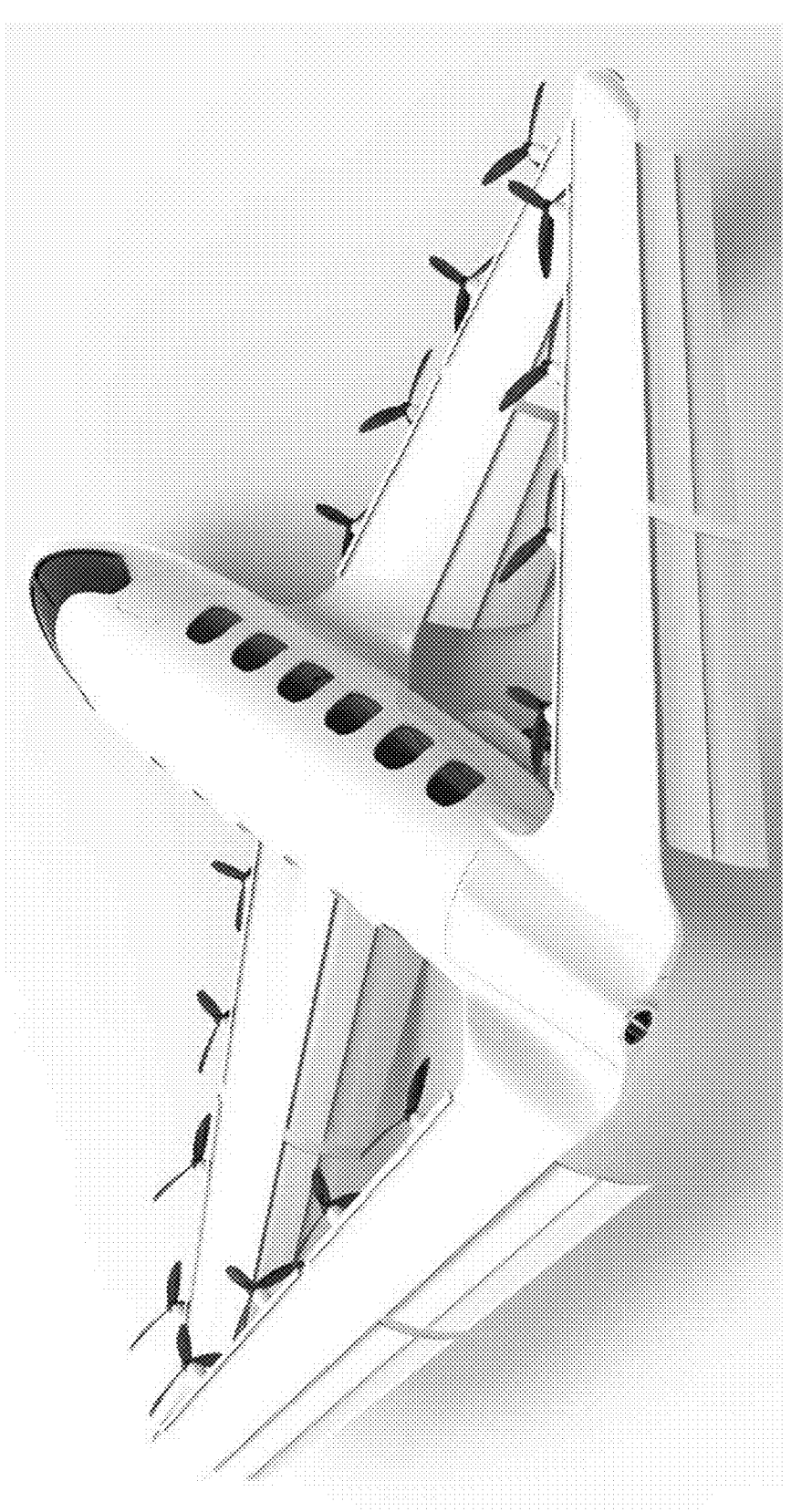
FIG. 12 is an isometric view from a rear perspective of an aircraft with flaps extended down, in accordance with an embodiment of the present invention.
Figure 13:
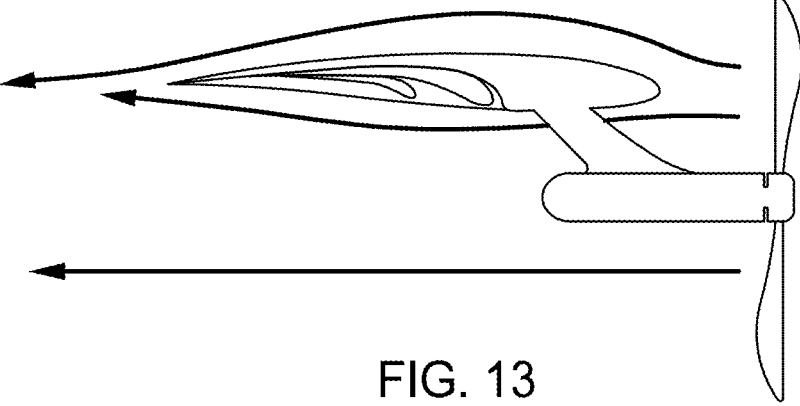
FIG. 13 is a sideview or cross sectional view of a wing with flaps retracted, in accordance with an embodiment of the present invention.
Figure 14:
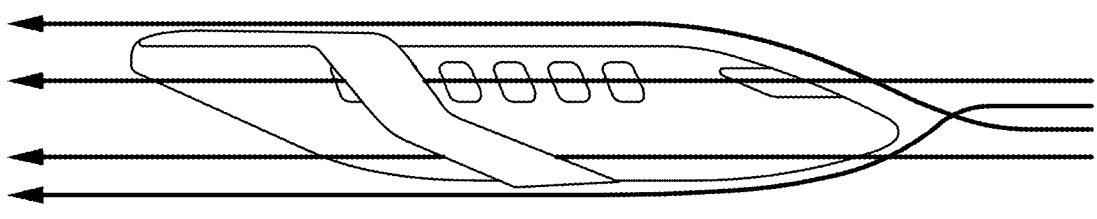
FIG. 14 is a sideview or cross sectional view of an aircraft with flaps retracted, in accordance with an embodiment of the present invention.
Figure 15:
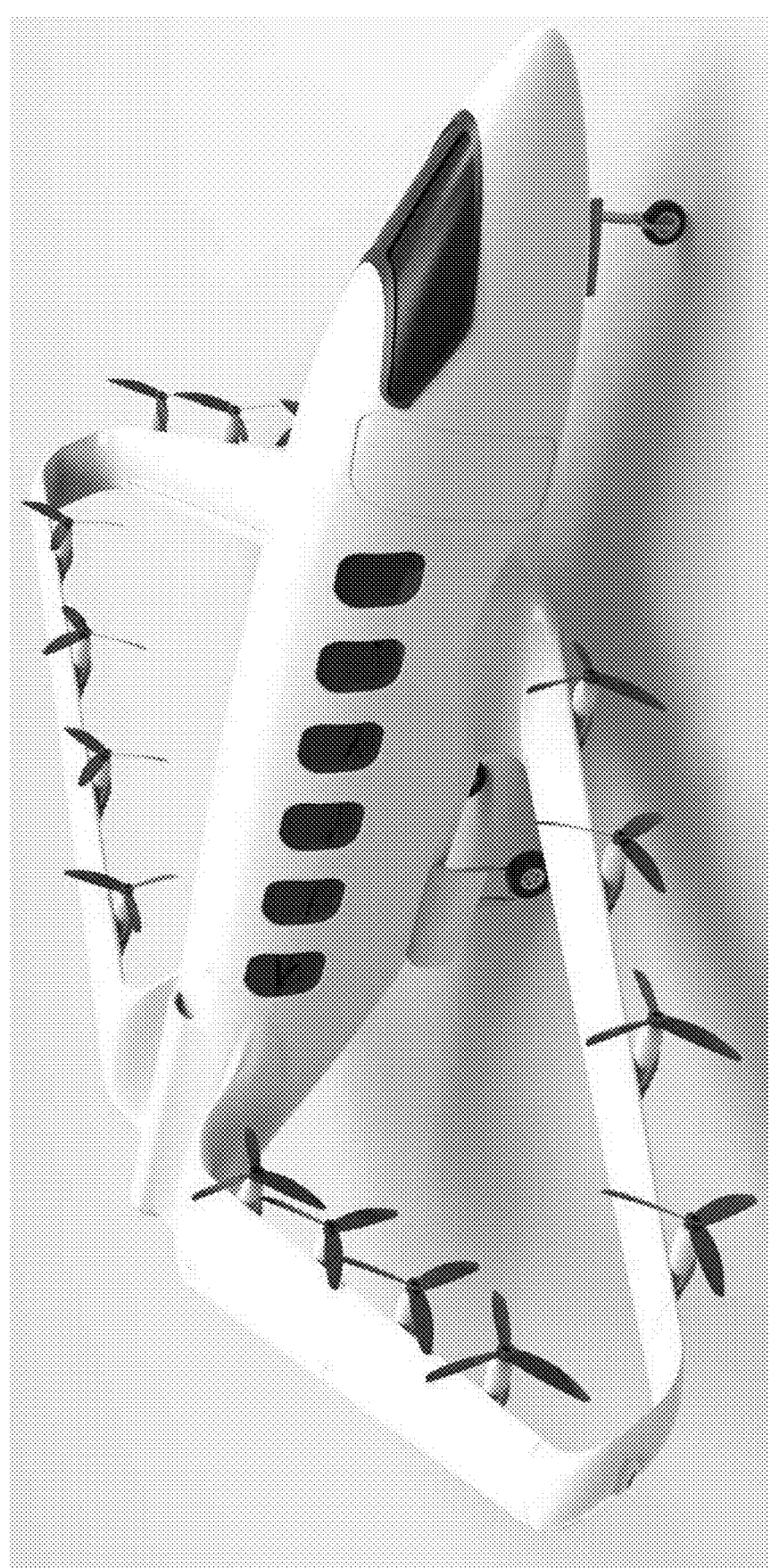
FIG. 15 is an isometric view from a frontal perspective of an aircraft with flaps retracted, in accordance with an embodiment of the present invention.
Figure 16:
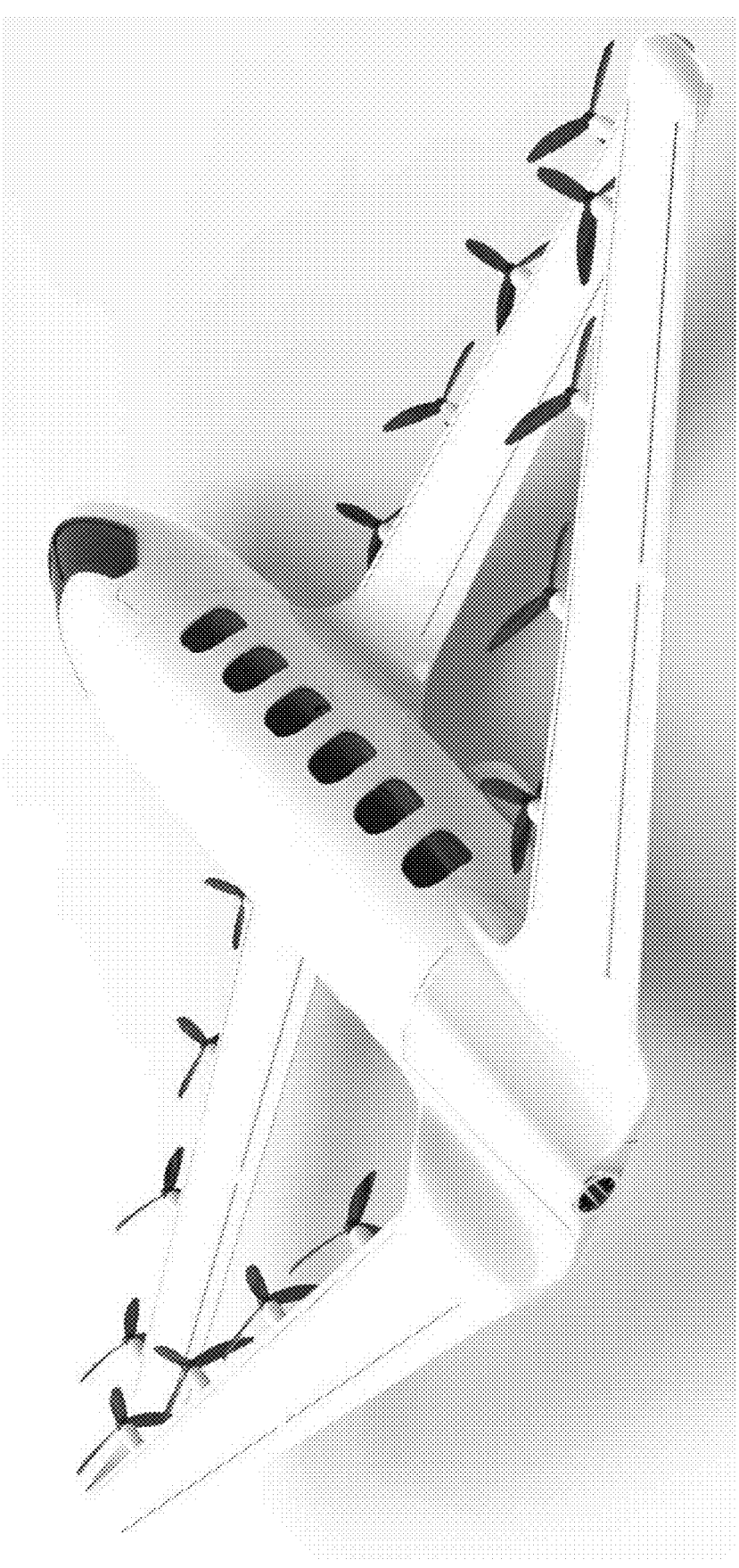
FIG. 16 is an isometric view from a rear perspective of an aircraft with flaps retracted, in accordance with an embodiment of the present invention.

One or more flap systems may be located spanwise across a wing. For example, FIG. 11 shows two flap systems (1100 and 1200) for each of the four wings, where the flap systems are in their extended positions.

A flap may be of any appropriate absolute width, or relative width (e.g., relative to thrustors such as thrustor diameter, or any other component of the aircraft such as wing chord). In one embodiment, a flap system is provided for each thrustor. In another embodiment, one flap system is provided for multiple thrustors, such as shown in FIG. 11 where one flap system is provided for two adjacent thrustors. In another embodiment, multiple flap systems are provided for one thrustor. To maximize upward vertical force in their extended positions, flap widths, in an embodiment, are sized to at least match the width of the thrustors, or a width sufficient to capture substantially all (e.g. 80% or 90%) of the generated airflow from a corresponding thrustor.

Figure 10:
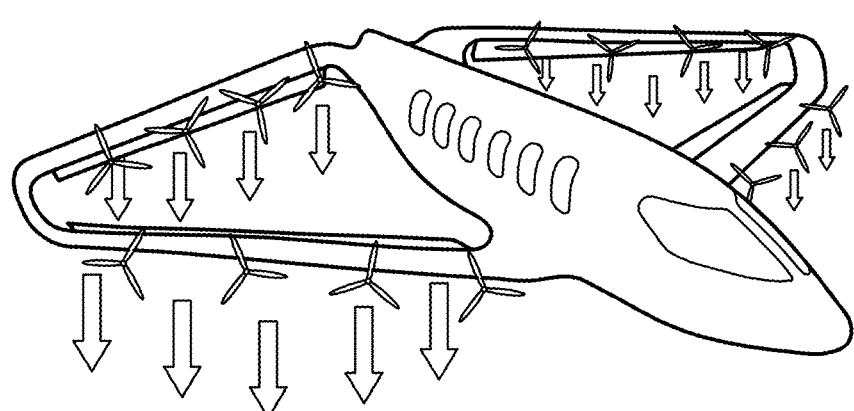
FIG. 10 is an isometric view of an aircraft with flaps extended down, in accordance with an embodiment of the present invention.

FIG. 10 depicts an aircraft in accordance with an embodiment of the invention, with forward and rear wings, a center of gravity in a point between the forward and rear wings, and flap systems behind the thrustors.

Figure 17A:
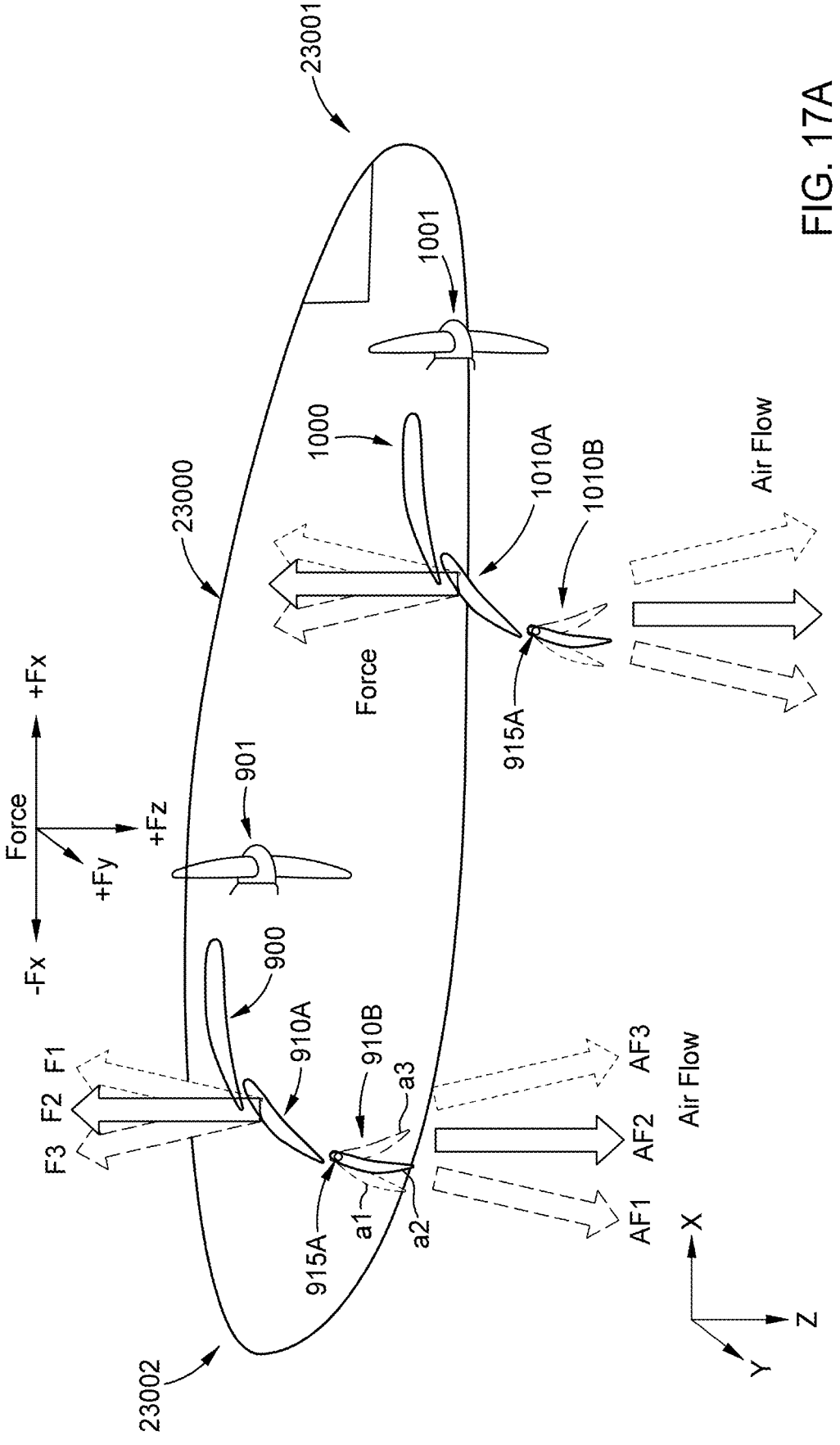
FIGS. 17A-B are sideview diagrams illustrating flaps on two wings in their extended position at various angles in accordance with an embodiment of the present invention.

FIG. 17A is a sideview diagram of the right side of an aircraft 23000 as an embodiment of the invention, illustrating flap systems 910 and 1010 in their extended positions on two wings 900 and 1000, respectively, which are straight wings. Thrustors 901 and 1001 are located in front of wings 900 and 1000, and in front of flap systems 910 and 1010, respectively. The front of the aircraft is at 23001. The rear of the aircraft is at 23002.

In this embodiment, flap system 910 includes two flaps, 910A and 910B, although in other embodiments, a flap system could also (or instead) include only one flap, or more than two flaps. The trailing flap may be articulated and rotated around a pivot point, e.g. 915A, resulting in a flap being positioned in various angles, e.g. a1, a2, and a3, and any number of other appropriate angles (greater, lesser, in between). FIG. 17A illustrates only 910B and 1010B trailing flaps rotating to various angles, but other flap(s) (e.g. 910A and 1010A, or additional element if a flap system consists of more than 2 flaps) may also rotate, instead of or in addition to the trailing flap.

FIG. 17A shows that different angles of the extended flaps, e.g. angles a1, a2, a3, result in air flow generated by thrustor 901 being directed in corresponding directions, AF1, AF2, AF3, resulting in different forces F1, F2, and F3 acting on the flaps, wing and aircraft.

If flap 910B is positioned at a vertical angle as shown by a2 (e.g., a neutral angle), resultant airflow AF2 is largely directed at the a2 angle, where AF2 includes a mostly positive z component (downward airflow), and where AF2 includes relatively minimal positive or negative x components. As a result, the force of the airflow acting upon the flap system, and thus the wing and the aircraft is F2, is in the negative z direction (or negative a2 direction) with minimal force component in the x directions.

If flap 910B is positioned as shown by angle a1, resultant airflow AF1 is largely directed at the a1 angle (e.g., a backward angle), and AF1 includes a substantially positive z component (e.g., downward airflow). AF1 includes a substantial negative x component (e.g., airflow also in the backward direction). As a result, the force of the airflow acting upon the flap system, and thus the wing and the aircraft, is F1 (at a negative a1 angle), which is largely in the negative z direction, but which also includes a substantial positive x force component.

If flap 910B is positioned as shown by angle a3 (a forward angle), resultant airflow AF3 is largely directed at the a3 angle, where AF3 includes a substantially positive z component (e.g., downward airflow), but where AF3 also includes a substantial positive x component (e.g., airflow also in the forward direction). As a result, the force of the airflow acting upon the flap system and thus the wing and the aircraft is AF3 (at a negative a3 angle), which is largely in the negative z direction, but which also includes a substantial negative x force component.

Figure 17B:
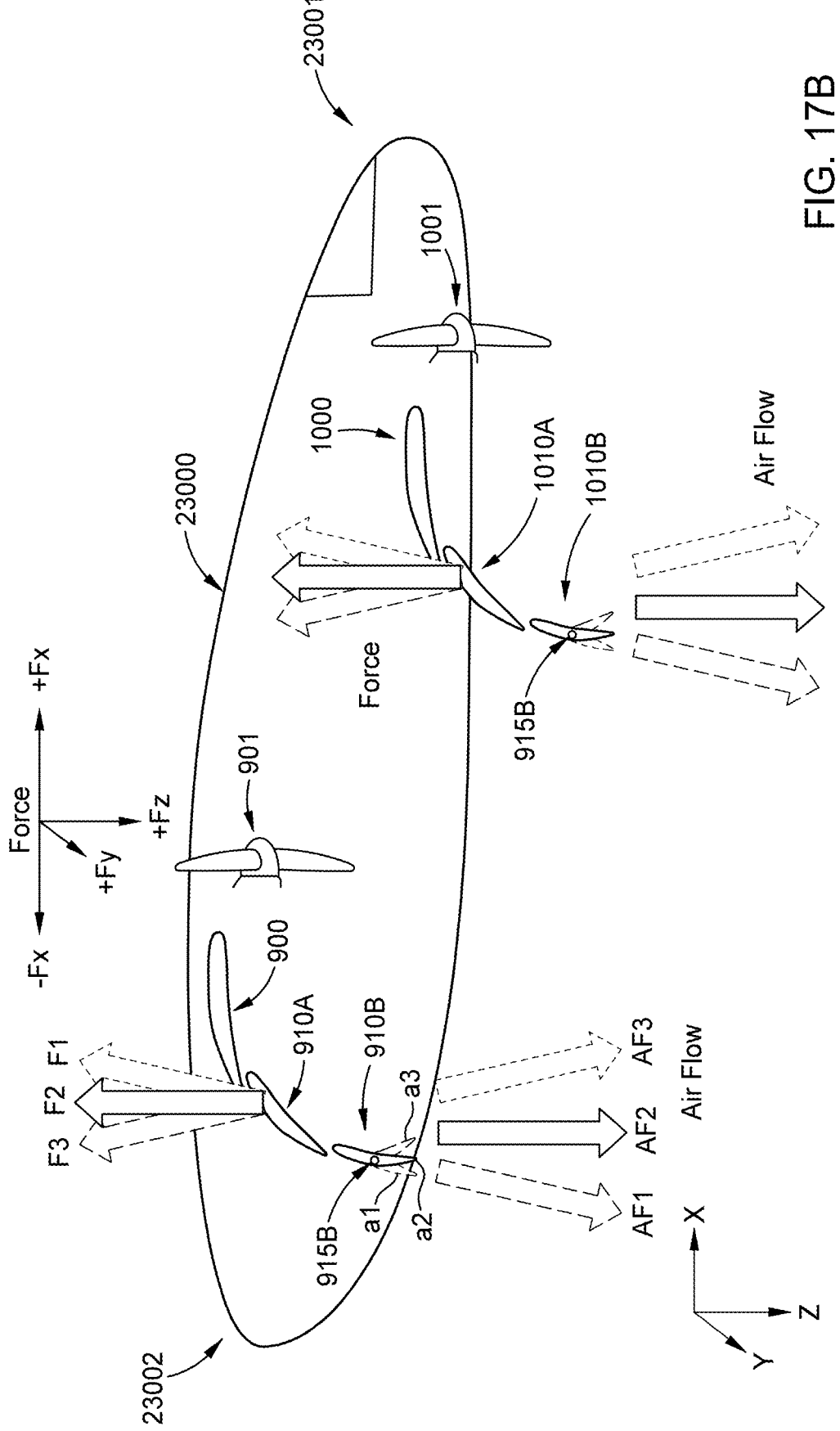

FIG. 17B is a further sideview diagram of the right side of an aircraft 23000 as an embodiment of the invention, as illustrated in FIG. 17A. FIG. 17B illustrates an alternative, or additional, pivot point 915B for a portion of the trailing flaps 910B or 1010B. As illustrated in FIG. 17A, the trailing flaps 910B and 1010B may be articulated and rotated around a pivot point, e.g. 915A, resulting in a flap being positioned in various angles, e.g. a1, a2, and a3, and any number of other appropriate angles (greater, lesser, in between). Alternatively, or in addition, as illustrated in FIG. 17B, a portion of the trailing flaps 910B or 1010B can be articulated and rotated around a pivot point 915B, resulting in a portion of the trailing flap 910B (e.g., half, two-thirds, or any other suitable portion) being positioned in the various angles a1, a2, a3, or any other suitable angle.

While FIGS. 17A-B illustrate a flap (e.g., the flap 910b) being actuated to rotate to different angles, this is merely one embodiment. Alternatively, the flap 910 is at least partially fixed. For example, the flap 910b may not be adjustable when fully extended. This can reduce mechanical complexity and overall aircraft weight. In an embodiment, when flaps are fully extended the flap 910b is fixed (e.g., at a particular desired angle).

Figure 18:
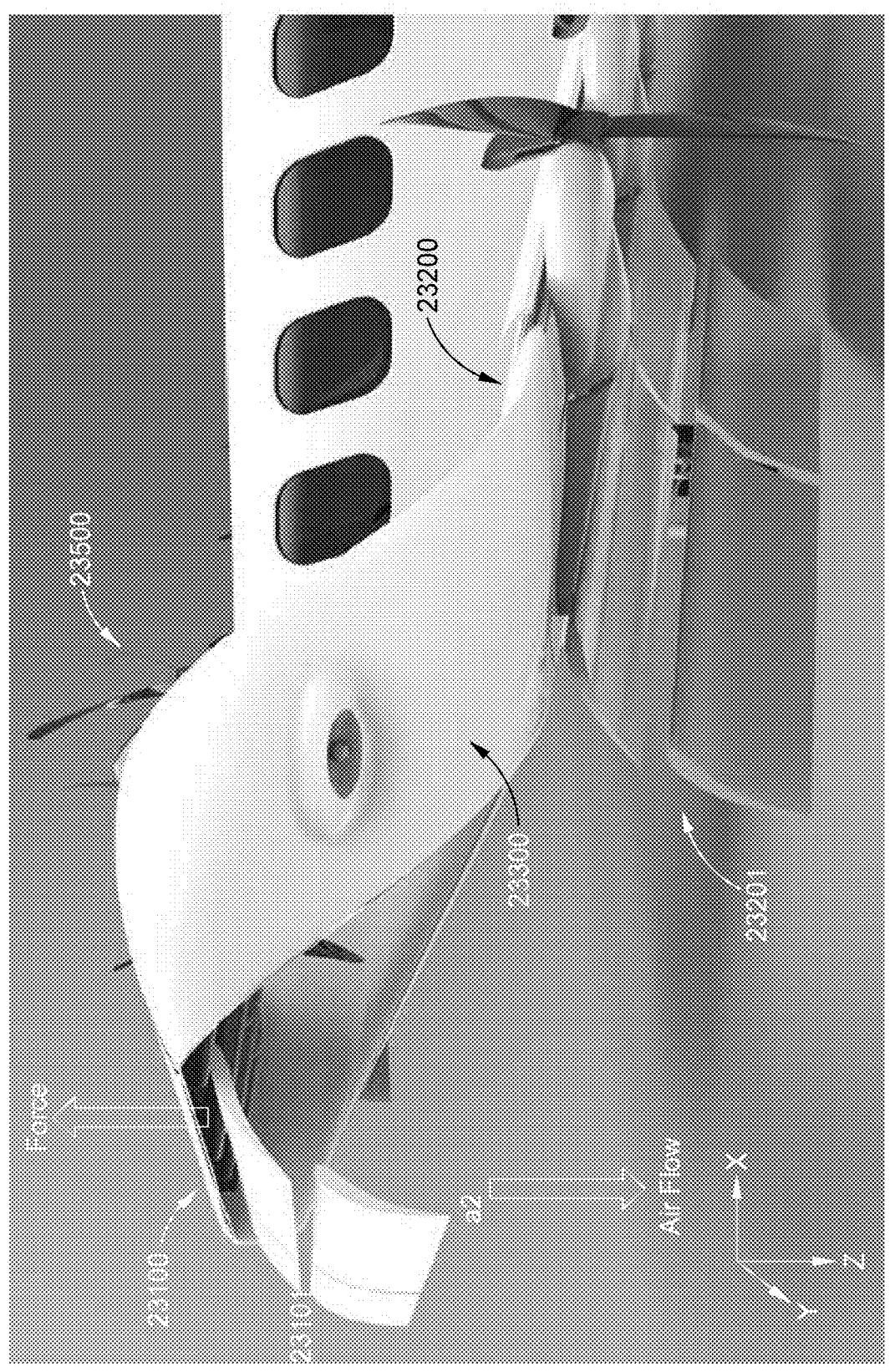
FIG. 18 illustrates an aircraft with flaps in their extended positions, in accordance with an embodiment of the present invention.
Figure 19:
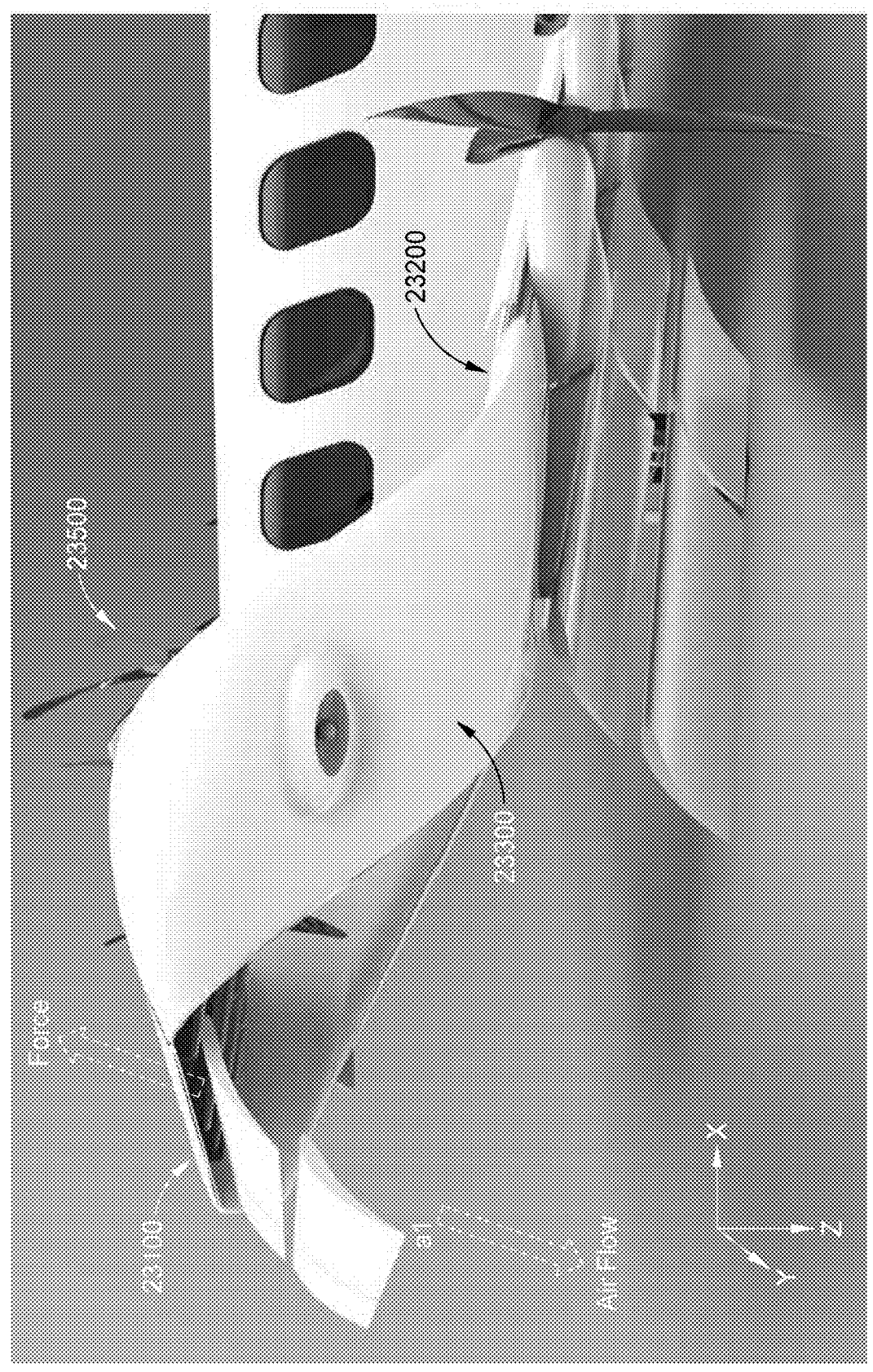
FIG. 19 further illustrates an aircraft with flaps in their extended positions, in accordance with an embodiment of the present invention.
Figure 20:
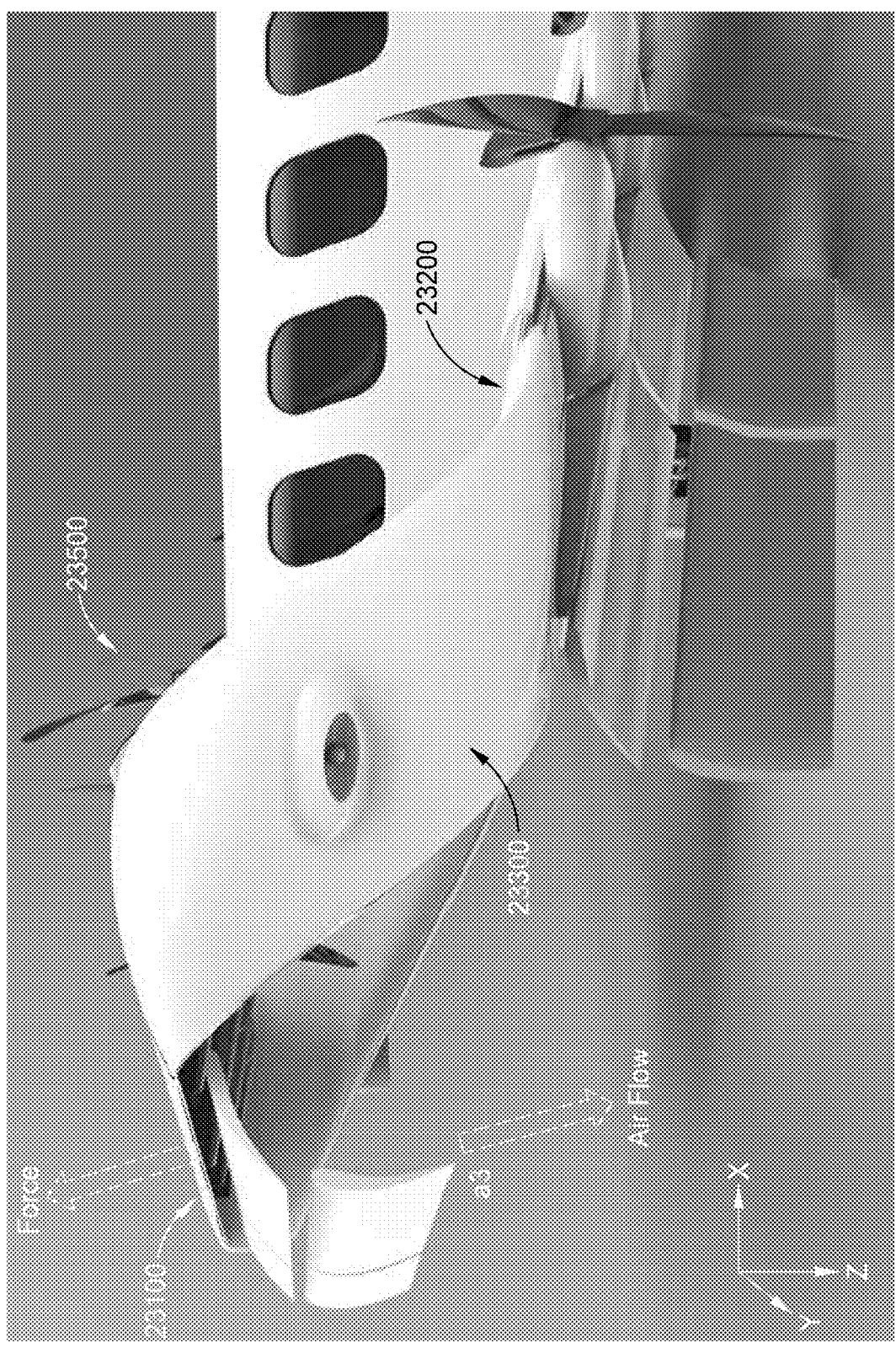
FIG. 20 further illustrates an aircraft with flaps in their extended positions, in accordance with an embodiment of the present invention.

FIGS. 17A-B are sideview diagrams of one side of an aircraft 23000 as an embodiment of the invention, illustrating flap systems in their extended positions on two straight wings. However, in other embodiments of the invention, swept wings (forward and/or backward) may be used. For example, FIGS. 18-20 illustrate an embodiment of the invention where aircraft 23000 has flap systems 23101 and 23201 in their extended positions on a forward set of backward-swept wings 23200 and a rear set of forward-swept wings 23100, where the sets are joined by winglets 23300. By utilizing forward or backward-swept wings in conjunction with flap systems as described herein, force in the positive and/or negative y direction may be introduced in addition to force in the x and z directions as disclosed with respect to FIGS. 17A-B.

Specifically, FIG. 19 illustrates flaps extended outwards at an angle a1. The air flow generated by thrustor 23500 is directed in the positive z and negative x directions (e.g., similar to FIGS. 17A-B). But the forward swept nature of right wing 23100 and the flaps on it, which are also forward angled, results in airflow that is also directed in the positive y direction. This results in force applied on the flap system and right wing 23100 that has a negative z component, a positive x component, and a negative y component.

Similarly, because right wing 23200 along with its flaps are backward-swept as shown in FIG. 19, the airflow also comprises a y component—but in the negative y direction. This results in force applied on the flap system and right wing 23200 that has a negative z component, a positive x component, and a positive y component.

FIG. 20 illustrates flap systems extended inwards at an a3 angle. The air flow generated by thrustor 23500 is directed in the positive z and positive x directions (similar to FIGS. 17A-B). But the forward swept nature of right wing 23100 and the flaps on it, which are also forward angled, results in airflow that is also directed in the negative y direction. This results in force applied on the flap system and right wing 23100 that has a negative z component, a negative x component, and a positive y component.

Similarly, because right wing 23200 along with its flaps are backward-swept as shown in FIG. 20, the airflow also comprises a y component—but in the positive y direction. This results in force applied on the flap system and right wing 23200 that has a negative z component, a positive x component, and a negative y component.

The discussion above for FIGS. 19 and 20 relate to the aircraft's right wings. The airflow and forces for the left wings are similar, except the y components are reversed directionally.

FIG. 18 illustrates flaps in their extended positions at an a2 angle, whereby air flow is directed substantially downwards in the positive z direction, with minimal x and y components for both the forward 23200 and rear 23100 set of wings (e.g., the y components may cancel out across one side of the aircraft, or across the aircraft as a whole). This results in force applied on the flaps and wings that has mostly a negative z component, without significant y or x components in any direction.

The tables below summarize for swept wings the air flow and force effects, as broken down by x, y, z components, in accordance with the related figures.

TABLE 4

| Angle of Extended Flap System for a Forward Swept Right Wing | | |
| --- | --- | --- |
| | Angled downward neutrally | Angled backward away from thrustor, e.g. a1 | Angled forward toward thrustor, e.g. a3 |
| Airflow x component | — | negative | positive |
| Airflow y component | — | positive | negative |
| Airflow z component | positive | positive | positive |
| Force x component | — | positive | negative |
| Force y component | — | negative | positive |
| Force z component | negative | negative | negative |

TABLE 5

Angle of Extended Flap System for a Backward Swept Right Wing

| | Angled downward neutrally | Angled backward away from thrustor, e.g. a1 | Angled forward toward thrustor, e.g. a3 |
|---|---|---|---|
| Airflow x component | — | negative | positive |
| Airflow y component | — | negative | positive |
| Airflow z component | positive | positive | positive |
| Force x component | — | positive | negative |
| Force y component | — | positive | negative |
| Force z component | negative | negative | negative |

TABLE 6

Angle of Extended Flap System for a Forward Swept Left Wing

| | Angled downward neutrally | Angled backward away from thrustor, e.g. a1 | Angled forward toward thrustor, e.g. a3 |
|---|---|---|---|
| Airflow x component | — | negative | positive |
| Airflow y component | — | negative | positive |
| Airflow z component | positive | positive | positive |
| Force x component | — | positive | negative |
| Force y component | — | positive | negative |
| Force z component | negative | negative | negative |

TABLE 7

Angle of Extended Flap System for a Backward Swept Left Wing

| | Angled downward neutrally | Angled backward away from thrustor, e.g. a1 | Angled forward toward thrustor, e.g. a3 |
|---|---|---|---|
| Airflow x component | — | negative | positive |
| Airflow y component | — | positive | negative |
| Airflow z component | positive | positive | positive |
| Force x component | — | positive | negative |
| Force y component | — | negative | positive |
| Force z component | negative | negative | negative |

A person of ordinary skill in the art will appreciate that the effects as summarized in Tables 4 and 7 may be accomplished without swept wings, e.g. using straight wings and angling the flaps instead, or using straight wings and angling the thrustors instead, or a combination of the above configurations.

In an embodiment, the force vector (e.g. F1, F2, F3) acting on a flap system (and thus wing and aircraft) and its various x, y, z components, may be varied and controlled by adjusting the amount of airflow outputted by the flap system's corresponding thrustor (e.g. 901).

Figures 21A, 21B:
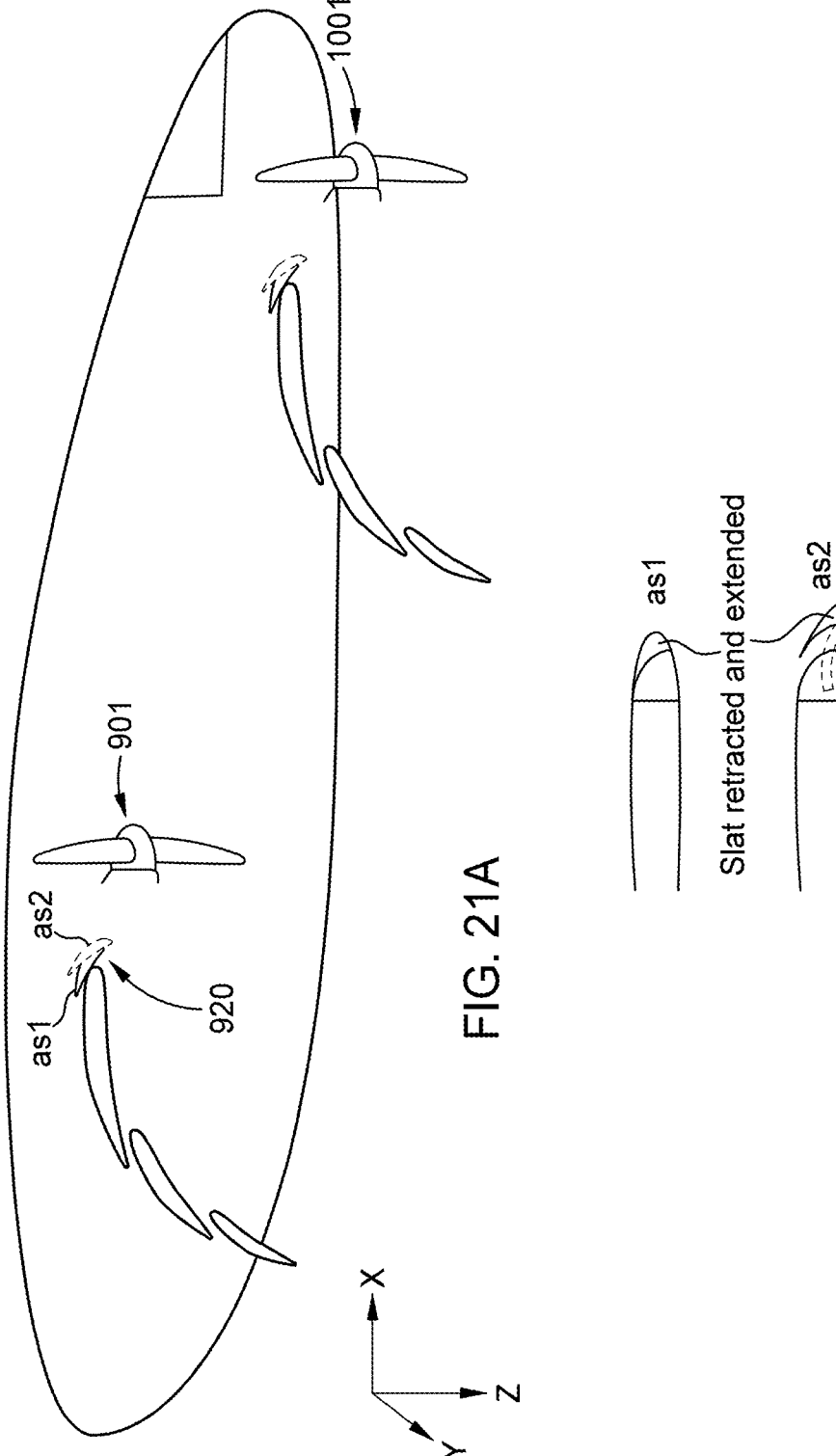
FIGS. 21A-B illustrate adjusting leading edge slat for an aircraft, in accordance with an embodiment of the present invention.

Overall performance and lift generated may also be varied by adjusting other surfaces such as leading edge slats, as shown in FIGS. 21A-B. Performance enhancement from slats will vary depending on a number of factors, e.g. slat design, angle, extension, and many other factors. As an example, however, slat 920 may be positioned in a retracted as1 position/angle, or an extended as2 position/angle. If extended, slat 920 increases the camber of the wing, the surface area, or both, and also creates a slot whereby air from the lower surface of the wing enters to the upper surface of the wing. This speeds up the air flowing over the upper surface of the wing and increases its kinetic energy, keeping the air in contact with the wing surface for a longer time and delaying the onset of stalling. In such an embodiment, slats as extended may increase the force vectors and performance in comparison to a wing without slats or where slats are retracted (e.g., the slats can lengthen or shorten the force vector). Such performance improvements may include a movement of the center of pressure, positively affecting longitudinal stability and placement of the center of gravity. In an embodiment, varying thrust may be applied on all wings (e.g., all four wings).

As summarized in Tables 4-7, each flap system, by varying its angle, can control whether force is generated in the positive or negative x and y directions. When multiple such flap systems are utilized with an aircraft designed with both forward and backward-swept wings, the consequence is that such an aircraft is provided with full yaw control, lateral movement control, and longitudinal movement control, as described more fully with respect to FIGS. 22-24.

Figure 22:
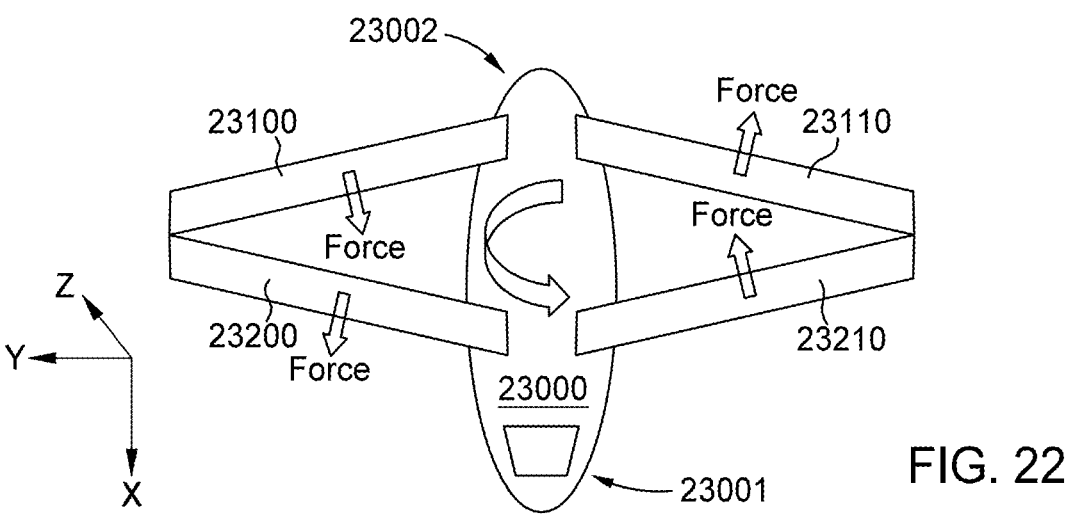
FIG. 22 illustrates yaw control by an aircraft, in accordance with an embodiment of the present invention.

FIG. 22 illustrates yaw control by aircraft 23000 as an embodiment of the invention. FIG. 22 illustrates the x and y forces required to achieve yaw control. The z component of the forces is not shown but is in the negative z direction, enabling hover. For example, aircraft 23000 illustrated in FIG. 22 includes thrustors and flaps consistent with FIGS. 5-8 and 10-12. By actuating the flaps on each wing to appropriate angles in accordance with the tables above, the forces as shown by the arrows may be generated. Specifically, the flap systems on forward-swept right wing 23100 are angled backward away from the thrustors, thus generating force on that wing having a positive x component and a negative y component, as shown by the corresponding arrow. The flap systems on backward-swept right wing 23200 are angled backward away from the thrustors, thus generating force on that wing having a positive x component and a positive y component, as shown by the corresponding arrow. The flap systems on forward-swept left wing 23110 are angled forward toward the thrustors, thus generating force on that wing having a negative x component and a negative y component, as shown by the corresponding arrow. And, the flap systems on backward-swept left wing 23210 are angled forward toward the thrustors, thus generating force on that wing having a negative x component and a positive y component, as shown by the corresponding arrow. With substantial force on the right wings in the positive x direction, and substantial force on the left wings in the negative x direction, a counterclockwise rotation force (from a top-down perspective and about the z axis) is imparted on aircraft 23000, providing yaw control.

Figure 23:
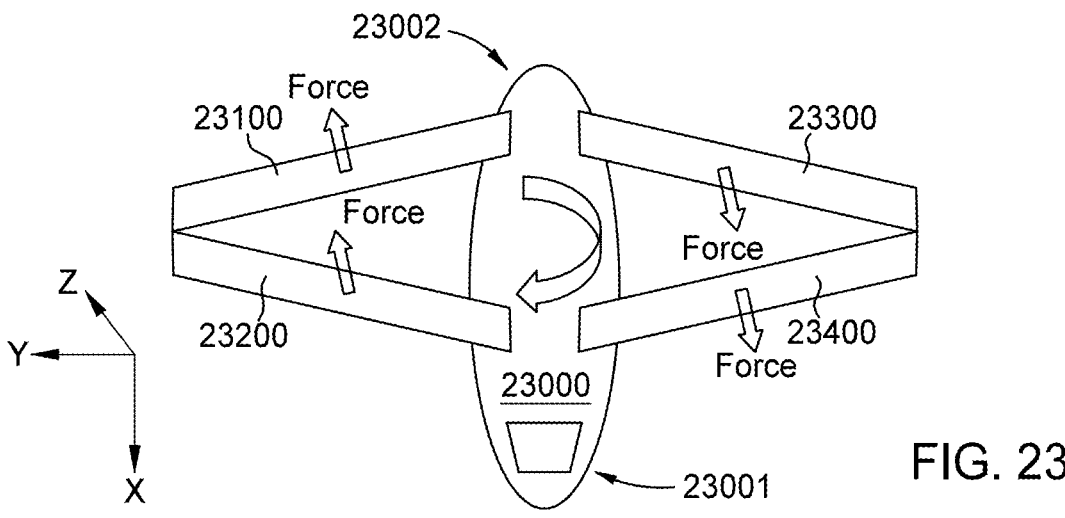
FIG. 23 further illustrates yaw control by an aircraft in accordance with an embodiment of the present invention.

FIG. 23 further illustrates yaw control by an aircraft in accordance with an embodiment of the present invention. Yaw control in the opposite direction (clockwise from a top-down perspective and about the z axis) is similarly available by adjusting the angles of the flap systems to achieve the forces shown in FIG. 23.

Figure 24:
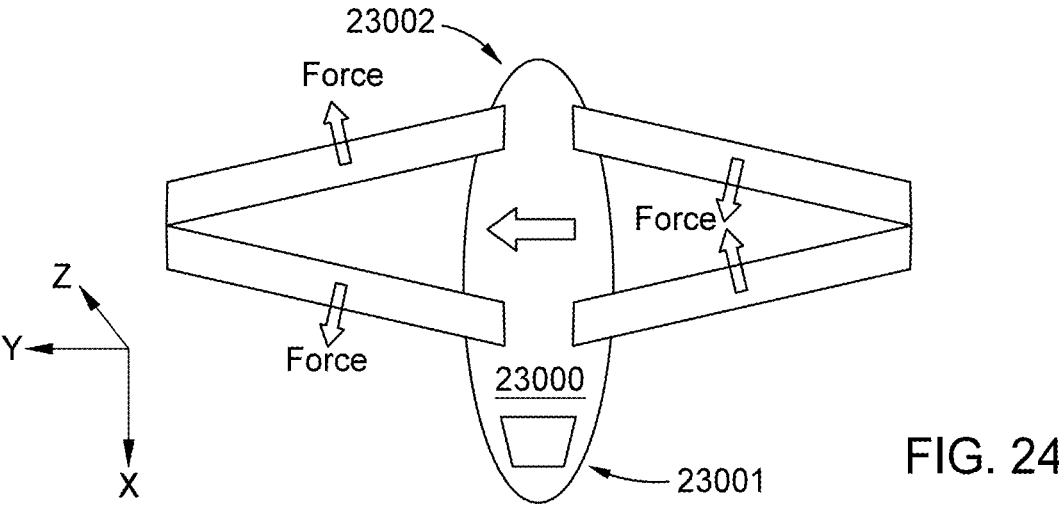
FIG. 24 illustrates lateral control and movement for an aircraft, in accordance with an embodiment of the present invention.

FIG. 24 illustrates lateral control and movement in the positive y direction by aircraft 23000 as an embodiment of the invention. FIG. 24 illustrates the x and y forces required to achieve such lateral control and movement. The z component of the forces is not shown but is in the negative z direction, enabling hover. For example aircraft 23000, as illustrated in FIG. 24, includes thrustors and flaps consistent with FIGS. 5-8 and 10-12. By actuating the flaps on each wing to appropriate angles in accordance with the tables above, the forces as shown by the arrows may be generated to achieve lateral control and movement in the positive y direction.

Figure 25:
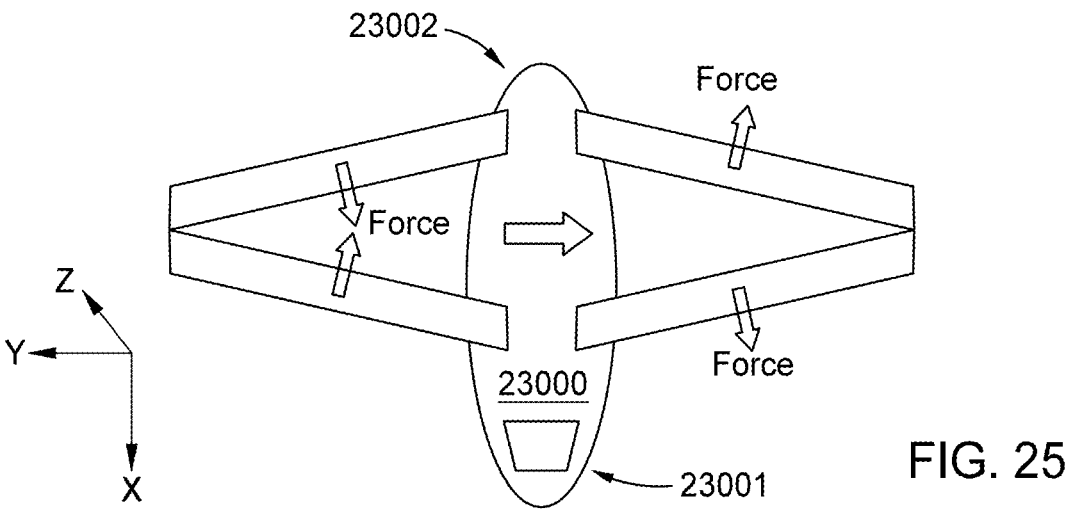
FIG. 25 further illustrates lateral control and movement for an aircraft, in accordance with an embodiment of the present invention.

FIG. 25 illustrates lateral control and movement in the negative y direction by aircraft 23000 as an embodiment of the invention. FIG. 25 focuses on illustrating the x and y forces required to achieve such lateral control and movement. The z component of the forces is not shown but are in the negative z direction, enabling hover. Though not shown in this figure, aircraft 23000 here comprises thrustors and flap systems consistent with FIGS. 5-8 and 10-12. By actuating the flap systems on each wing to appropriate angles in accordance with the tables above, the forces as shown by the arrows may be generated to achieve lateral control and movement in the negative y direction.

Figure 26:
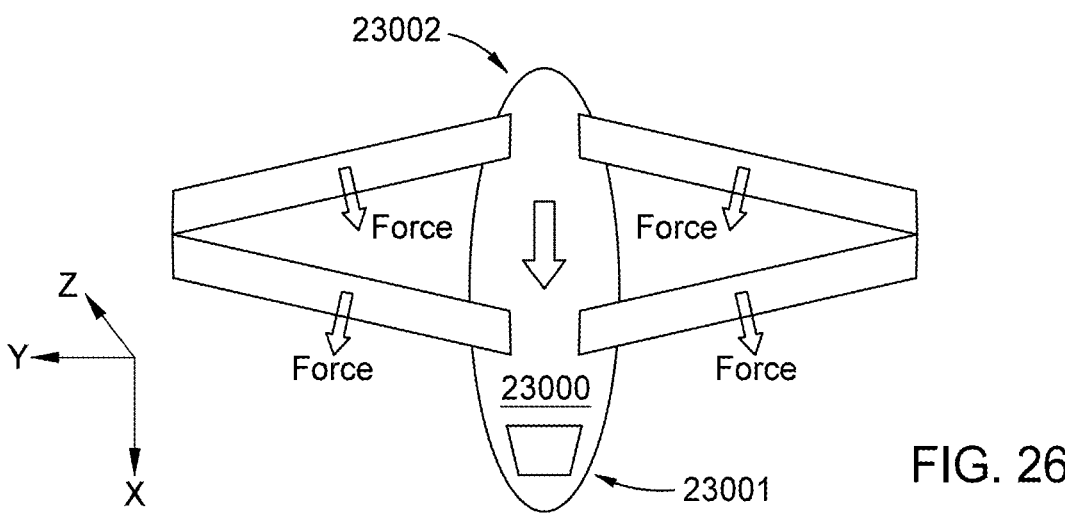
FIG. 26 illustrates longitudinal control and movement for an aircraft, in accordance with an embodiment of the present invention.

FIG. 26 illustrates longitudinal control and movement in the positive x direction by aircraft 23000 as an embodiment of the invention. FIG. 26 illustrates the x and y forces required to achieve such longitudinal control and movement. The z component of the forces is not shown but is in the negative z direction, enabling hover. For example, aircraft 23000, as illustrated in FIG. 26, includes thrustors and flap systems consistent with FIGS. 5-8 and 10-12. By actuating the flap systems on each wing to appropriate angles in accordance with the tables above, the forces as shown by the arrows may be generated to achieve longitudinal control and movement in the positive x direction.

Figure 27:
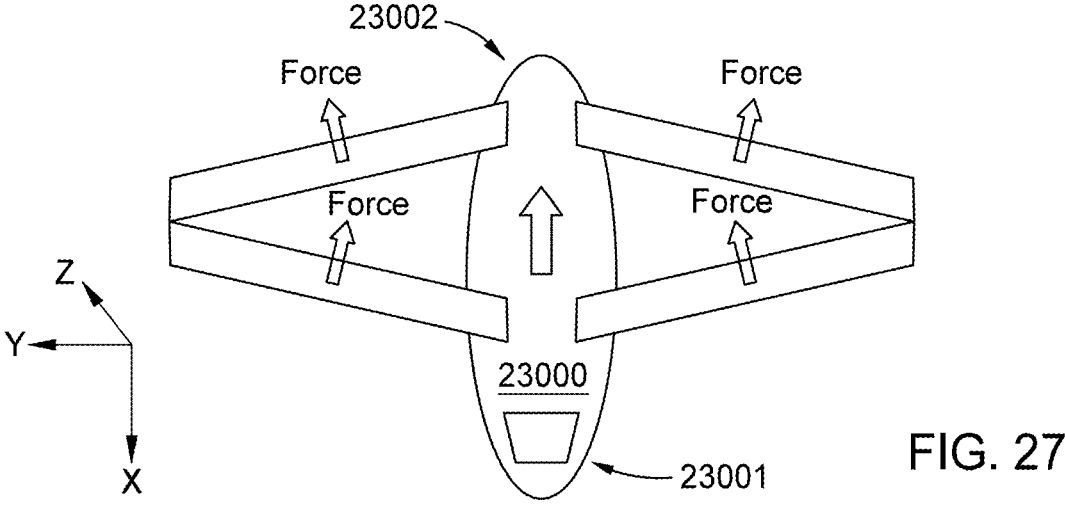
FIG. 27 further illustrates longitudinal control and movement for an aircraft, in accordance with an embodiment of the present invention.

FIG. 27 illustrates longitudinal control and movement in the negative x direction by aircraft 23000 as an embodiment of the invention. FIG. 27 illustrates the x and y forces required to achieve such longitudinal control and movement. The z component of the forces is not shown but is in the negative z direction, enabling hover. For example, aircraft 23000, as illustrated in FIG. 27, includes thrustors and flaps consistent with FIGS. 5-8 and 10-12. By actuating the flaps on each wing to appropriate angles in accordance with the tables above, the forces as shown by the arrows may be generated to achieve longitudinal control and movement in the negative x direction.

Figure 28:
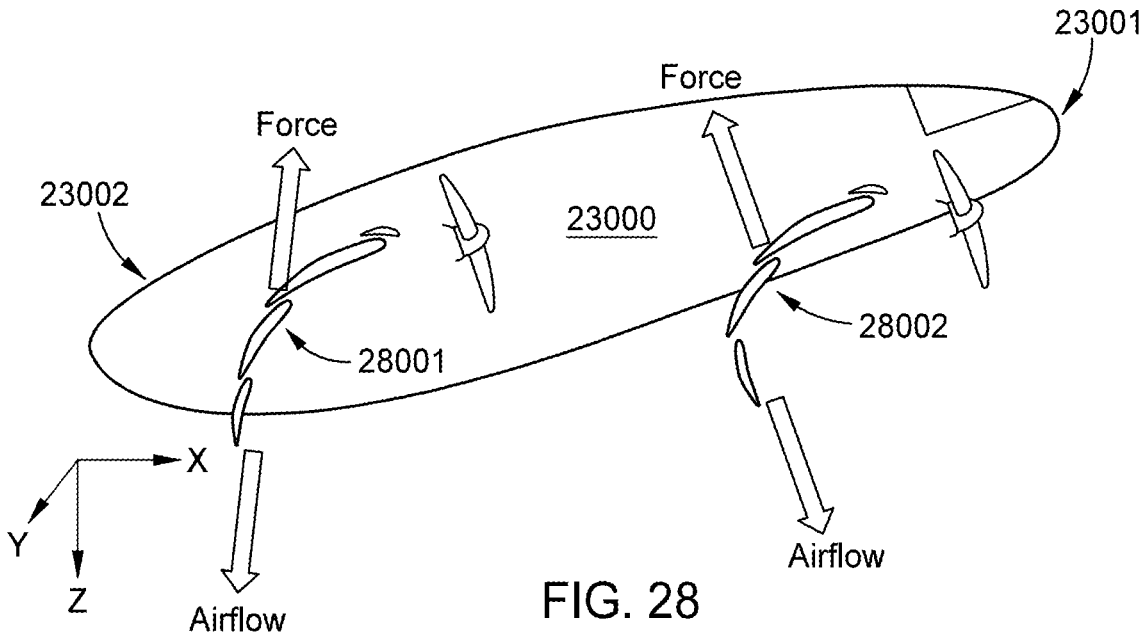
FIG. 28 is a sideview diagram of the right side of an aircraft illustrating pitch control, in accordance with an embodiment of the present invention.

FIG. 28 is a sideview diagram of the right side of an aircraft as an embodiment of the invention, illustrating pitch control. Flap systems are in their extended positions on forward wings 28002 and rear wings 28001, respectively, which are straight wings as shown in FIG. 28, but which may alternatively be swept wings. Initially, aircraft 23000 has flap systems extended and may be in a steady state of hover with minimal or no pitch. In order to increase pitch, force in the negative z direction is increased at the forward wings 28002, e.g. by increasing thrust and/or use of slats or other appropriate methods. With increased negative z force acting upon the forward wings 28002, the aircraft nose 23001 rises and become higher than the aircraft's rear 23002, thus pitching the aircraft upwards about the y axis. Positioned with such an upwards pitch attitude, the aircraft may then move in the negative x direction (backwards). If the aircraft or the aircraft operator wishes to counteract such movement in the negative x direction, then the flaps may be adjusted accordingly, e.g. flaps at the rear wings may be angled back toward the negative x direction.

In certain embodiments, depending on various factors including the configuration of flaps, thrustors, and wing, airflow in the AF3 direction as shown in FIGS. 17A-B may be difficult to achieve because a3 may be too great. Thus, in such certain embodiments, it may be difficult or impracticable to create force in the negative x direction. Further, only airflow in the AF1/AF2 directions may be achieved, resulting in at least some positive x force. In such certain embodiments, in order to counteract such positive x force from extended flap systems, and in order to maintain hovering in a fixed position (or to move longitudinally backward in the negative x direction), the aircraft would pitch upward (nose 23001 upward). In certain embodiments, the pitch would vary from 12-18 degrees—a similar range to conventional aircraft pitching upward upon takeoff.

In an embodiment, the techniques discussed above can be used to control movement in individual directions (e.g., yaw, lateral movement, or longitudinal movement). Further, these techniques can be used to move in multiple directions simultaneously (e.g., while maintaining hover). For example, the aircraft could be controlled to pitch upward while moving laterally, or to yaw counterclockwise while moving sideways. This could be done using any suitable control architecture (e.g., as described below in relation to FIGS. 32-33), including fly by wire for a pilot or autonomous flight.

Figure 29:
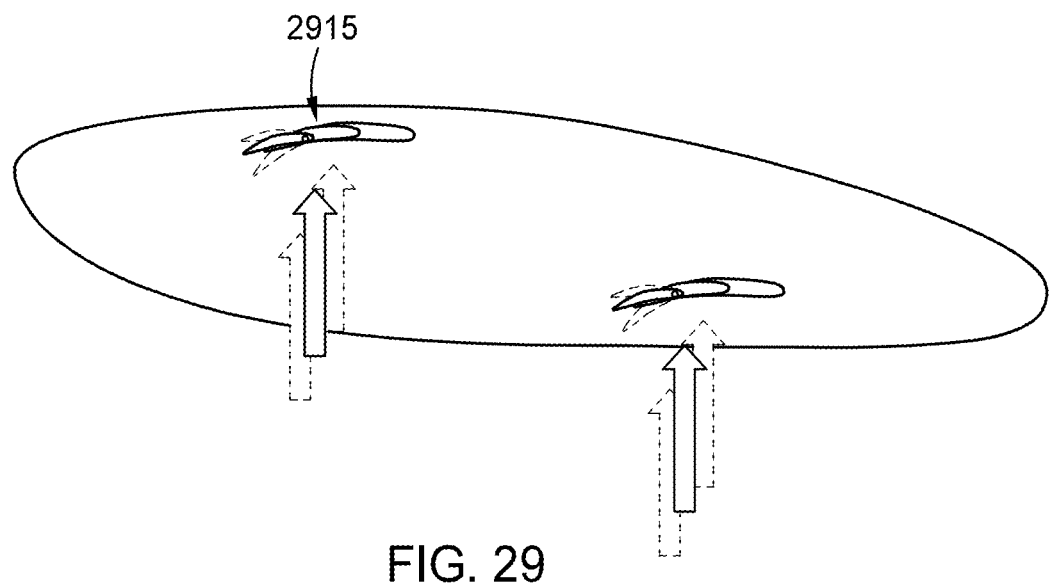
FIG. 29 illustrates articulation and rotation of a trailing flap, in accordance with an embodiment of the present invention.

FIG. 29 illustrates articulation and rotation of a trailing flap, in accordance with an embodiment of the present invention. Whereas FIGS. 9-12 illustrate an aircraft in an embodiment of the invention with flaps extended for flight in hover mode, FIGS. 13-16 illustrate an aircraft in an embodiment of the invention with flaps retracted such that the wings act as typical aircraft wings for flight. As shown in FIG. 29, with the flaps retracted, a trailing flap may nevertheless be articulated and rotated around a pivot point 2915 (e.g., a pivot point for the flap, or any suitable portion of the flap), resulting in a flap, or a portion of a flap, being positioned in various angles.

Figure 30:
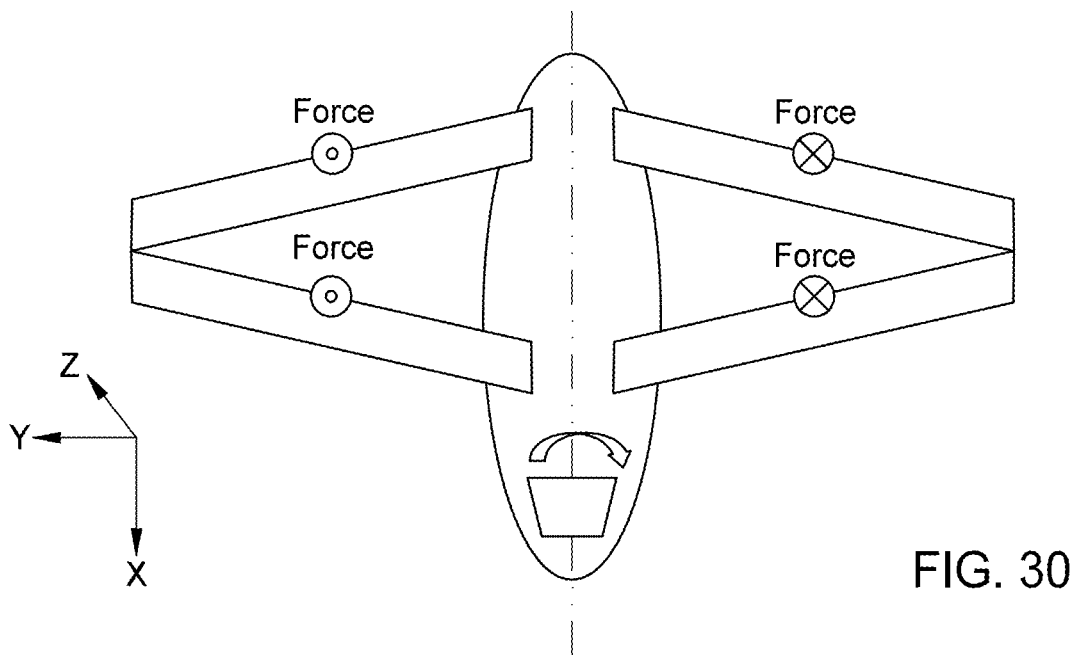
FIG. 30 illustrates an aircraft with flaps retracted such that they operate as ailerons in flight, in accordance with an embodiment of the present invention.

FIG. 30 illustrates an aircraft in an embodiment of the invention with flaps retracted such that they operate as ailerons, elevators, or both, in flight. In an embodiment, FIG. 30 focuses on illustrating the difference in z force between wings to achieve certain control and movement. The mean z component of the forces is not shown but is in the negative z direction, enabling level flight. Specifically, some or all of the flaps placed spanwise across the aircraft's two left wings are pivoted upward. This creates a force in the downward (positive z direction) on the aircraft's left wings. Some or all of the flaps placed spanwise across the aircraft's two right wings may additionally be pivoted downward. This would create a force in the upward (negative z direction) on the aircraft's right wings. In this arrangement, the flaps act as ailerons and cause the aircraft to roll left about the x axis. Conversely, if the flaps were pivoted in the opposite directions, then the aircraft would roll right about the x axis.

Figure 31:
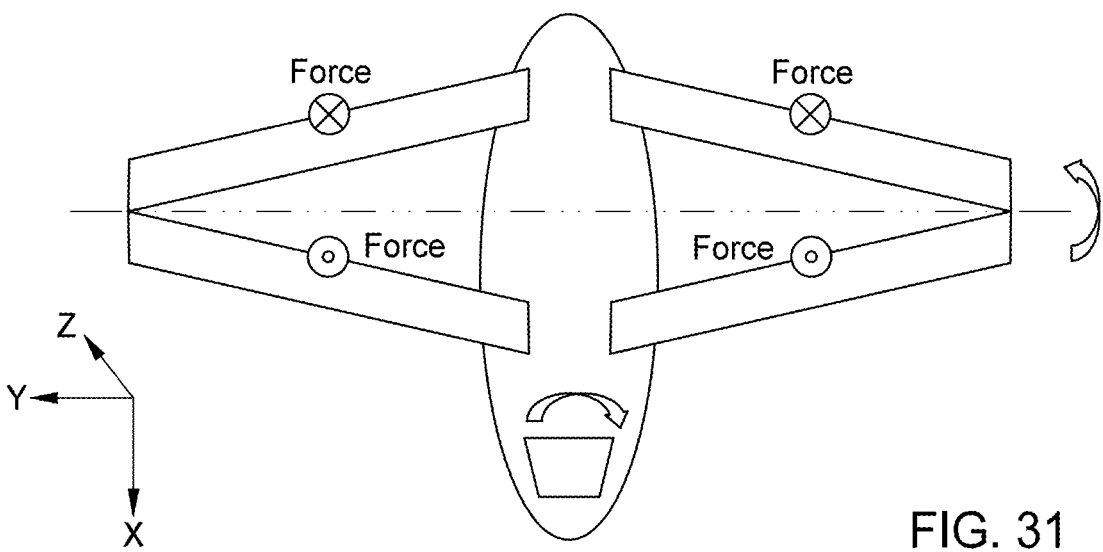
FIG. 31 illustrates an aircraft with flaps retracted in flight, in accordance with an embodiment of the present invention.

FIG. 31 illustrates an aircraft in an embodiment of the invention with flaps retracted in flight. In an embodiment, FIG. 31 focuses on illustrating the difference in z force between wings to achieve such control and movement. The mean z component of the forces is not shown but is in the negative z direction, enabling level flight. Specifically, some or all flaps placed spanwise across the aircraft's two forward wings are pivoted downward. This creates a force in the upward (negative z direction) on the aircraft forward wings. Some or all of the flaps placed spanwise across the aircraft's two rear wings may additionally be pivoted upward. This would create a force in the downward (positive z direction) on the aircraft rear wings. In this arrangement, the flaps on the rear wings act as elevators, and the aircraft would tend to pitch upward about the y axis. Conversely, if the flaps were arranged in the opposite angles, the aircraft would pitch downward about the y axis.

Figure 32:
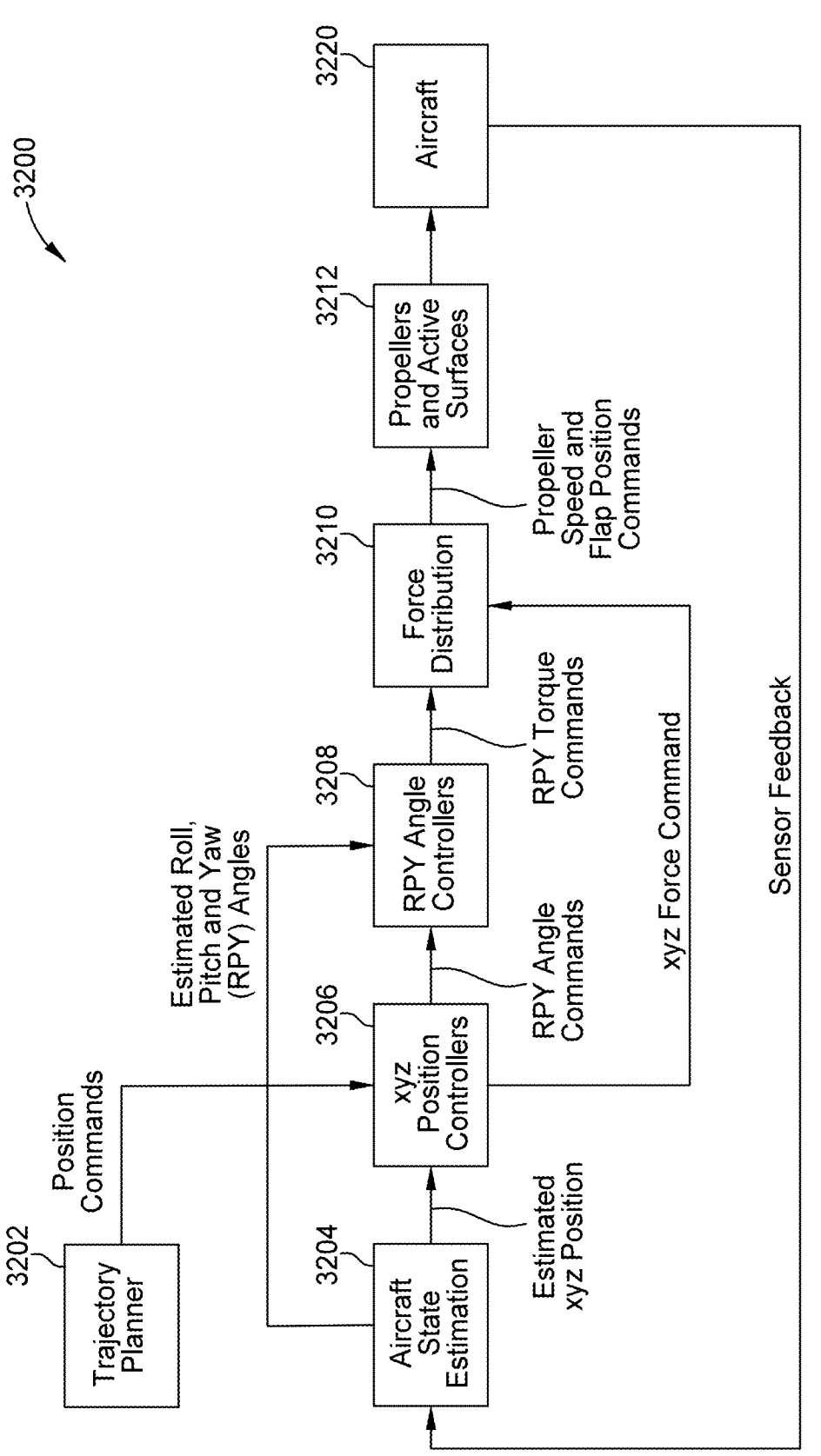
FIG. 32 illustrates a flight control architecture, in accordance with an embodiment of the present invention.

FIG. 32 illustrates a flight control architecture 3200, in accordance with an embodiment of the present invention. In an embodiment, a trajectory planner 3202 provides position commands for an aircraft (e.g., an aircraft 3220) to an XYZ position controller 3206. The XYZ position controller 3206 further receives an estimated XYZ position for the aircraft, from an aircraft state estimation 3204. The XYZ position controller 3206 generates roll, pitch, and yaw (RPY) angle commands for the aircraft (e.g., based on one, or both, of the received position commands and estimated XYZ position) and transmits the RPY angle commands to one or more RPY angle controllers 3208.

In an embodiment, the RPY angle controllers 3208 generate RPY torque commands, and transmit the RPY torque commands to a force distribution (e.g., a force distribution controller) 3210. Further, in an embodiment, the XYZ position controllers 3206 generate XYZ force commands, and transmit the XYZ force commands to the force distribution 3210. The force distribution 3210 generates propeller speed and flap position commands (e.g., based on one, or both, of the RPY torque commands and the XYZ force command). The force distribution 3210 transmits the propeller speed and flap position commands to propellers and active surfaces 3212 for an aircraft 3220. In an embodiment, the aircraft 3220 further transmits sensor feedback to the aircraft state estimation 3204, which the aircraft state estimation can use to modify the estimated aircraft state (e.g., to modify the estimated XYZ position for transmission to the XYZ position controllers 3206). The techniques illustrated in FIG. 32 are merely one example of a control architecture (e.g., to control an aircraft 3220 according to any of the embodiments described above or below), and any suitable flight control architecture can be used. For example, depending on various factors (application, the mode of flight, economics, redundancy, precision required, etc.) certain controllers shown in FIG. 32 may be omitted or replaced, and certain controllers (e.g. velocity controller) may be added (e.g. to support cruise mode). Further, the order in which controllers operate may be re-organized, and certain controller functions may be combined.

Figure 33:
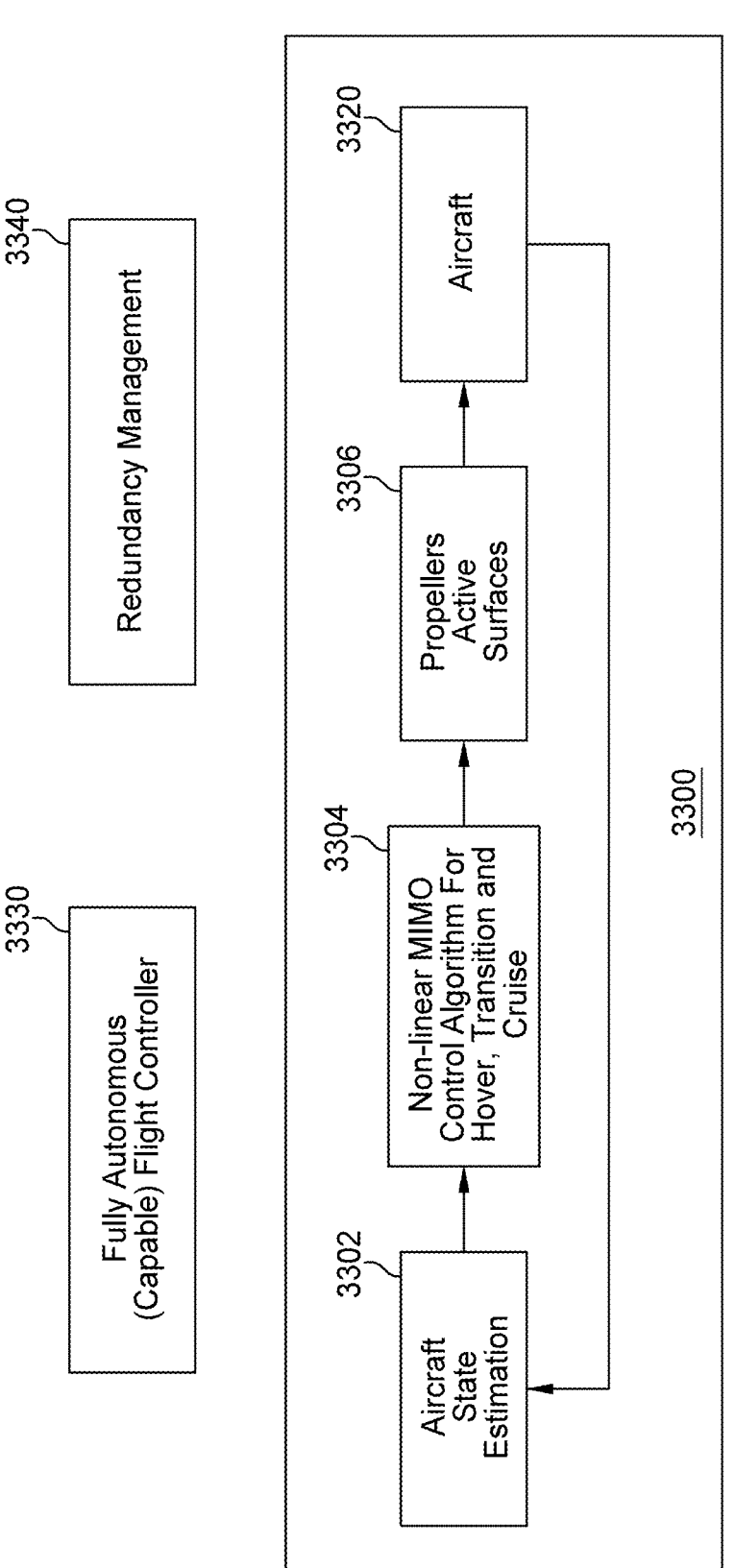
FIG. 33 illustrates a further flight control architecture, in accordance with an embodiment of the present invention.

FIG. 33 illustrates a further flight control architecture 3300, in accordance with an embodiment of the present invention. In an embodiment, an aircraft state estimation 3302 provides state information (e.g., estimated XYZ position) to a control algorithm 3304 for any, or all, of hover, transition, and cruise. In an embodiment the control algorithm 3304 is a non-linear multiple-input-multiple-output control algorithm. This is merely one example, and any suitable control algorithm can be used.

In an embodiment, the control algorithm 3304 controls propellers and active surfaces 3306 for an aircraft 3320. For example, the control algorithm 3304 can provide propeller speed and flap position commands to control the propellers and active surfaces 3306 for the aircraft 3320. The aircraft 3320 can provide feedback to the aircraft state estimation 3302 (e.g., sensor feedback). The techniques illustrated in FIG. 33 are merely one example of a control architecture (e.g., to control an aircraft 3320 according to any of the embodiments described above), and any suitable flight control architecture can be used.

In an embodiment, the flight control architecture 3300 can be used for a fully autonomous (capable) flight controller 3330. Alternatively, or in addition, the flight control architecture 3300 can be used for redundancy management 3340. These are merely examples, and the flight control architecture 3300 can be used for any suitable purpose.

Figure 34:
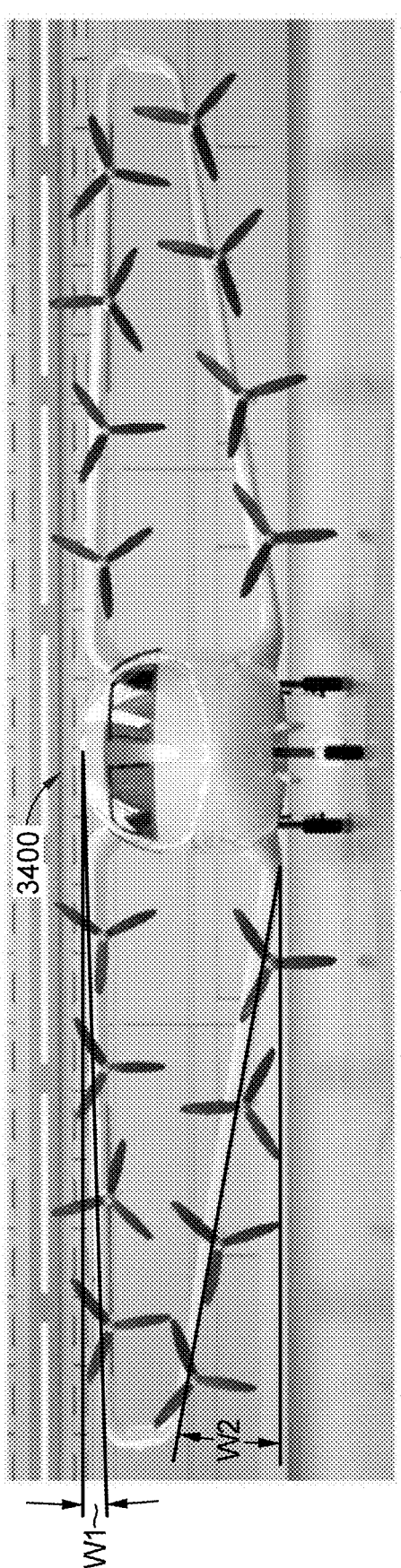
FIG. 34 illustrates a frontal perspective of an aircraft in accordance with an embodiment of the present invention.

FIG. 34 illustrates a frontal perspective of an aircraft 3400 in accordance with an embodiment of the present invention. In an embodiment, additional design features or architectures may be utilized in accordance with aspects of the inventions. For example, the aircraft 3400 includes top and bottom wings that are not horizontally aligned, and are not parallel with each other. As shown in FIG. 34, a top wing is angled downward at an angle W1. Because of this W1 angle, when that wing has its flaps extended for hover, an additional force is created in the positive Y direction. Also shown in FIG. 34, the aircraft 3400 includes a bottom wing angled upward at an angle W2. Because of this W2 angle, when that wing has its flaps extended for hover, an additional force is created in the negative Y direction. In an embodiment, the flight control architecture 3300 illustrated in FIG. 33, above, accounts for these additional forces that are created by these angles when controlling for hover, yaw rotation, longitudinal or lateral translative movement, pitch control, etc. In an embodiment, the angles W1 and W2 may be chosen to benefit the lateral stability of the aircraft. Further, in various embodiments W1 and W2 may be equal, may be not equal, may be both positive, may be both negative, may be positive and negative or vice versa, may be zero or non-zero.

Figure 35:
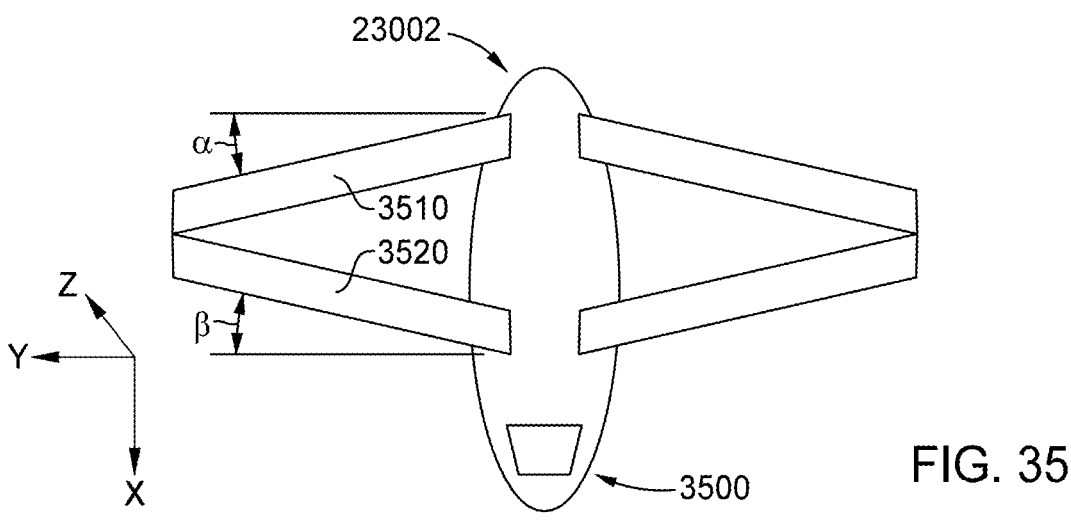
FIG. 35 illustrates a top view of an aircraft in accordance with an embodiment of the present invention.

FIG. 35 illustrates a top view of an aircraft 3500 in accordance with an embodiment of the present invention. In an embodiment, the aircraft 3500 includes rear wings 3510 positioned at angle α, and forward wings 3520 positioned at angle 3. Angles α and β affect the x and y forces produced, which may be accounted for and utilized by the flight control architecture 3300 illustrated in FIG. 33, above. For example, a greater angle α would result in a greater force in the y direction where flaps are extended in a hover mode. This potentially could allow for greater lateral force and movement. In an embodiment, the angles α and β may also be chosen to improve other aspects of the aircraft performance and/or stability, such as to delay shock wave formation at higher speeds. Further, in various embodiments α and β may be equal, may be not equal, may be both positive, may be both negative, may be positive and negative or vice versa, may be zero or non-zero.

Figure 36:
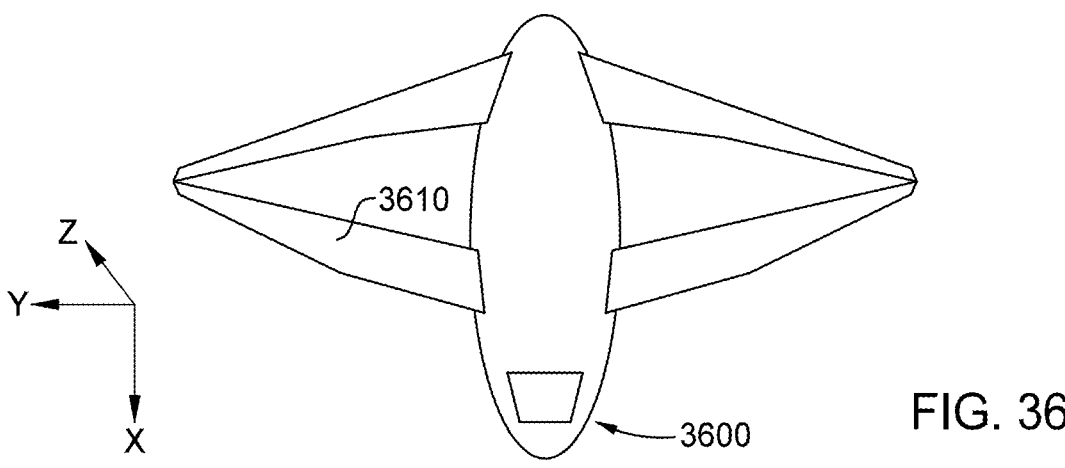
FIG. 36 illustrates a further aircraft in accordance with an embodiment of the present invention from a top view.

FIG. 36 illustrates a further aircraft 3600 in accordance with an embodiment of the invention. While FIG. 22, for example, shows wings that are not tapered along the span of the wings, that need not be the case. As FIG. 36 shows, the aircraft wings 3610 may be tapered in any appropriate configuration along the span of the wings. As one of skill in the art will appreciate, a decrease in a wing's length along the chordwise direction may impact the x, y, and z forces generated while flaps are extended in hover mode, which, in an embodiment, are accounted for by flight control architecture 3300 illustrated in FIG. 33.

Figure 37:
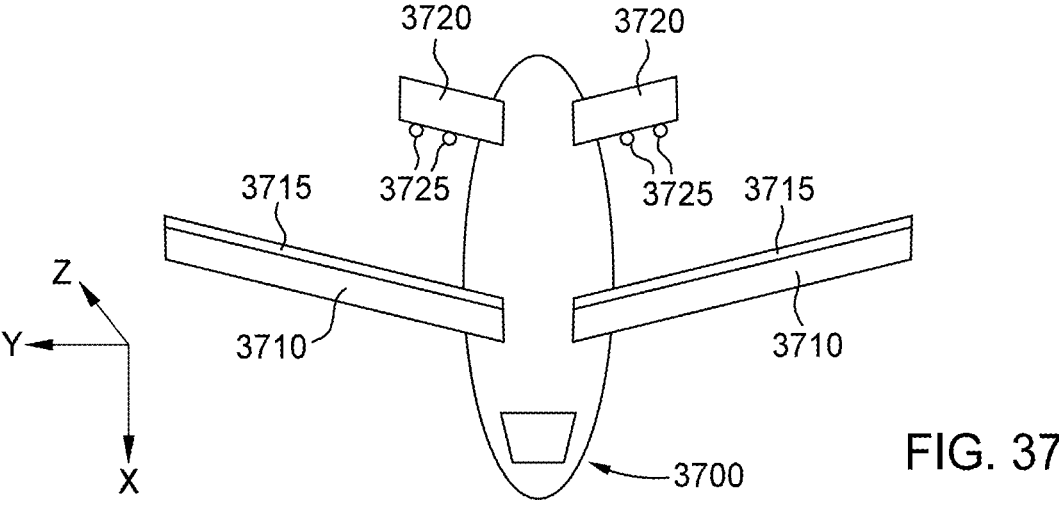
FIG. 37 illustrates a top view of an aircraft utilizing tilt rotor thrustors in accordance with an embodiment of the present invention.

FIG. 37 illustrates a top view of an aircraft 3700 utilizing tilt rotor thrustors in accordance with an embodiment of the present invention. In an embodiment, additional alternative architectures to those described above can be used in accordance with embodiments of the invention. While extended flaps may be used to achieve the deflected slipstream effect for force in the negative z direction, enabling hover, such flaps may also be used in combination with other mechanisms in any appropriate location for achieving vertical lift during hover. For example, in FIG. 37, forward wings 3710 may utilize flaps 3715, whereas rear wings 3720 may utilize tilt-rotor thrustors 3725. One example of a tilt-rotor thrustor is that featured by the Bell Boeing V-22 Osprey.

Figures 38, 39, 40:
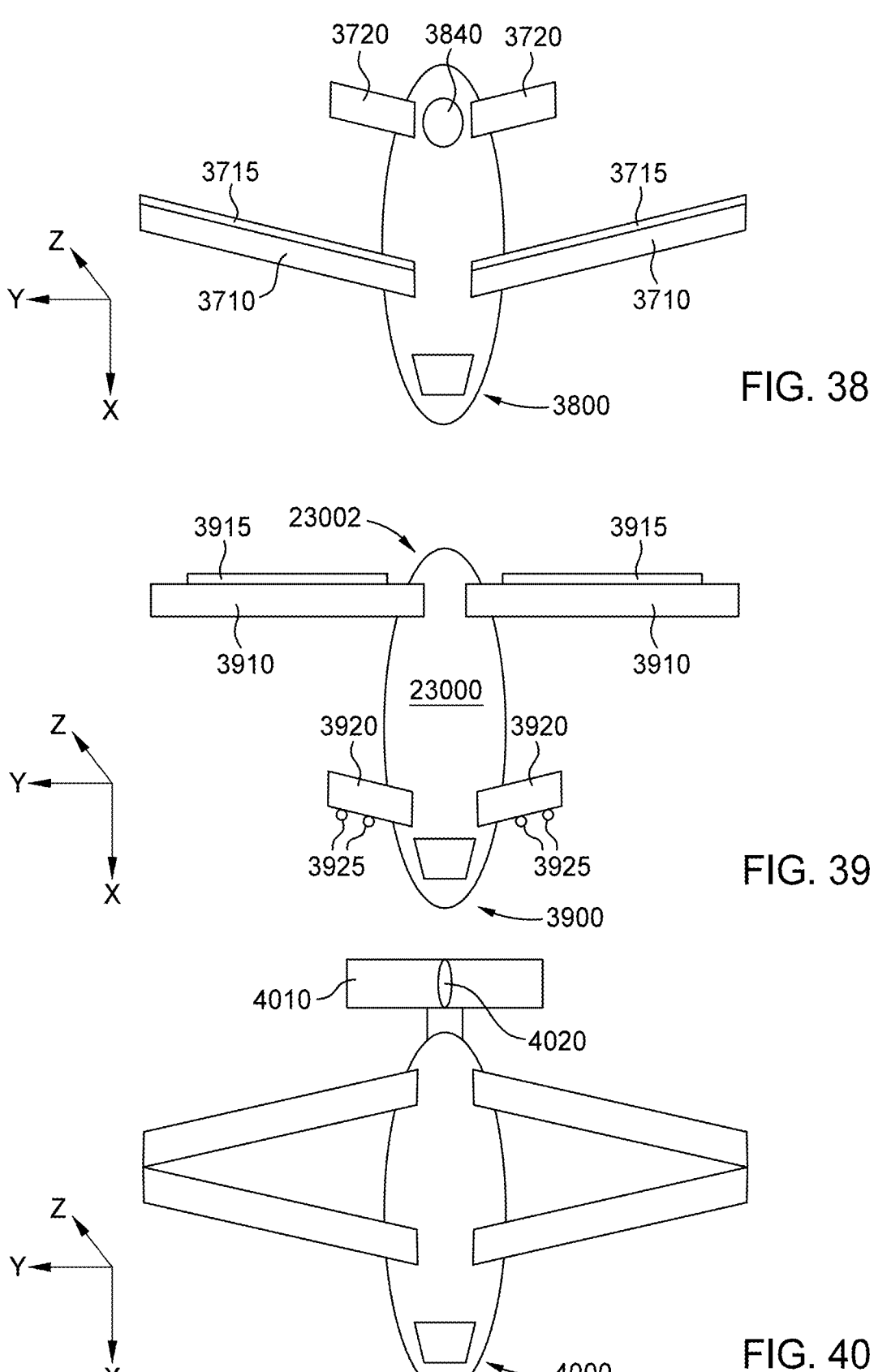
FIG. 38 illustrates a top view of a further aircraft in accordance with an embodiment of the present invention.
FIG. 39 illustrates a top view of a further aircraft in accordance with an embodiment of the present invention.
FIG. 40 illustrates a further aircraft with a horizontal and vertical tail in accordance with an embodiment of the present invention.

Alternatively, rear wings 3720 may utilize flaps whereas forward wings 3710 may utilize tilt-rotor thrustors. By utilizing tilt-rotor thrustors instead of flaps along one or more wings, certain control authority (e.g. yaw, longitudinal, lateral, pitch) may be limited, depending for example upon tilt-rotor's axis of rotation. For example, an aircraft as illustrated in FIG. 38, below, with flaps on its forward, backward-swept wings and tilt-rotor thrustors on its rear, backward-swept wings may have limited lateral movement capability if the tilt-rotors rotate strictly about the y axis. Such an aircraft, however, would retain some yaw control authority. In another embodiment, wings (forward or rear) may feature flaps along a certain portion(s) along the span of the wing and tilt-rotor thrustors along other portion(s) along the span of the wing.

FIG. 38 illustrates a top view of a further aircraft 3800 in accordance with an embodiment of the present invention. In an embodiment, FIG. 38 illustrates an alternative architecture, whereby forward wings 3710 utilize flaps 3715, as discussed above in relation to FIG. 37, but a lift fan or a swivel duct (e.g. Lockheed Martin's F-35B) 3840, is located at the rear of the aircraft to provide vertical lift at that position during hover. Such a fan or duct may also (alternatively or in addition) be positioned at the aircraft's nose or middle section(s), rather than only at the rear. Furthermore, such fans and ducts may be utilized alternatively or in addition to flaps and/or tilt-rotor thrustors as discussed above. By utilizing such fans or ducts instead of flaps along one or more wings, certain control authority (e.g. yaw, longitudinal, lateral, pitch) may be more limited.

FIG. 39 illustrates a top view of a further aircraft 3900 in accordance with an embodiment of the present invention. In an embodiment, FIG. 39 illustrates an alternative architecture in an embodiment of the invention, whereby forward wings 3920 (which could also be called canards) utilize tilt-rotor thrustors 3925, and rear wings 3910 utilize flaps 3915. In this embodiment where the rear wings 3910 are straight (e.g., not forward- orbackward-swept), control authority in the y directions via extended flaps at those wings may be more limited.

It should be understood from FIGS. 36-39 and prior discussion, that in accordance with embodiments of this invention, wings of varying lengths may be utilized, sets of forward and rear wings may be attached or not, and wings may be forward- or backward-swept or straight. Any appropriate combination of flaps, tilt-rotor thrustors and/or ducts or fans may be used, in various position of the aircraft. Furthermore, where tilt-rotor thrustors and/or ducts or fans are used to provide vertical lift, embodiments of the invention may include only one set of wings. For example, tilt rotor thrustors 3725 of FIG. 37 may be attached to struts instead of wings 3720.

FIG. 40 illustrates a further aircraft 4000 with a horizontal and vertical tail in accordance with an embodiment of the present invention. In an embodiment, one or more tails may be utilized, and they may feature horizontal and/or vertical stabilizers. For example, FIG. 40 shows the aircraft 4000 with a horizontal tail 4010 and a vertical tail 4020 located behind the aircraft's main wings. Further embodiments of the invention may include V-shaped tails, T-shaped tails and/or any other combination of surfaces to enhance the aerodynamic stability and/or performance of the aircraft.

Figure 41A:
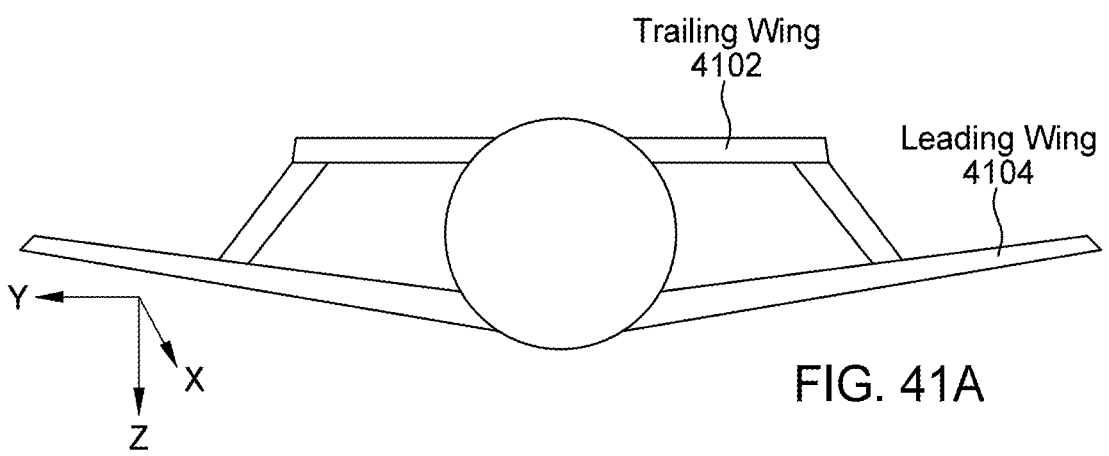
FIGS. 41A-B illustrate wing joining configurations, in accordance with an embodiment of the present invention.

FIG. 41A illustrates a wing joining configuration, in accordance with an embodiment of the present invention. In an embodiment, a trailing wing 4102 joins a leading wing 4104 at the mid-span of the leading wing. This is merely an example, and the trailing wing 4102 can join the leading wing 4104 at any suitable location on the leading wing.

Figure 41B:
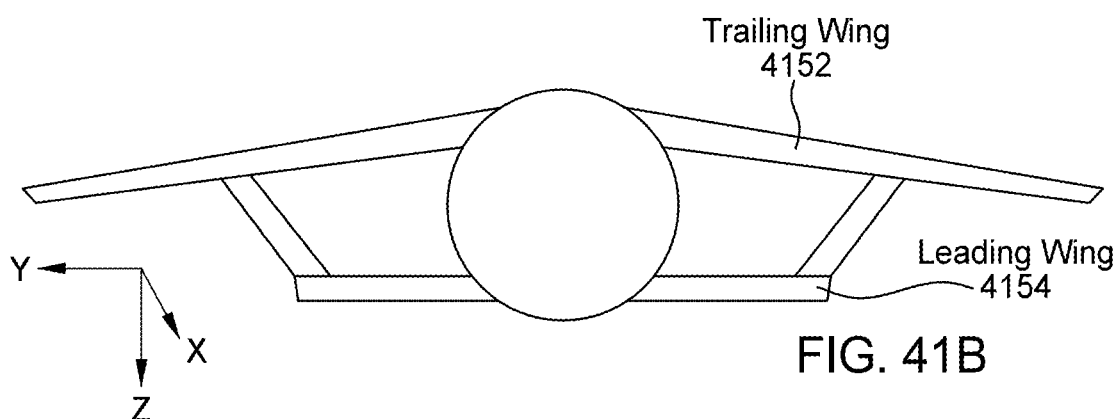

FIG. 41B illustrates a further wing joining configuration, in accordance with an embodiment of the present invention. In an embodiment, a leading wing 4154 joins a trailing wing 4152 at the mid-span of the trailing wing. This is merely an example, and the leading wing 4154 can join the trailing wing 4152 at any suitable location on the trailing wing.

Further, the configurations illustrated in FIGS. 41A-B are merely examples. Any suitable combination of wings can be joined at any suitable location.

In addition, while FIG. 41A and FIG. 41B illustrate embodiments where the leading wing is situated below the trailing wing, the wings may be located in any other suitable relative position, e.g. leading wing above trailing wing.

Figure 42A:
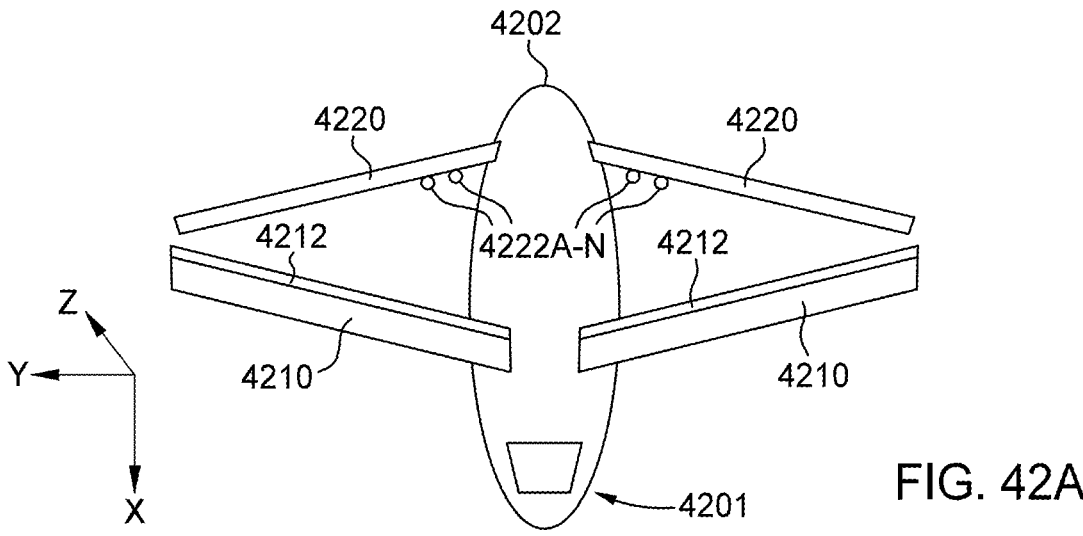
FIG. 42A illustrates a top view of a further aircraft in accordance with an embodiment of the present invention.

FIG. 42A illustrates a top view of a further aircraft 4200 in accordance with an embodiment of the present invention. In an embodiment, the aircraft 4200 provides another configuration for the aircraft discussed above (e.g., the aircraft 23000 discussed above, in relation to FIGS. 5-8, 17A-B, 22-28, and 39). The aircraft 4200 includes rear wings 4220 and forward wings 4210. The front of the aircraft 4200 is marked by reference number 4201 while the rear of the aircraft is marked by the reference number 4202.

In an embodiment, the aircraft 4200 uses a combination of flaps and propellers for control (e.g., any, or all, of longitudinal, lateral, or pitch control). For example, the forward wings 4210 can include flaps 4212 while the rear wings 4220 use one or more propellers 4222A-N. In an embodiment, the propellers 4222A-N can be located in front of the rear wings 4220, embedded on the rear wing 4220, behind the rear wing 4220, or in any other suitable location. Further, in an embodiment one or more of the propellers 4222A-N are oriented horizontally in a flat plane parallel to the ground (e.g., akin to a helicopter). For example, the propellers 4222A-N can be oriented upwards, with a tilt in the roll axis (e.g., a 10 degree tilt or any other suitable tilt). This is merely an example, and any, or all, of the propellers 4222A-N can be oriented in any suitable direction.

As illustrated, the rear wings 4220 include four propellers 4222A-N, but this is merely an example. The rear wings 4220 can use any suitable number of propellers 4222A-N. Further, the propellers 4222A-N can tilt, remain stationary, or any combination of the two. While FIG. 42A illustrates the forward wings 4210 with flaps 4212 and the rear wings 4220 with propellers 4222A-N, this is merely an example. Alternatively, the rear wings 4220 can use flaps and the forward wings 4210 can use propellers. In an embodiment, the propellers 4222A-N assist with lift, particularly in a hover or vertical takeoff configuration. Further, in an embodiment, the flaps 4212 can be actuated to provide control (e.g., yaw control).

The aircraft 4200 illustrates the forward wings 4210 and the rear wings 4220 in a swept configuration. This is merely an example. Alternatively, one or both of the forward wings 4210 and the rear wings 4220 can be in a parallel configuration.

Figure 42B:
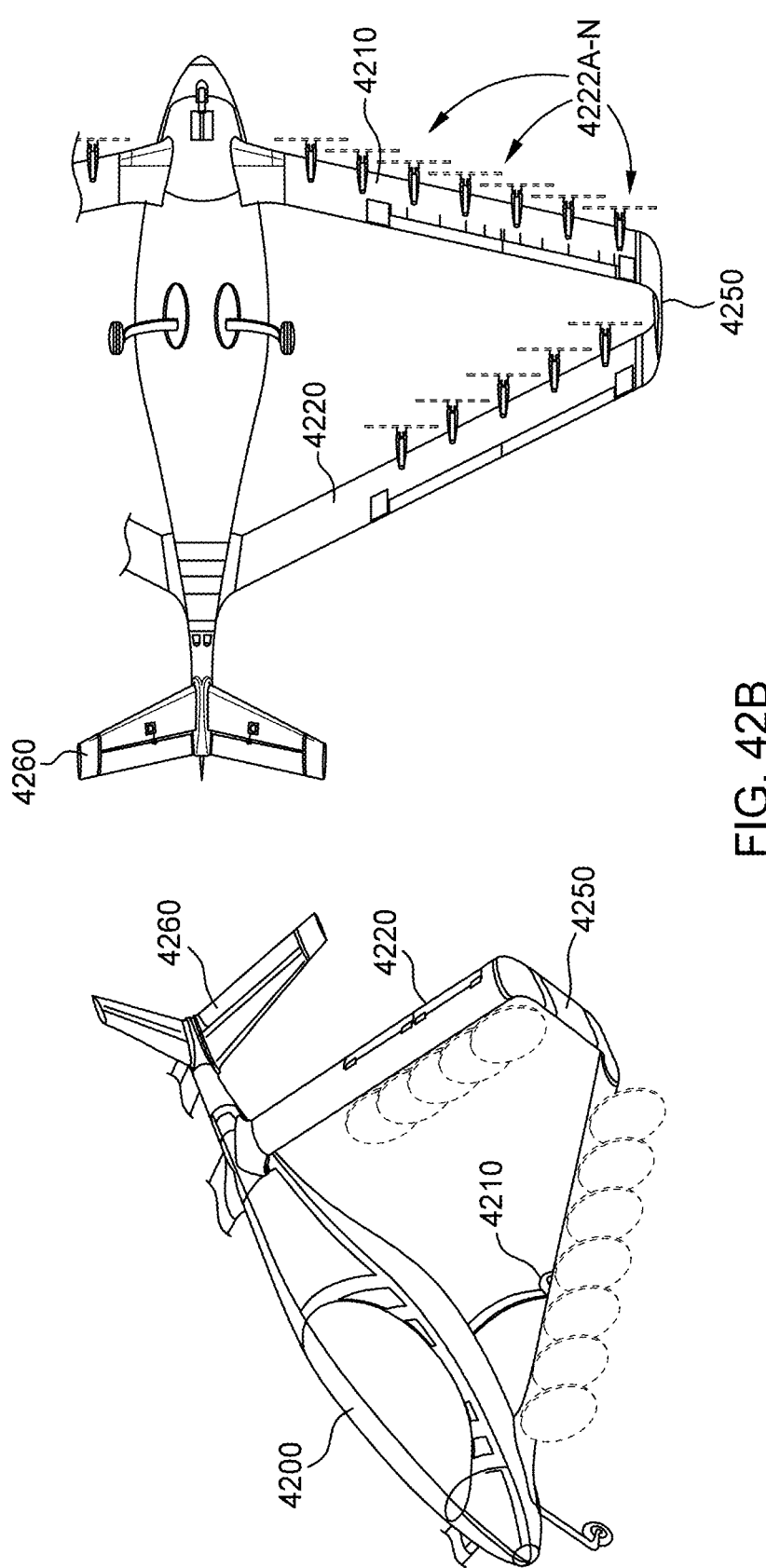
FIG. 42B illustrates further configurations of the aircraft, according to one embodiment.

FIG. 42B illustrates further configurations of the aircraft 4200, according to one embodiment. In an embodiment the aircraft 4200 includes connectors 4250 coupling the forward wings 4210 and rear wings 4220. In an embodiment, the winglets 23300 illustrated in FIG. 20 are examples of connectors 4250. These connectors 4250 can provide both aerodynamic and structural advantages. For example, the connectors 4250 can be structural connectors and assist with torsional strain. Further, the connectors 4250 can reduce flutter and avoid flutter failure, and can reduce wingtip vortices.

Further, the aircraft 4200 can include a tail 4260. The tail 4260 can be any suitable shape and configuration, including v-shaped, and can include one or more moving rotors or any other suitable components. For example, the tail 4260 can include one or more embedded moving rotors (e.g., embedded within the tail 4260). As another example, the tail 4260 can include one or more external moving rotors (e.g., mounted to the tail 4260). The moving rotors can be oriented in any suitable direction to provide control. For example, the moving rotors can be oriented perpendicular to the ground to provide control (e.g., yaw control).

One, or both, of the wings 4210 and 4220 can further include one or more propellers 4222A-N as discussed above in relation to FIG. 42A. These propellers can be stationary or tilting.

Figure 43:
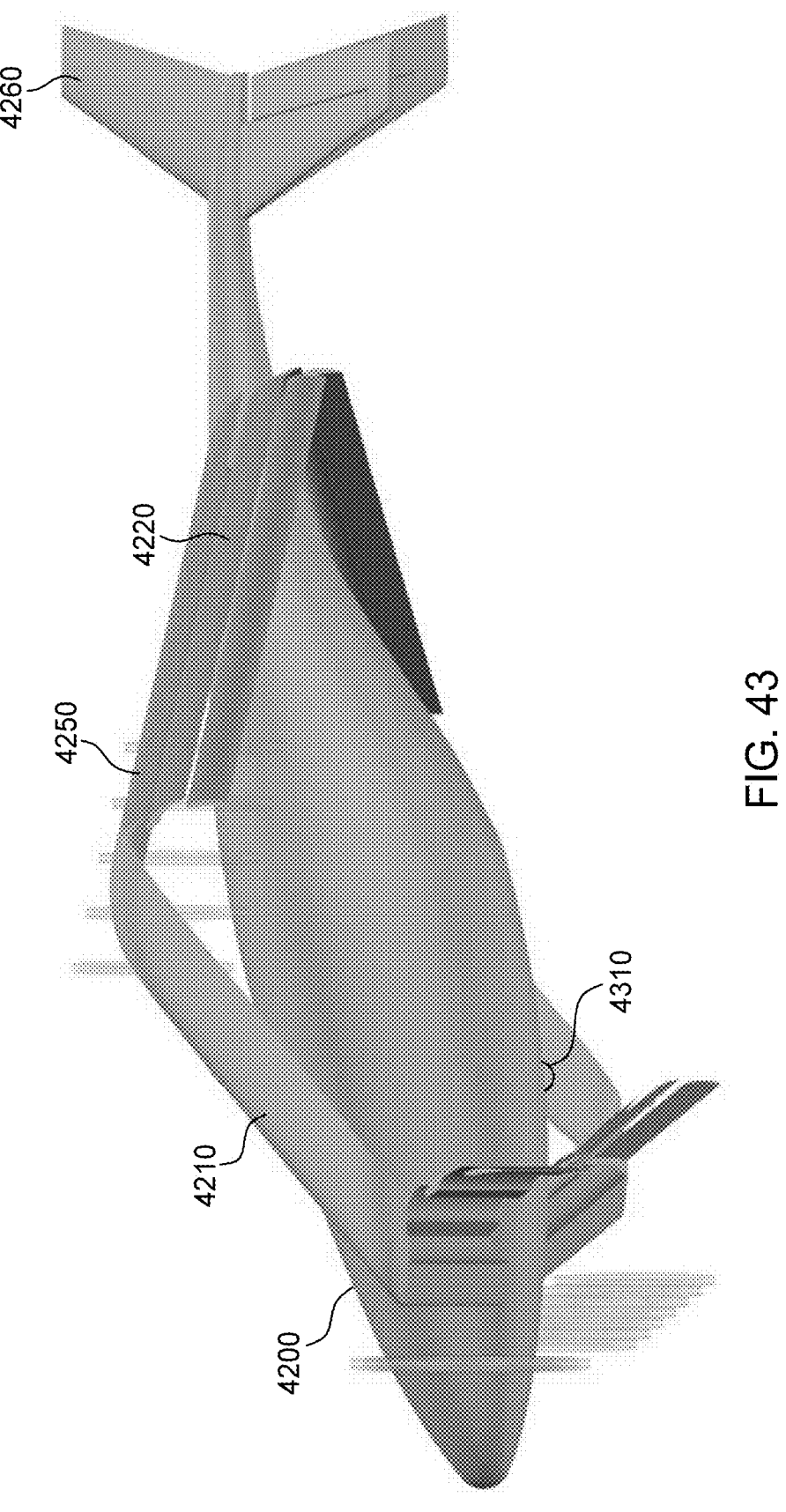
FIG. 43 illustrates an aircraft load center in accordance with an embodiment of the present invention.

FIG. 43 illustrates an aircraft load center in accordance with an embodiment of the present invention. An aircraft 4200 includes forward wings 4210 and rear wings 4220. The aircraft 4200 further includes wing connectors 4250 and a tail 4260. In an embodiment, the aircraft 4200 includes a load center 4310. In an embodiment, the aircraft 4200 has a configuration that places the load center 4310 off the forward wings 4210, as illustrated in FIG. 43. Controlling a load center location (i.e., with respect to the center of gravity) while changing aircraft configuration can be very important for vehicle control (e.g., through transition from vertical to horizontal flight, or vice-versa).

Figure 44:
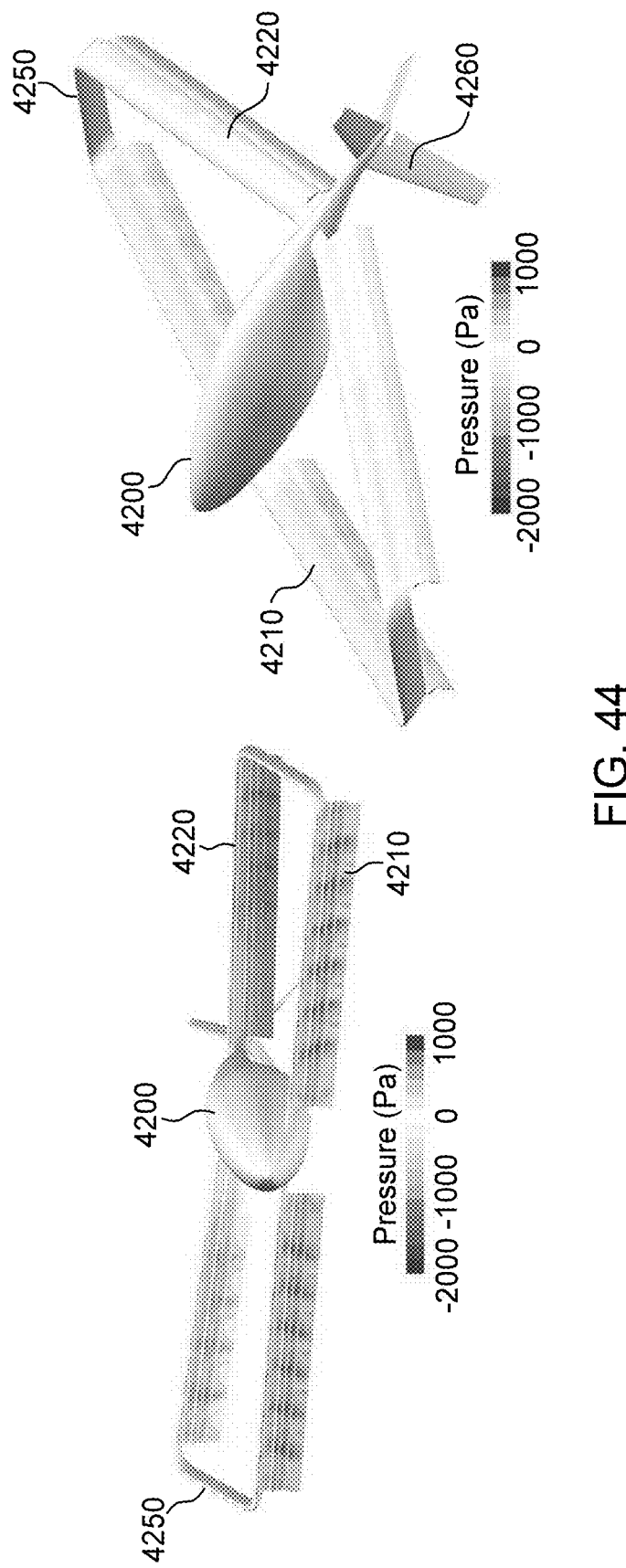
FIG. 44 illustrates wing loading fluid dynamics for an aircraft in accordance with an embodiment of the present invention.

FIG. 44 illustrates wing loading fluid dynamics for an aircraft 4200 in accordance with an embodiment of the present invention. The aircraft 4200 includes forward wings 4210 and rear wings 4220. In an embodiment, FIG. 44 illustrates the effect of the forward wings 4210 on the air pressure present at the rear wings 4220. As illustrated, the air pressure at the rear wings 4220 is significantly reduced by the position of the forward wings 4210. This decreases the load on the rear wings 4220. This is discussed further, below, with regard to FIGS. 45-46. In an embodiment, the rear wings 4220 can be twisted or moved to change the air pressure present at the rear wings 4220.

Figure 45:
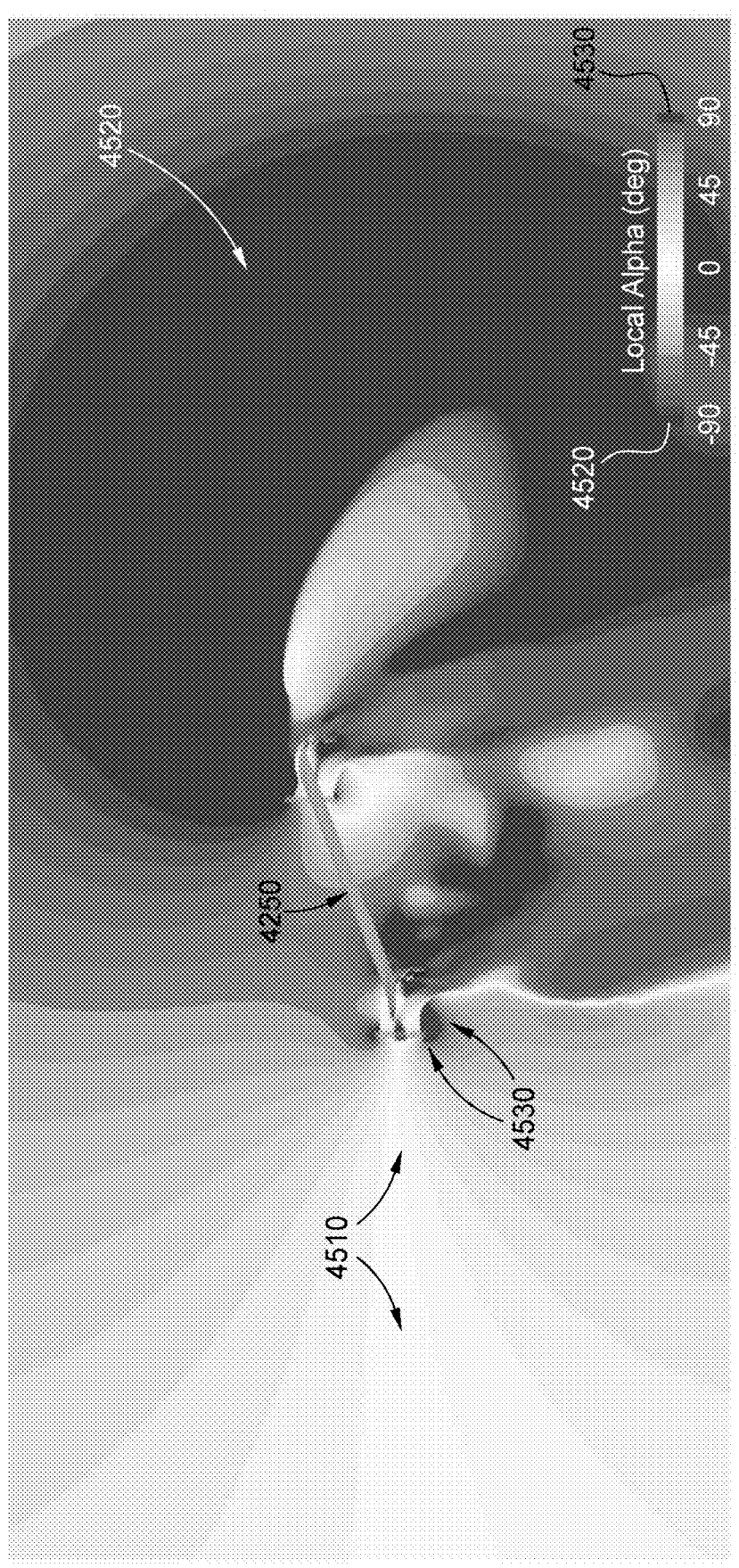
FIG. 45 illustrates forward wing and rear wing fluid dynamics for an aircraft in accordance with an embodiment of the present invention.

FIG. 45 illustrates forward wing and rear wing fluid dynamics for an aircraft in accordance with an embodiment of the present invention. In an embodiment, FIG. 45 illustrates local airflow incidence angle on a longitudinal plane (i.e., an XZ plane as illustrated in FIG. 45) through the middle of the wing span. The wing connector 4250 (e.g., for the aircraft 4200 illustrated in FIGS. 42A-44) is between the viewer and the plane, hence visible in the illustration. The unshaded region 4510 illustrates horizontal flow. The shaded region 4530 illustrates flow moving upwards. The shaded region 4520 illustrates flow moving downwards. As shown, the presence of the forward wings (e.g., the forward wings 4210 illustrated in FIGS. 42A-44) induces downwash on the rear wings (e.g., the rear wings 4220 illustrated in FIGS. 42A-44).

Figure 46:
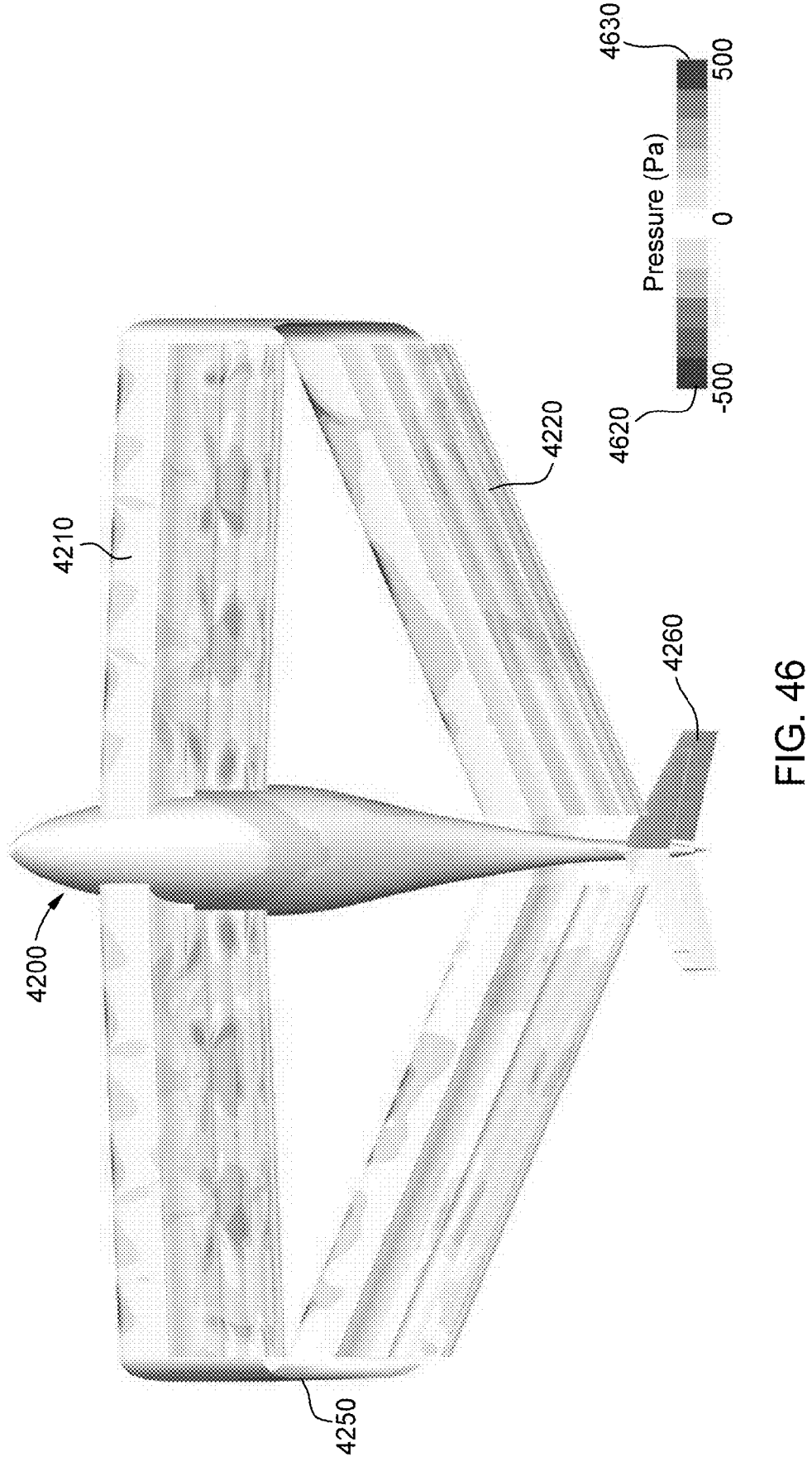
FIG. 46 further illustrates forward wing and rear wing fluid dynamics for an aircraft, from a bottom perspective, in accordance with an embodiment of the present invention.

FIG. 46 further illustrates forward wing and rear wing fluid dynamics for an aircraft, from a bottom perspective, in accordance with an embodiment of the present invention. An aircraft 4200 includes forward wings 4210, rear wings 4220, and wing connectors 4250. In an embodiment, FIG. 46 illustrates a bottom view of the forward wing induced downwash on the rear wings discussed above in relation to FIG. 45. As illustrated, the shading 4630 illustrates positive pressure while the shading 4620 illustrates negative pressure. Preferably, a wing in operation has positive pressure below the wing and negative pressure above the wing, to induce lift.

Figure 47:
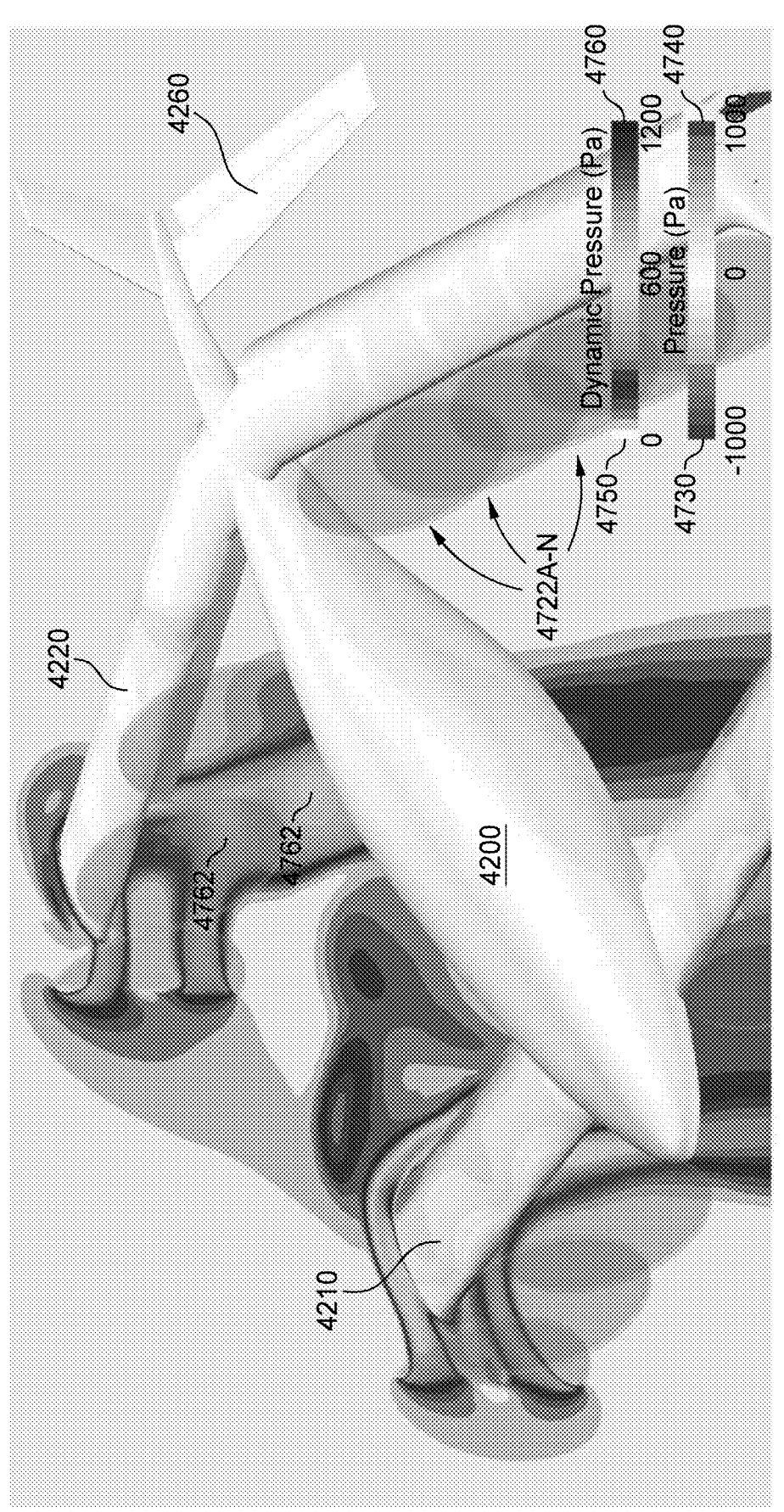
FIG. 47 illustrates propeller and wing interaction fluid dynamics for an aircraft in accordance with an embodiment of the present invention.

FIG. 47 illustrates propeller and wing interaction fluid dynamics for an aircraft in accordance with an embodiment of the present invention. An aircraft 4200 includes forward wings 4210 and rear wings 4220. The rear wings 4220 include one or more propellers 4722A-N. As discussed above, the rear wings 4220 can include any suitable number of propellers 4722A-N, and the propellers 4722A-N can operate in any suitable configuration (e.g., stationary, tilting, or any other suitable configuration).

In an embodiment, FIG. 47 illustrates an air pressure interaction between the propellers 4722A-N and the forward wings 4210. In an embodiment the aircraft 4200 includes flaps on both the forward wings 4210 and the rear wings 4220. As illustrated, the flaps are extended on both the forward wings 4210 and the rear wings 4220. In an embodiment, the propellers 4722A-N are installed with a horizontal rotation axis and are sucking air over the front wing 4210, as illustrated by the shading 4760 over the front wing. This improves lift on the front wing 4210 but also couples front wing 4210 performance with rear propeller 4722A-N rotation rate. This is merely an example, and the propellers 4722A-N can be oriented in any suitable direction.

In an embodiment the shading 4740 illustrates positive pressure areas (e.g., positive air pressure) and the shading 4730 illustrates negative pressure areas. Further, the shading 4760 illustrates relatively higher dynamic pressure (e.g., at region 4762) while the shading 4750 illustrates relatively lower dynamic pressure. As illustrated, the configuration of the aircraft 4200 generates load for vertical takeoff and hover. The flow from the propellers 4722A-N is directed downward (e.g., by the rear wings 4220), creating vertical airflow downwards and upwards lift.

Figure 48:
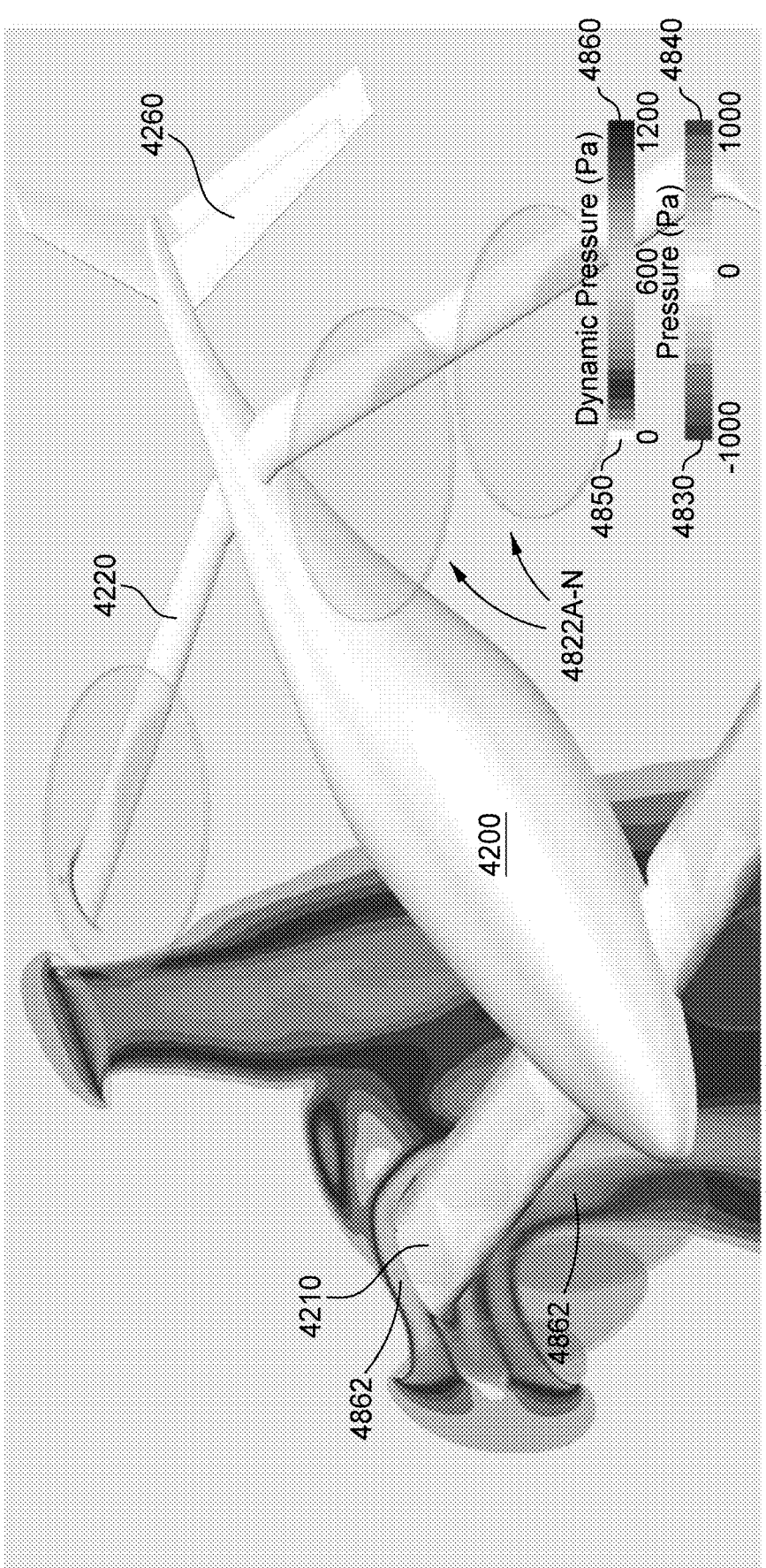
FIG. 48 further illustrates propeller and wing interaction fluid dynamics for an aircraft in an alternative configuration, in accordance with an embodiment of the present invention.

FIG. 48 further illustrates propeller and wing interaction fluid dynamics for an aircraft in an alternative configuration, in accordance with an embodiment of the present invention. An aircraft 4200 includes forward wings 4210 and rear wings 4210. The rear wings 4220 include one or more propellers 4822A-N. As discussed above, the rear wings 4220 can include any suitable number of propellers 4822A-N, and the propellers 4822A-N can operate in any suitable configuration (e.g., stationary, tilting, or any other suitable configuration).

In an embodiment, the propellers 4822A-N are installed with a vertical rotation axis. This installation allows the front wing 4210 to operate independently from the rear wing propellers 4822A-N, decoupling the lift of the front wing 4210 from the thrust generated by the rear propellers 4822A-N. In an embodiment, this can improve the efficiency of the aircraft control, compared with rear propellers installed as in 4722A-N illustrated in FIG. 47.

In an embodiment the shading 4840 illustrates positive pressure areas (e.g., positive air pressure) and the shading 4830 illustrates negative pressure areas. Further, the shading 4860 illustrates relatively higher dynamic pressure (e.g., at the regions 4862) while the shading 4850 illustrates relatively lower dynamic pressure. As illustrated, the configuration of the aircraft 4200 generates load for vertical takeoff and hover. The flow from the propellers 4822A-N is directed downward, creating vertical force upwards.

Figures 49, 50:
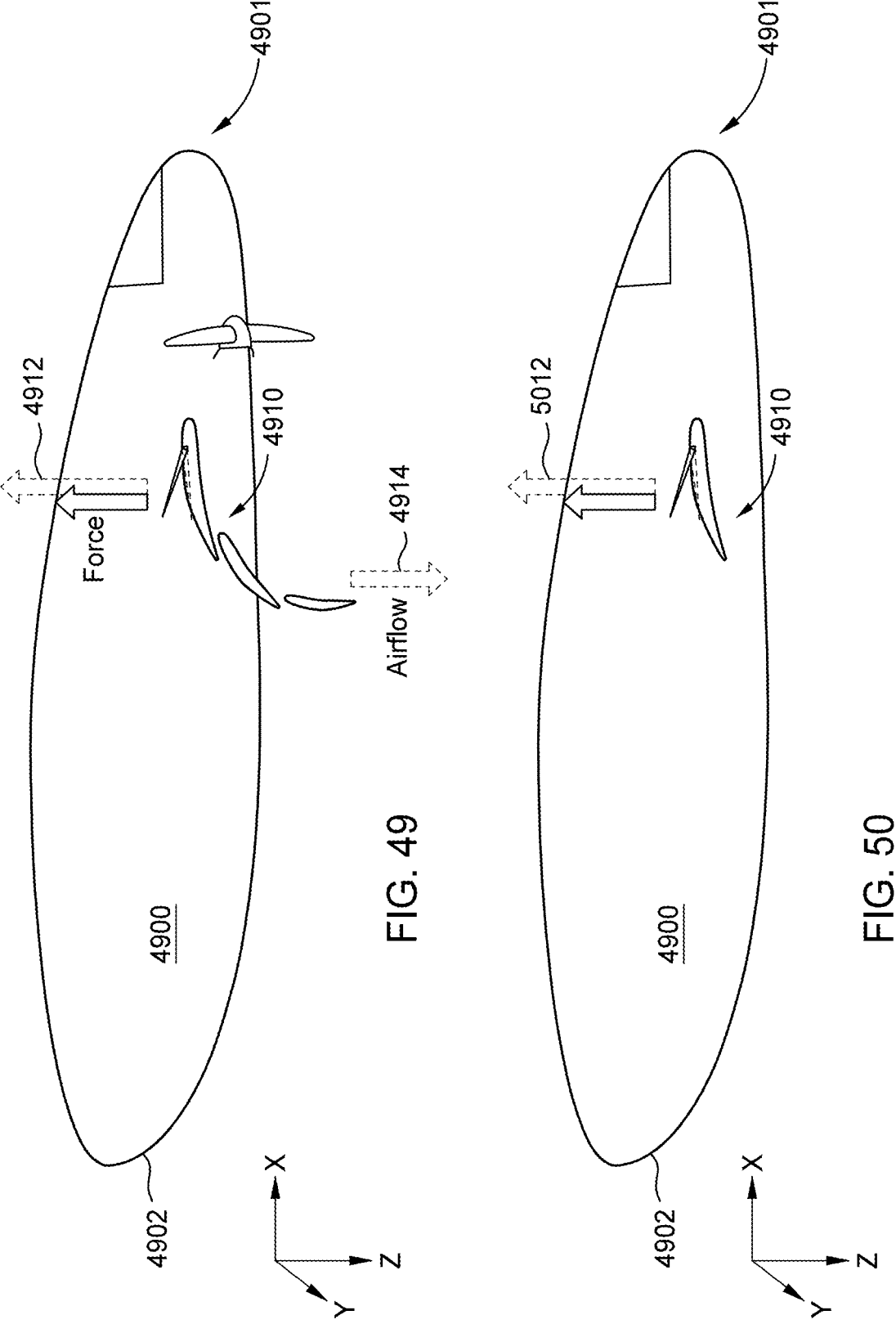
FIG. 49 illustrates an aircraft with spoilers, in accordance with an embodiment of the present invention.
FIG. 50 illustrates an aircraft with spoilers in forward flight, in accordance with an embodiment of the present invention.

FIG. 49 illustrates an aircraft with spoilers, in accordance with an embodiment of the present invention. In an embodiment, the aircraft 4200 provides another configuration for the aircraft discussed above (e.g., the aircraft 23000 discussed above, in relation to FIGS. 5-8, 17A-B, 22-28, and 39, and the aircraft 4200 discussed above in relation to FIGS. 42A-48). The front of the aircraft 4900 is marked with reference number 4901 and the rear of the aircraft 4900 is marked with reference number 4902.

In an embodiment, the aircraft 4900 includes one or more spoilers 4910. Many fixed wing aircraft include ailerons. Ailerons are typically used in pairs to control roll for the aircraft. In an embodiment, the aircraft 4900 includes the spoilers 4910 (e.g., a pair of spoilers) in place of, or in addition to, ailerons. These spoilers 4910 can actuate and assist both with speed control and roll control. For example, movement of the spoiler 4910 can control the force 4912 and airflow 4914 generated by the spoiler 4910 (e.g., during forward flight operation). The spoiler 4910 can be used to control the magnitude of downwards airflow. Use of the spoilers 4910 is just one example, and ailerons or any other suitable component can also be used.

FIG. 50 illustrates an aircraft with spoilers in forward flight, in accordance with an embodiment of the present invention. The front of the aircraft 4900 is marked with reference number 4901 and the rear of the aircraft 4900 is marked with reference number 4902. In an embodiment, during forward flight the spoiler 4910 is controlled to reduce upward force 5012 (e.g., to reduce lift).

Figure 51:
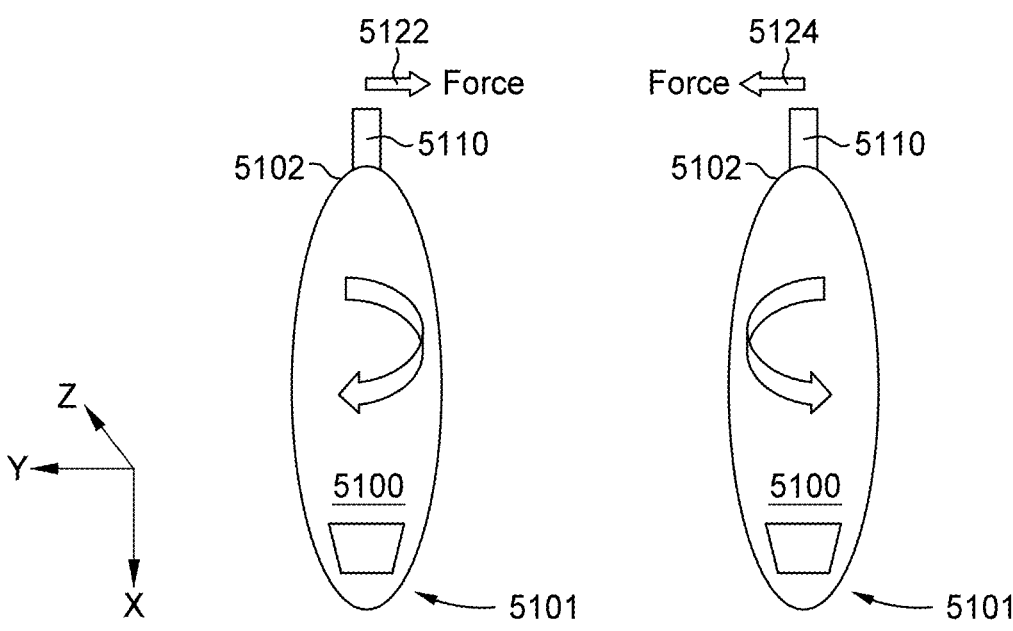
FIG. 51 illustrates a tail rotor for yaw control of an aircraft, in accordance with an embodiment of the present invention.

FIG. 51 illustrates a tail rotor for yaw control of an aircraft, in accordance with an embodiment of the present invention. In an embodiment, the aircraft 5100 provides another configuration for the aircraft 23000 discussed above, in relation to FIGS. 5-8, 17A-B, 22-28, and 39, the aircraft 4200 discussed above in relation to FIGS. 42A-48, and the aircraft 4900 discussed above in relation to FIGS. 49-50. The front of the aircraft 5100 is marked with reference number 5101 and the rear of the aircraft 5100 is marked with reference number 5102.

In an embodiment, the aircraft 5100 includes a tail rotor 5110 for yaw control (e.g., a tail rotor 5110 in a y-axis). For example, the tail rotor 5110 can be a set of two rotors, which may allow for more efficient force generation in both directions. This is merely an example, and the tail rotor 5110 can be an open rotor, a ducted fan, or any other suitable component. The tail rotor 5110 can provide force in either direction. For example, the tail rotor 5110 can provide force 5122 in one direction, and force 5124 in a different direction. This allows the tail rotor 5110 to provide yaw control for the aircraft 5100.

Figure 52:
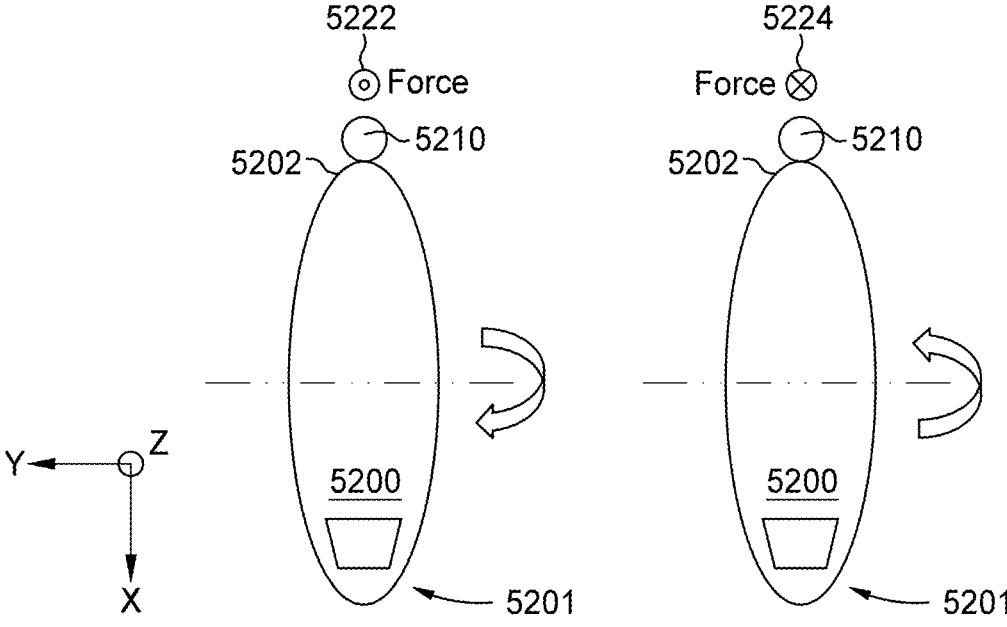
FIG. 52 illustrates a tail rotor for pitch control of an aircraft, in accordance with an embodiment of the present invention.

FIG. 52 illustrates a tail rotor for pitch control of an aircraft, in accordance with an embodiment of the present invention. In an embodiment, the aircraft 5200 provides another configuration for the aircraft 23000 discussed above, in relation to FIGS. 5-8, 17A-B, 22-28, and 39, the aircraft 4200 discussed above in relation to FIGS. 42A-48, the aircraft 4900 discussed above in relation to FIGS. 49-50, and the aircraft 5100 discussed above in relation to FIG. 51. The front of the aircraft 5200 is marked with reference number 5201 and the rear of the aircraft 5200 is marked with reference number 5202.

In an embodiment, the aircraft 5200 includes a tail rotor 5210 for pitch control. For example, the tail rotor 5110 illustrated in FIG. 51 is placed in the y-axis to provide yaw control. The tail rotor 5210 is placed in the z-axis (e.g., facing toward or away from the ground) to provide pitch control. The tail rotor 5210 can be an open rotor, a ducted fan, or any other suitable component. The tail rotor 5210 can provide force in either direction (e.g., toward or away from the ground). For example, the tail rotor 5210 can provide force 5222 away from the ground, and force 5224 toward the ground. This allows the tail rotor 5210 to provide pitch control for the aircraft 5200.

FIGS. 53A-D illustrates a tail rotor for yaw and pitch control of an aircraft, in accordance with an embodiment of the present invention. In an embodiment, the aircraft 5300 provides another configuration for the aircraft 23000 discussed above, in relation to FIGS. 5-8, 17A-B, 22-28, and 39, the aircraft 4200 discussed above in relation to FIGS. 42A-48, the aircraft 4900 discussed above in relation to FIGS. 49-50, the aircraft 5100 discussed above in relation to FIG. 51, and the aircraft 5200 illustrated in FIG. 52. The front of the aircraft 5300 is marked with reference number 5301 and the rear of the aircraft 5300 is marked with reference number 5302.

Figure 53A:
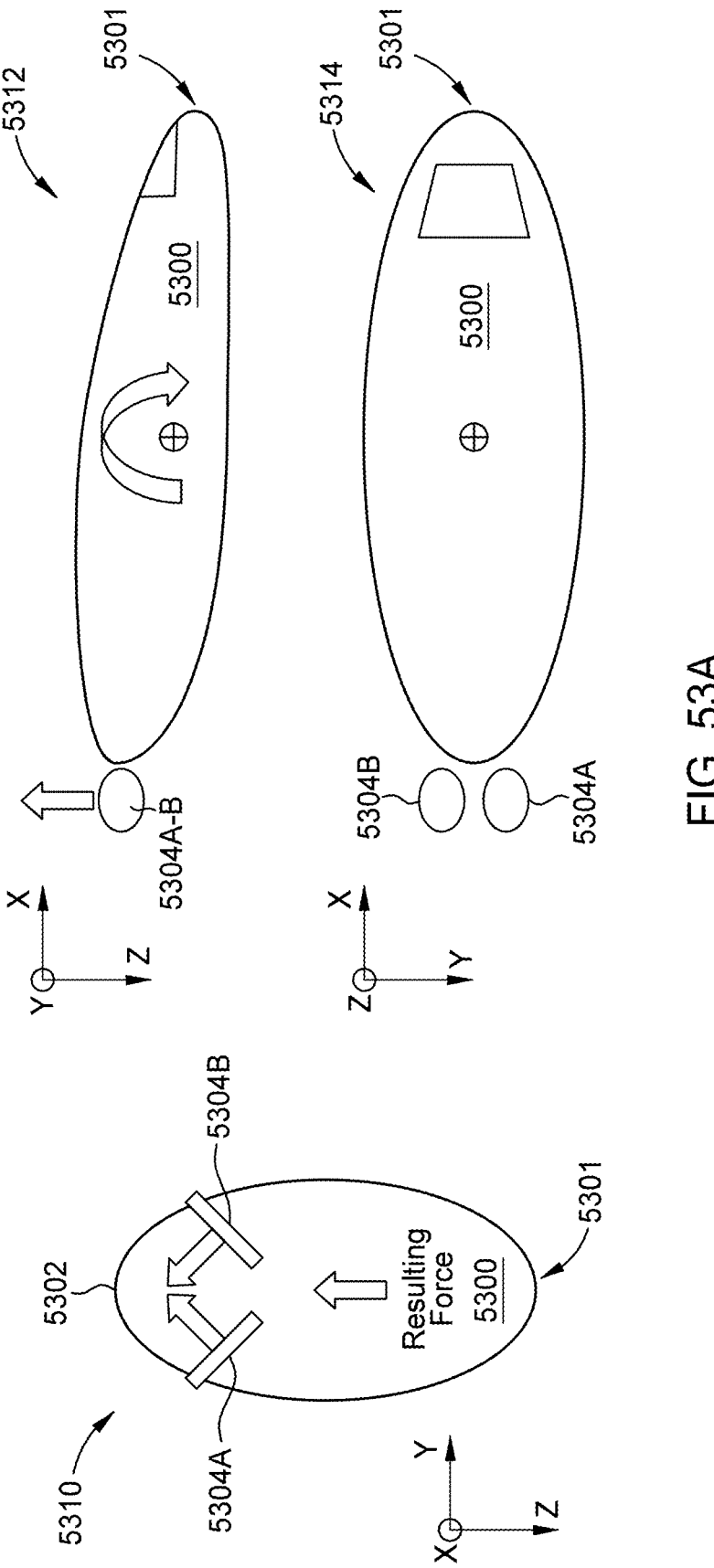

In an embodiment, FIG. 53A illustrates one configuration for the aircraft 5300, in which tail rotors 5304A-B provide both yaw and pitch control for the aircraft 5300. The tail rotors 5304A-B can be open rotor, ducted fans, or any other suitable components. In an embodiment, FIG. 53A illustrates three views. A view 5310 is from behind the aircraft 5300, a view 5312 is from the right side of the aircraft, and a view 5314 is from above the aircraft. In an embodiment, the tail rotors 5304A-B can be placed in a V or Y configuration, and can include one or more fans or other devices to provide force. In an embodiment, the tail rotors 5304A-B can provide both yaw control (e.g., as discussed above in relation to FIG. 51) and pitch control (e.g., as discussed above in relation to FIG. 52). Further, in an embodiment, the tail rotors 5304A-B are included with a tail of the aircraft 5300 (e.g., the tail 4260 illustrated above in relation to FIGS. 42A-B).

Figure 53B:
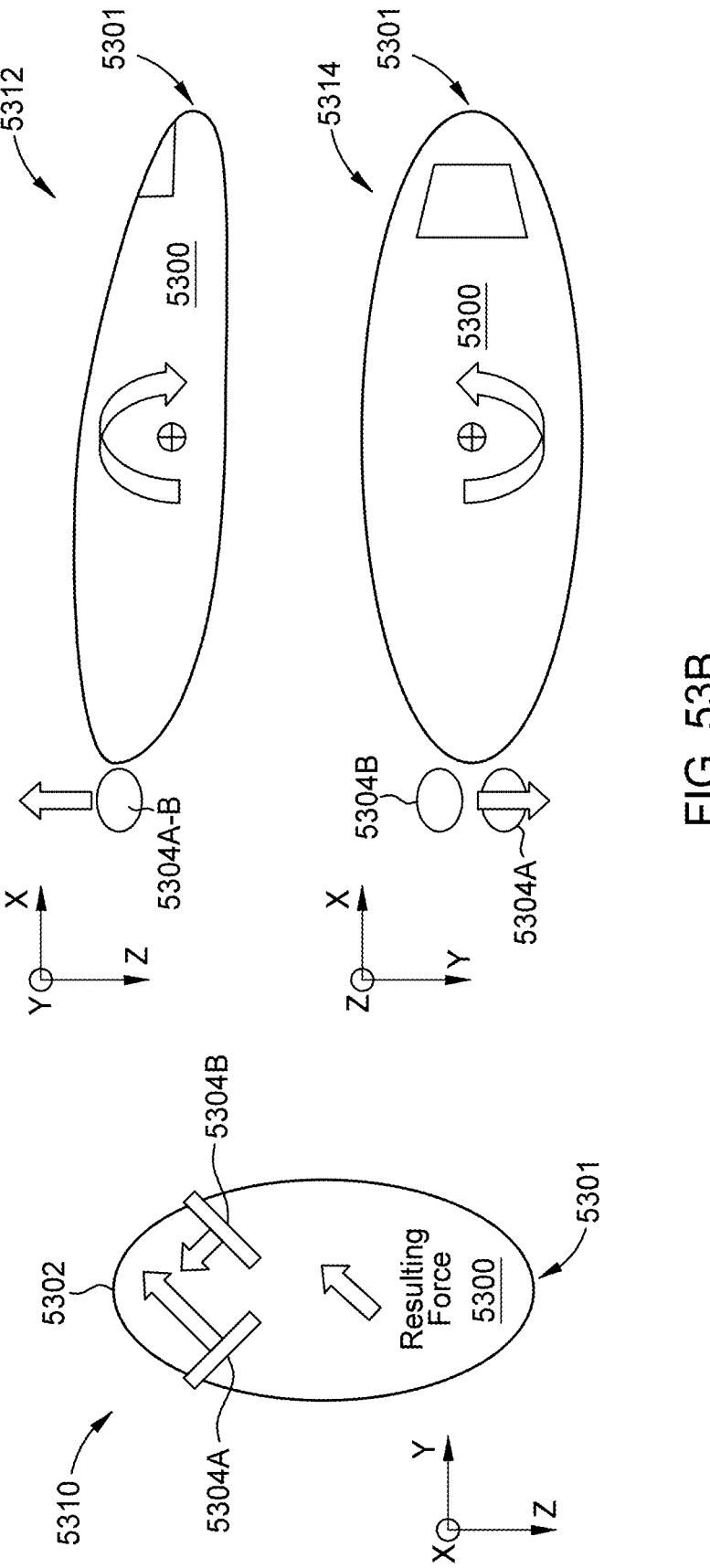

FIG. 53B illustrates the aircraft 5300 and tail rotors 5304A-B in operation for yaw and pitch control. In an embodiment, the tail rotors 5304A-B can be configured to provide variable force in the y-axis, the z-axis, or both. This can provide both yaw and pitch control.

FIG. 53C illustrates the aircraft 5300 with a single tail rotor 5304C for both yaw and pitch control. In an embodiment, the tail rotor 5304C can rotate. This allows the tail rotor 5304C to provide force in both the y-axis (e.g., for yaw control) and z-axis (e.g., for pitch control). In an embodiment, the tail rotor 5304C is included with a tail of the aircraft 5300 (e.g., the tail 4260 illustrated above in relation to FIGS. 42A-B).

FIG. 53D illustrates the aircraft 5300 and tail rotor 5304C in operation for yaw and pitch control. As illustrated, the tail rotor 5304C rotates to provide both yaw and pitch control.

Throughout this disclosure, the preferred embodiment and examples illustrated should be considered as exemplars, rather than as limitations on the present inventive subject matter, which includes many inventions. As used herein, the term "inventive subject matter," "system," "device," "apparatus," "method," "present system," "present device," "present apparatus" or "present method" refers to any and all of the embodiments described herein, and any equivalents.

It should also be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

When an element or feature is referred to as being "on" or "adjacent" to another element or feature, it can be directly on or adjacent the other element or feature or intervening elements or features may also be present. In contrast, when an element is referred to as being "directly on" or extending "directly onto" another element, there are no intervening elements present. Additionally, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Furthermore, relative terms such as "inner," "outer," "upper," "top," "above," "lower," "bottom," "beneath," "below," and similar terms, may be used herein to describe a relationship of one element to another. Terms such as "higher," "lower," "wider," "narrower," and similar terms, may be used herein to describe angular relationships. It is understood that these terms are intended to encompass different orientations of the elements or system in addition to the orientation depicted in the figures.

Although the terms first, second, third, etc., may be used herein to describe various elements, components, regions, and/or sections, these elements, components, regions, and/or sections should not be limited by these terms. These terms are only used to distinguish one element, component, region, or section from another. Thus, unless expressly stated otherwise, a first element, component, region, or section discussed below could be termed a second element, component, region, or section without departing from the teachings of the inventive subject matter. As used herein, the term "and/or" includes any and all combinations of one or more of the associated list items.

The terminology used herein is for the purpose of describing particular embodiments only and is not intended to be limiting. As used herein, the singular forms "a," "an," and "the" are intended to include the plural forms as well, unless the context clearly indicates otherwise. For example, when the present specification refers to "an" assembly, it is understood that this language encompasses a single assembly or a plurality or array of assemblies. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Embodiments are described herein with reference to view illustrations that are schematic illustrations. As such, the actual thickness of elements can be different, and variations from the shapes of the illustrations as a result, for example, of manufacturing techniques and/or tolerances are expected. Thus, the elements illustrated in the figures are schematic in nature and their shapes are not intended to illustrate the precise shape of a region and are not intended to limit the scope of the inventive subject matter.

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The foregoing is intended to cover all modifications, equivalents and alternative constructions falling within the spirit and scope of the invention as expressed in the appended claims, wherein no portion of the disclosure is intended, expressly or implicitly, to be dedicated to the public domain if not set forth in the claims. Furthermore, any features, functions, steps, or elements of the embodiments may be recited in or added to the claims, as well as negative limitations that define the inventive scope of the claims by features, functions, steps, or elements that are not within that scope.

We claim:

1. An aircraft operable in one of a forward cruise mode or a vertical hover mode, the aircraft comprising:

a first pair of wings, each wing of the first pair of wings comprising one or more actuating flaps configured to move to facilitate the aircraft transitioning between the forward cruise mode and the vertical hover mode;

one or more first propellers coupled with the first pair of wings and each arranged in front of, and laterally aligned with, the one or more actuating flaps, wherein the one or more first propellers are stationary, non-tilting propellers each with a substantially horizontal rotation axis;

a second pair of wings arranged aft of the first pair of wings; and one or more second propellers coupled to the second pair of wings, wherein the one or more second propellers are stationary, non-tilting propellers each with a substantially vertical rotation axis, and wherein each wing of the second pair of wings is coupled to at least one of the one or more second propellers, and wherein each wing of the first pair of wings is a low wing and each wing of the second pair of wings is a high wing.

2. The aircraft of claim 1, wherein the one or more second propellers are coupled to a top side of respective wings of the second pair of wings.

3. The aircraft of claim 1, wherein each wing of the second pair of wings is coupled to a respective wing of the first pair of wings using a structural connector.

4. The aircraft of claim 1, wherein the first pair of wings comprise forward wings and the second pair of wings comprise rear wings, and wherein the rear wings each comprise one or more additional flaps.

5. The aircraft of claim 4, wherein the one or more additional flaps are configured to actuate to facilitate the aircraft transitioning between the forward cruise mode and the vertical hover mode, and operating in one of the forward cruise mode or the vertical hover mode.

6. The aircraft of claim 5, wherein the one or more additional flaps each comprises a pivot point allowing a portion of each respective additional flap to be positioned at a different angle from a remainder of the respective additional flap.

7. The aircraft of claim 1, further comprising:

one or more tail rotors mounted to the aircraft aft of the first and second pair of wings, including when the aircraft is in the forward cruise mode, and configured to provide at least one of: (i) yaw control or (ii) pitch control.

8. The aircraft of claim 1, further comprising:

an electronic controller configured to control operation of the aircraft in both the forward cruise mode and the vertical hover mode, the electronic controller being configured to:

in the vertical hover mode, cause i) the one or more second propellers to produce vertical thrust; and ii) the one or more actuating flaps to extend; and in the forward cruise mode, cause i) the one or more second propellers to cease operation; ii) the one or more actuating flaps to retract; and iii) the one or more first propellers mounted to the first pair of wings to produce horizontal thrust.

9. An aircraft operable in one of a forward cruise mode or a vertical hover mode, the aircraft comprising:

a first pair of wings, each wing of the first pair of wings comprising one or more actuating flaps configured to move to facilitate the aircraft transitioning between the forward cruise mode and the vertical hover mode;

one or more first propellers coupled with the first pair of wings and each arranged in front of, and laterally aligned with, the one or more actuating flaps, wherein the one or more first propellers are stationary, non-tilting propellers with a substantially horizontal rotation axis;

a second pair of wings arranged aft of the first pair of wings; and one or more second propellers coupled to the second pair of wings, wherein the one or more second propellers are stationary, non-tilting propellers, wherein the one or more second propellers are oriented substantially horizontally and rotate in a plane perpendicular to a yaw axis of the aircraft to produce vertical thrust, and wherein each wing of the second pair of wings is coupled to at least one of the one or more second propellers, and wherein each wing of the first pair of wings is a low wing and each wing of the second pair of wings is a high wing.

10. The aircraft of claim 9, wherein each wing of the second pair of wings is coupled to a respective wing of the first pair of wings using a structural connector, wherein the first pair of wings comprise forward wings and the second pair of wings comprise rear wings, and wherein the rear wings each comprise one or more additional flaps configured to actuate to facilitate the aircraft transitioning between the forward cruise mode and the vertical hover mode, and operating in one of the forward cruise mode or the vertical hover mode.

11. The aircraft of claim 10, wherein the one or more additional flaps each comprises a pivot point allowing a portion of each respective additional flap to be positioned at a different angle from a remainder of the respective additional flap.

12. An aircraft operable in one of a forward cruise mode or a vertical hover mode, the aircraft comprising:

a pair of forward wings, each wing of the pair of forward wings comprising a respective one or more actuating flaps configured to move to facilitate the aircraft transitioning between the forward cruise mode and the vertical hover mode;

one or more first thrustors coupled with the pair of forward wings and each arranged in front of, and laterally aligned with, the one or more actuating flaps, wherein the one or more first thrustors are stationary, non-tilting thrustors each with a substantially horizontal rotation axis, wherein the one or more actuating flaps each include one or more flaps that, when deployed during the vertical hover mode, rotate downwards so that a trailing flap of the one or more flaps is substantially perpendicular to a given wing of the pair of forward wings;

a pair of rear wings; and one or more second thrustors coupled to the pair of rear wings, wherein the one or more second thrustors are stationary, non-tilting thrustors each with a substantially vertical rotation axis, and wherein each wing of the pair of rear wings is coupled to at least one of the one or more second thrustors, and wherein each wing of the pair of forward wings is a low wing and each wing of the pair of rear wings is a high wing.

13. The aircraft of claim 12, wherein each wing of the pair of rear wings is coupled to a respective wing of the pair of forward wings using a structural connector.

14. The aircraft of claim 12, further comprising:

a plurality of actuating spoilers configured to be used to control all of: (i) roll, (ii) lift, and (iii) drag, for the aircraft.

15. The aircraft of claim 8, wherein the electronic controller is further configured to:

in the forward cruise mode, cause at least one of the one or more actuating flaps on a first side of the aircraft to pivot upward and at least one of the one or more actuating flaps on a second side of the aircraft to pivot downward to cause the aircraft to roll.

16. The aircraft of claim 1, wherein:

on a first side of the aircraft, one wing of the first pair of wings is coupled with one wing of the second pair of wings at their respective wing tips, and on a second side of the aircraft, one wing of the first pair of wings is coupled with one wing of the second pair of wings at their respective wing tips.

17. The aircraft of claim 1, wherein the high wings and low wings are not parallel with each other.

18. The aircraft of claim 1, wherein the high wings are angled downward and the low wings are angled upward.

19. The aircraft of claim 1, wherein the one or more actuating flaps each include one or more flaps that, when deployed during the vertical hover mode, rotate downwards to deflect a slipstream of airflow from the one or more first propellers in a substantially downward vertical direction.

20. The aircraft of claim 19, wherein the one or more actuating flaps each include one or more flaps that, when deployed during the vertical hover mode, deploy so that a trailing flap of the one or more flaps is substantially perpendicular to a given wing of the pair of forward wings and is independently pivotable about a pivot point to a plurality of different angles.

\* \* \* \* \*